US008271520B1

(12) United States Patent
Aman et al.

(10) Patent No.: US 8,271,520 B1
(45) Date of Patent: Sep. 18, 2012

(54) EXPRESSION EDITOR TOOL

(75) Inventors: Naima Aman, Piscataway, NJ (US);
Joan McGraw, Glen Rock, NJ (US);
Kathleen Devlin, Johnston, IA (US);
Jeremy Van Cuylenburg, Brooklyn, NY (US); Matthew R. Foster, Poplar Grove, IL (US)

(73) Assignee: Accenture Global Services Limited, Dublin (IE)

( * ) Notice: Subject to any disclaimer, the term of this patent is extended or adjusted under 35 U.S.C. 154(b) by 0 days.

(21) Appl. No.: 13/174,175

(22) Filed: Jun. 30, 2011

Related U.S. Application Data

(60) Provisional application No. 61/470,265, filed on Mar. 31, 2011.

(51) Int. Cl.
*G06F 7/00* (2006.01)
*G06F 17/30* (2006.01)

(52) U.S. Cl. ....................................... 707/769
(58) Field of Classification Search .................. 707/769
See application file for complete search history.

(56) References Cited

U.S. PATENT DOCUMENTS

| | | | |
|---|---|---|---|
| 6,230,161 B1 | 5/2001 | Berkland et al. | |
| 6,610,106 B1 | 8/2003 | Jenks | |
| 6,826,566 B2 * | 11/2004 | Lewak et al. | 1/1 |
| 7,333,999 B1 | 2/2008 | Njemanze | |
| 7,437,666 B2 * | 10/2008 | Ramarao et al. | 715/235 |
| 7,584,117 B2 * | 9/2009 | Bubner | 705/7.36 |
| 7,913,159 B2 * | 3/2011 | Larcheveque et al. | 715/224 |
| 2002/0059224 A1 * | 5/2002 | McConnell et al. | 707/5 |
| 2002/0097253 A1 * | 7/2002 | Charisius et al. | 345/700 |
| 2002/0156846 A1 * | 10/2002 | Rawat et al. | 709/203 |
| 2003/0237046 A1 * | 12/2003 | Parker et al. | 715/513 |
| 2004/0003138 A1 * | 1/2004 | Finocchio | 709/328 |
| 2004/0036719 A1 * | 2/2004 | Van Treeck | 345/763 |
| 2005/0172221 A1 * | 8/2005 | Kobashi et al. | 715/513 |
| 2006/0236254 A1 * | 10/2006 | Mateescu et al. | 715/762 |

OTHER PUBLICATIONS

U.S. Appl. No. 13/174,210, filed Jun. 30, 2011, Aman et al.

\* cited by examiner

*Primary Examiner* — Robert Beausoliel, Jr.
*Assistant Examiner* — Nicholas Allen
(74) *Attorney, Agent, or Firm* — Brinks Hofer Gilson & Lione

(57) ABSTRACT

An expression editor tool allows a user to build an expression or calculation with a rule that specifies an action programmed to occur during execution of a target application. The expression editor tool allows a user to define an action point definition that specifies an action point located in the target application logic instructions. The expression editor tool determines from the action point definition a dataset that is in-context at the action point, provides an expression definition interface to obtain selected data fields from the dataset, and a selected logical operator to connect the selected data fields used to construct a new expression. The expression editor tool provides an outcome selection interface used to obtain a selected outcome for the new expression in order to create a rule including the new expression and the selected outcome, and store the rule in the database linked to the action point definition.

15 Claims, 58 Drawing Sheets

| Item | | Operator | |
|---|---|---|---|
| ☐ Number of Lines | | + | ▷ |
| ☐ 10 | | * | ▷ |
| ☐ Date Difference(Loss Date, Date Reported) | | − | ▷ |
| ☐ Max Days Allowed | | | |
| Remove | Ungroup | Group | Add |

Save and Add Another

▷ Calculation Preview

Number of Lines + 10
* (DateDifference(Loss Date, Date Reported)−
Max Days Allowed)

▷ Calculation Versions

| Calculation Values | Effective Date | Expiration Date |
|---|---|---|
| Number of Lines + 12<br>* (DateDifference(Loss Date,<br>Date Reported)−<br>Max Days Allowed) | 01/01/2007 | 03/21/2009 |
| Number of Lines<br>* (DateDifference(Loss Date,<br>Date Reported)−<br>Max Days Allowed) | 01/01/2006 | 12/31/2006 |

+ Task

Drag and drop to reorder. Use checkboxes to group, ungroup and remove

| ☐ Expression | Operator |
|---|---|
| ☐ Number of Products < 5 | AND ▸ |
| ☐ ClaimFatality | |
| ☐ Value of Products < $500,000 | OR ▸ |
| ☐ LineofBusiness = "Workers Compensation" | |
| ☐ WCJobClassIDRequired | |

[ Remove ]    [ Group ] [ Ungroup ]

▸ Expression Display (Number of Products < 5 AND ClaimFatality)
AND
(Value of Products < $500,000 OR WCJobClassIDRequired)
OR
WCJobClassIDRequired Produces this result – note that the default logical operator is always AND. If there is not already a logical operator connected to an item, supply an AND. The order of the grouped item is moved to the first checked item. The logical operator after WCJobClassIDRequired is also removed.

Drag and drop to reorder. Use checkboxes to group, ungroup and remove

| ☐ Expression | Operator |
|---|---|
| ☑ Number of Products < 5 | |
| ☐ Value of Products < $500,000 | OR ▸ |
| ☐ LineofBusiness = "Workers Compensation" | OR ▸ |
| ☐ WCJobClassIDRequired | AND ▸ |
| ☑ ClaimFatality | |

[ Remove ]    [ Group ] [ Ungroup ]

▸ Expression Display

Number of Products < 5
AND
(Value of Products < $500,000 OR LineofBusiness = "Workers Compensation")
OR
WCJobClassIDRequired
AND
ClaimFatality Click Ungroup Button with items checked

Drag and drop to reorder. Use checkboxes to group, ungroup and remove

☐ Expression | Operator
☑ Number of Products < 5 [AND ▾] ClaimFatality [OR ▾]
☐ Value of Products < $500,000 [OR ▾] LineofBusiness = "Workers Compensation" [OR ▾]
☑ WCJobClassIDRequired

[Remove]  [Group] [Ungroup]

▽ Expression Display (Number of Products < 5 AND ClaimFatality)
OR
(Value of Products < $500,000 OR WCJobClassIDRequired)
OR
WCJobClassIDRequired Click Ungroup Button with items checked Drag and drop to reorder. Use checkboxes to group, ungroup and remove ☐ Expression | Operator
☐ (Number of Products < 5 [AND ▾] ClaimFatality) [OR ▾]
  WCJobClassIDRequired [AND ▾]
☐ Value of Products < $500,000 [OR ▾] LineofBusiness = "Workers Compensation"

[Remove]  [Group] [Ungroup]

▽ Expression Display ((Number of Products < 5 AND ClaimFatality)
OR
WCJobClassIDRequired)
AND
(Value of Products < $500,000 OR WCJobClassIDRequired)

Produces this result

Drag and drop to reorder. Use checkboxes to group, ungroup and remove

☐ Expression | Operator
☐ (Number of Products < 5 [AND ▾] (Value of Products < $500,000 [OR ▾]
LineofBusiness="Workers Compensation") [OR ▾] WCJobClassIDRequired [AND ▾]
ClaimFatality

[Remove]  [Group] [Ungroup]  [Add]

▾ Expression Display (Number of Products < 5
AND
(Value of Products < $500,000
OR
WCJobclassIDRequired)
AND
ClaimFatality)

Produces this result

Drag and drop to reorder. Use checkboxes to group, ungroup and remove

☐ Expression | Operator
☑ Number of Products < 5 [AND ▾]
☑ Value of Products < $500,000 [OR ▾] LineofBusiness
= "Workers Compensation" [OR ▾]
☑ WCJobClassIDRequired [AND ▾]
☑ ClaimFatality

[Remove]  [Group] [Ungroup]  [Add]

▾ Expression Display (Number of Products < 5 AND ClaimFatality)
AND
(Value of Products < $500,000 OR LineofBusiness
="Workers Compensation")
OR
WCJobclassIDRequired
AND
ClaimFatality Click Ungroup Button with items checked

| Home | Data Dictionary | Action Points | Page Designer | Reference Data | Inventory | Search |

Home >> Action Point

Desktop
- + Alerts
- + Archive Claims
- + Claim Contracts
- − Claim Details
  - Application Behavior Action Point 1
  - Application Behavior Action Point 2
  - Display Action Point 1
  - Display Action Point 2
  - Navigation Action Point 1
  - Navigation Action Point 2
  - Validation Action Point 1    — 1906
  - Validation Action Point 2
- + Claim Group
- + File Notes
- + Forms and Correspondence
- + Policy    — 1908
- + Task

Action Point

▷ Properties — 1902    [Migrate]

General
Name
Validation Action Point
Description
Validation Action Point Description
Type                                Output
Business Service                        Single Item
Output Business Data Type
Text
Enabled                             Audit Level
Yes                                     None
— 1904

▷ Configuration

View by Status: [Active ▾] — 1916
*Drag and drop actions to modify order when expired status not selected*

| Name | Type | Description |
|---|---|---|
| Workers Comp Claim Not Closed | Rule | Rule Description. |
| Get Status | Action | Action Description. |
| Generate Event | Action | Action Description. |

— 1910    [Add Action]    [Add Rule] — 1912

Action Point Output — 1914

Depending on rules or ordering, the following may provide the actual output to the application.

Potential Rule Output
Workers Comp Claim Not Closed
  Return a Field Value For Action Point
  Return a Valid Value For Action Point

Potential Action Output
Get Status Action

FIG. 19

| Home | Data Dictionary | Action Points | Page Designer | Reference Data | Inventory | Search |

Home >> Validation Action Point 1

Desktop
- + Alerts
- + Archive Claims
- + Claim Contracts
- − Claim Details
  - Claim Page Action Point
  - Other Action Point
  - Display Action Point 1
  - Display Action Point 2
  - Navigation Action Point 1
  - Navigation Action Point 2
  - Validation Action Point 1
  - Validation Action Point 2
- + Claim Group
- + File Notes
- + Forms and Correspondence
- + Policy
- + Task

Action Point  [Migrate]

▷ Properties

General  Name
Claim Page Action Point
Description
This is the action point for the Claim page
Type            Output ─2302
Page                Claims
Enabled         Audit Level
Yes                 None ▷ Configuration

View by Status: [Active ▾] ─2304
*Drag and drop actions to modify order when expired status not selected*

| Name | Type | Description |
|---|---|---|
| EnableHoursWorked | Rule | Rule Description. |
| HideAutoQuestions | Rule | Rule Description. |
| EnableWCQuestions | Rule | Rule Description. |

[Add Action]  [Add Rule]

FIG. 23

| Home | Data Dictionary | Action Points | Page Designer | Reference Data | Inventory | Search |

Home >> Validation Action Point1 >> Rule Details

Desktop
- + Alerts
- + Archive Claims
- + Claim Contracts
- − Claim Details
  - Application Behavior Action Point 1
  - Application Behavior Action Point 2
  - Display Action Point 1
  - Display Action Point 2
  - Navigation Action Point 1
  - Navigation Action Point 2
  - Validation Action Point 1
  - Validation Action Point 2
- + Claim Group
- + File Notes
- + Forms and Correspondence
- + Policy
- + Task

Existing Rule

▽ Rule Details

General *Name
  [Rule Name]
  *Description
  [Rule Description]

Rule Summary
If Claim File Type = Workers Compensation is True, Then ValidateSaveClaim and Send an Email and Publish an Event — 2502

Effective Date*    Expiration Date*
[03/22/2009]       [03/22/2023]

▽ Expression

*Expression Name
  Expression Name
*Expression Value
  Claim File Type = Workers Compensation

[Replace Expression]

[Save]

Action Point Properties

Name
Validation Action Point 1

Description
Save Claim Details Validation

Type
Business Service

Output
None

FIG. 25A

| Home | Data Dictionary | Action Points | Page Designer | Reference Data | Inventory | Search |

Home >> Validation Action Point1 >> New Rule

Desktop
- + Alerts
- + Archive Claims
- + Claim Contracts
- − Claim Details
  - Application Behavior Action Point 1
  - Application Behavior Action Point 2
  - Display Action Point 1
  - Display Action Point 2
  - Navigation Action Point 1
  - Navigation Action Point 2
  - Validation Action Point 1
  - Validation Action Point 2
- + Claim Group
- + File Notes
- + Forms and Correspondence
- + Policy
- + Task

New Rule

Rule Details

General Name*
[New (Not yet saved)]
Description*
[Rule Description]
Rule Summary
No expression or outcomes selected
Effective Date* [03/22/2009] 📅  Expiration Date* [03/22/2023] 📅

[Save] — 2602

▷ Expression
 *Name
 No Expression added.
 *Expression
 No Expression added.

[Add Expression]

▷ Outcomes

View by Status: [Active ▼] — 2604
If Expression is True, Then
*No outcomes exist – add expression and save before adding outcomes.*
Else
*No outcomes exist – add expression and save before adding outcomes.*

Action Point Properties
Name
Validation Action Point 1
Description
Save Claim Details Validation
Type
Business Service
Output
None

| Home | Data Dictionary | Action Points | Page Designer | Reference Data | Inventory | Search |

Home >> BreadCrumb1 >> Breadcrumb2

Desktop
- + Alerts
- + Archive Claims
- + Claim Contracts
- − Claim Details
  - Application Behavior Action Point 1
  - Application Behavior Action Point 2
  - Display Action Point 1
  - Display Action Point 2
  - Navigation Action Point 1
  - Navigation Action Point 2
  - Validation Action Point 1
  - Validation Action Point 2
- + Claim Group
- + File Notes
- + Forms and Correspondence
- + Policy
- + Task

Action

[Save] — 2702

▽ Properties

\*Name
[____] — 2704

\*Application Classification
[Global ▽]

\*Component Classification
[Standard ▽]

\*Action Type
[Get Expression Result ▽] — 2706

Action Type Description
This can be used to capture the evaluation (true or false) of an expression into a variable or directly to the application.

\*Effective Date
[Defaults to current date 🗓]

\*Expiration Date
[Defaults to system max date 🗓]

▽ Configuration

Select an expression. If desired, select a variable or add a new one.

\*Expression Name
Expression Name — 2708

Expression Value
Claim File Type = "Workers Compensation"

Action Point Properties

Name
Validation Action Point 1

Description
Save Claim Details Validation

Type
Business Service

Output
None

FIG. 27A

| | |
|---|---|
| *Destination Type | *Variable Name |
| Variable ▸ | Select ▸ — 2712 |
| Error Behavior | |
| Cancel on Error ▸ | |
| 2710 | Replace Expression  Add New Variable — 2714 |

▸ Variables — 2716
*Variables associated to this action point are listed below.*

| | Name | Description |
|---|---|---|
| ⦿ | IsWorkersComp | Brick is the finish on the home |
| ○ | ClaimStatusOpen | Indicates that claim status is open or FNOL complete |
| ○ | TotalClaimLoss | Stores total claim loss returned from Get Claim Loss activity |

Modify Variable

FIG. 27B

| Home | Data Dictionary | Action Points | Page Designer | Reference Data | Inventory | Search |

Home>> BreadCrumb1 >> Breadcrumb2

Desktop
- + Alerts
- + Archive Claims
- + Claim Contracts
- − Claim Details
  - Application Behavior Action Point 1
  - Max Value of Payment
  - Display Action Point 1
  - Display Action Point 2
  - Navigation Action Point 1
  - Navigation Action Point 2
  - Validation Action Point 1
  - Validation Action Point 2
- + Claim Group
- + File Notes
- + Forms and Correspondence
- + Policy
- + Task

2804

New Action — 2802 — Save

▽ Properties

\*Name
[          ]

\*Application Classification [Global ▽]   \* Component Classification [Standard ▽]

\*Action Type [Get Calculation Result ▽]

Description
Returns the result of a calculation.

\*Effective Date [Defaults to current date]   \*Expiration Date [Defaults to system max date]

▽ Configuration

\*Calculation Name
Need to select a calculation for this field
[Maximum Single Payment ▽]

Action Point Properties — 2806

Name
Max Value of Payment
Description
Determines max value for payment
Type
Business Service
Output
Single Item
Output Business Data Type
Currency

FIG. 28A

Calculation Value
Total Claim Reserve Amount + 100,000

**\*Destination Type**
Application

Error Behavior
Cancel on Error

◀ Variables

Add New Variable

| Home | Data Dictionary | Action Points | Page Designer | Reference Data | Inventory | Search |

Home >> BreadCrumb1 >> Breadcrumb2

Desktop
- + Alerts
- + Archive Claims
- + Claim Contracts
- − Claim Details
  - Application Behavior Action Point 1
  - Application Behavior Action Point 2
  - Display Action Point 1
  - Display Action Point 2
  - Navigation Action Point 1
  - Navigation Action Point 2
  - Validation Action Point 1
  - Validation Action Point 2
- + Claim Group
- + File Notes
- + Forms and Correspondence
- + Policy
- + Task

New Action                                           Save — 3002

▽ Properties

*Name

*Application Classification    *Component Classification
[Global ▾]                     [Standard ▾]

*Action Type
[Publish an Event ▾]

Description
Adds a row in the database which will be processed off-line by running the selected action point.

*Effective Date                 *Expiration Date
[Defaults to current date]      [Defaults to system max date]

▽ Configuration

Select the event type and input data to be added to the database for later processing

*Event Type
[Select ▾] — 3004

Action Point Properties

Name
Validation Action Point 1

Description
Save Claim Details Validation

Type
Business Service

Output
None

FIG. 30A

| Home | Data Dictionary | Action Points | Page Designer | Reference Data | Inventory | Search |

Home>> BreadCrumb1 >> Breadcrumb2

Desktop
- + Alerts
- + Archive Claims
- + Claim Contracts
- − Claim Details
  - Application Behavior Action Point 1
  - Application Behavior Action Point 2
  - Display Action Point 1
  - Display Action Point 2
  - Navigation Action Point 1
  - Navigation Action Point 2
  - Validation Action Point 1
  - Validation Action Point 2
- + Claim Group
- + File Notes
- + Forms and Correspondence
- + Policy
- + Task

New Action

▽ Properties

**\*Name**
[                    ] ✕

**\*Application Classification   \*Component Classification**
[ Global ▾ ]   [ Standard ▾ ]

**\*Action Type**
[ Publish an Event ▾ ]

Description
Adds a row in the database which will be processed off-line by running the selected action point.

**\*Effective Date   \*Expiration Date**
[ Defaults to current date 📅 ]   [ Defaults to system max date 📅 ]

▽ Configuration

Select the event type and input data to be added to the database for later processing

**\*Event Type**
[ Event Name ▾ ]

[ Save ] — 3102

Action Point Properties

Name
Validation Action Point 1

Description
Save Claim Details Validation

Type
Business Service

Output
None

| Home | Data Dictionary | Action Points | Page Designer | Reference Data | Inventory | Search |

Home >> BreadCrumb1 >> Breadcrumb2

Desktop
- + Alerts
- + Archive Claims
- + Claim Contracts
- − Claim Details
  - Application Behavior Action Point 1
  - Application Behavior Action Point 2
  - Display Action Point 1
  - Display Action Point 2
  - Navigation Action Point 1
  - Navigation Action Point 2
  - Validation Action Point 1
  - Validation Action Point 2
- + Claim Group
- + File Notes
- + Forms and Correspondence
- + Policy
- + Task

New Action    [ Save ]

▽ Properties

*Name
[_____]

*Application Classification    *Component Classification
[Global ▾]    [Standard ▾]

*Action Type
[Publish an Event ▾]

Description
Adds a row in the database which will be processed off-line by running the selected action point.

*Effective Date    *Expiration Date
[Defaults to current date 📅]    [Defaults to system max date 📅]

▷ Configuration

Select the event type and input data to be added to the database for later processing

*Event Type
[Batch Payment ▾]

Action Point Properties

Name
Validation Action Point 1

Description
Save Claim Details Validation

Type
Business Service

Output
None

| Home | Data Dictionary | Action Points | Page Designer | Reference Data | Inventory | Search |

Home >> BreadCrumb1 >> Breadcrumb2

Desktop
- + Alerts
- + Archive Claims
- + Claim Contracts
- − Claim Details
  - Application Behavior Action Point 1
  - Application Behavior Action Point 2
  - Display Action Point 1
  - Display Action Point 2
  - Navigation Action Point 1
  - Navigation Action Point 2
  - Validation Action Point 1
  - Validation Action Point 2
- + Claim Group
- + File Notes
- + Forms and Correspondence
- + Policy
- + Task

Outcome

▷ Properties

*Name
[        ]

*Application Classification    *Component Classification
[Global ▽]                     [Standard ▽]

*Outcome Type
[Populate Field ▽]

Description
Sets the value of the selected custom data field.

*Effective Date                *Expiration Date
[Defaults to current date 🗓]  [Defaults to system max date 🗓]

▷ Configuration

Select the custom field to be updated and enter the value with which to update it
*Custom Data Object            *Field
[POLICY_EXT ▽]                 [Agent Email ▽] — 3406
*Data Source                   — 3404
[Select ▽]
*Error Behavior
[Cancel on Error ▽]

[ Save ] — 3402

Rule Properties
Name
Determine Next Outcome
Description
Determines what outcomes should be selected
Expression Name
IsClaimReadyToProcess

FIG. 34

| Home | Data Dictionary | Action Points | Page Designer | Reference Data | Inventory | Search |

Home >> BreadCrumb1 >> Breadcrumb2

Desktop
- + Alerts
- + Archive Claims
- + Claim Contracts
- − Claim Details
  - Application Behavior Action Point 1
  - Application Behavior Action Point 2
  - Display Action Point 1
  - Display Action Point 2
  - Navigation Action Point 1
  - Navigation Action Point 2
  - Validation Action Point 1
  - Validation Action Point 2
- + Claim Group
- + File Notes
- + Forms and Correspondence
- + Policy
- + Task

New Outcome     3602     [Save]

▷ Properties

*Name: [                    ]

*Application Classification: [Global ▽]   *Component Classification: [Standard ▽]

*Outcome Type: [Select Value ▽]

Description: Outputs selected data to application

*Effective Date: [Defaults to current date 📅]   *Expiration Date: [Defaults to system max date 📅]

▷ Properties

*Data Source: [Valid Value ▽]   Category Name: [State ▽]   *Valid Value: [Nevada ▽]   — 3604

Outcome Destination Type: Application

Rule Properties
Name
Rule Name 1
Description
Determines if injury is fatal
Expression Name
Injury Is Fatal

FIG. 36

| Home | Data Dictionary | Action Points | Page Designer | Reference Data | Inventory | Search |

Home >> BreadCrumb1 >> Breadcrumb2

Desktop
- + Alerts
- + Archive Claims
- + Claim Contracts
- – Claim Details
  - Application Behavior Action Point 1
  - Application Behavior Action Point 2
  - Display Action Point 1
  - Display Action Point 2
  - Navigation Action Point 1
  - Navigation Action Point 2
  - Validation Action Point 1
  - Validation Action Point 2
- + Claim Group
- + File Notes
- + Forms and Correspondence
- + Policy
- + Task

New Outcome

▽ Properties

*Name

*Application Classification    *Component Classification
[Global ▼]                     [Standard ▼]

*Outcome Type
[Select Value ▼]

Description
Outputs selected data to application

*Effective Date                *Expiration Date
[Defaults to current date] 📅  [Defaults to system max date] 📅

▽ Configuration

*Data Source
[Field Group ▼]

Outcome Destination Type
Application

[Save] — 3702

Rule Properties

Name
Determine Next Outcome

Description
Determines what outcomes should be selected

Expression Name
IsClaimReadyToProcess

FIG. 37

| Home | Data Dictionary | Action Points | Page Designer | Reference Data | Inventory | Search |

Home >> BreadCrumb1 >> Breadcrumb2

Desktop
- + Alerts
- + Archive Claims
- + Claim Contracts
- − Claim Details
  - Application Behavior Action Point 1
  - Application Behavior Action Point 2
  - Display Action Point 1
  - Display Action Point 2
  - Navigation Action Point 1
  - Navigation Action Point 2
  - Validation Action Point 1
  - Validation Action Point 2
- + Claim Group
- + File Notes
- + Forms and Correspondence
- + Policy
- + Task

New Outcome                                              3802        [ Save ]

▽ Properties

*Name
[            ]

*Application Classification     *Component Classification
[ Global ▾ ]                    [ Standard ▾ ]

*Outcome Type
[ Select Value ▾ ]

Description
Outputs selected data to application

*Effective Date                 *Expiration Date
[ Defaults to current date 📅 ] [ Defaults to system max date 📅 ]

▽ Configuration

*Data Source        *Data Object Name      *Field Value to Return
[ Field Group ▾ ]   [ SaveClaim ▾ ]        [ Claim Status ▾ ]

Outcome Destination Type
Application

Rule Properties

Name
Determine Next Outcome

Description
Determines what outcomes should be selected

Expression Name
IsClaimReadyToProcess

FIG. 38

| Home | Data Dictionary | Action Points | Page Designer | Reference Data | Inventory | Search |

Home >> BreadCrumb1 >> Breadcrumb2

Desktop
- + Alerts
- + Archive Claims
- + Claim Contracts
- − Claim Details
  - Application Behavior Action Point 1
  - Application Behavior Action Point 2
  - Display Action Point 1
  - Display Action Point 2
  - Navigation Action Point 1
  - Navigation Action Point 2
  - Validation Action Point 1
  - Validation Action Point 2
- + Claim Group
- + File Notes
- + Forms and Correspondence
- + Policy
- + Task

New Outcome                                3902            Save

▷ Properties

*Application Classification    *Component Classification
[Global ▾]                     [Standard ▾]

*Outcome Type
[Select Value ▾]

Description
Outputs selected data to application

*Effective Date                *Expiration Date
[Defaults to current date 📅]  [Defaults to system max date 📅]

▷ Configuration

*Data Source         Enter Value
[Free Text ▾]        [                    ]

Outcome Destination Type
Application

3904

Rule Properties

Name
Determine Next Outcome

Description
Determines what outcomes should be selected

Expression Name
IsClaimReadyToProcess

| Home | Data Dictionary | Action Points | Page Designer | Reference Data | Inventory | Search |

Home>> BreadCrumb1 >> Breadcrumb2

Desktop
+ Alerts
+ Archive Claims
+ Claim Contracts
− Claim Details
   Application Behavior Action Point 1
   Application Behavior Action Point 2
   Display Action Point 1
   Display Action Point 2
   Navigation Action Point 1
   Navigation Action Point 2
   Validation Action Point 1
   Validation Action Point 2
+ Claim Group
+ File Notes
+ Forms and Correspondence
+ Policy
+ Task

New Outcome

▷ Properties

*Name

*Application Classification   *Component Classification
[Global ▾]   [Standard ▾]

*Outcome Type
[Stop Processing of Action Point ▾]

Description
Stops all processing of action point. Output will be returned.

*Effective Date    *Expiration Date
[Defaults to current date]   [Defaults to system max date] — 4104

[Save] — 4102

▷ Configuration
No configuration for this outcome type

Rule Properties
Name
Determine Next Outcome
Description
Determines what outcomes should be selected
Expression Name
IsClaimReadyToProcess

| Home | Data Dictionary | Action Points | Page Designer | Reference Data | Inventory | Search |

Desktop

Home >> BreadCrumb1 >> Breadcrumb2

- + Alerts
- + Archive Claims
- + Claim Contracts
- − Claim Details
  - Application Behavior Action Point 1
  - Application Behavior Action Point 2
  - Display Action Point 1
  - Display Action Point 2
  - Navigation Action Point 1
  - Navigation Action Point 2
  - Validation Action Point 1
  - Validation Action Point 2
- + Claim Group
- + File Notes
- + Forms and Correspondence
- + Policy
- + Task

New Action

▽ Properties

*Name
[          ]

*Application Classification    *Component Classification
[ Global  ▾ ]                  [ Standard ▾ ]

*Action Type
[ Select ▾ ]  — 4302

Description
Action type not selected

*Effective Date              *Expiration Date
[ Defaults to current date ] [ Defaults to system max date ]

▷ Configuration

Select an outcome type to allow configuration

[ Save ]

Action Point Properties

Name
Validation Action Point 1

Description
Save Claim Details Validation

Type
Business Service

Output
None

| Home | Data Dictionary | Action Points | Page Designer | Reference Data | Inventory | Search |

Home >> BreadCrumb1 >> Breadcrumb2

Desktop
- + Alerts
- + Archive Claims
- + Claim Contracts
- − Claim Details
  - Application Behavior Action Point 1
  - Application Behavior Action Point 2
  - Display Action Point 1
  - Display Action Point 2
  - Navigation Action Point 1
  - Navigation Action Point 2
  - Validation Action Point 1
  - Validation Action Point 2
- + Claim Group
- + File Notes
- + Forms and Correspondence
- + Policy
- + Task

Outcome                                                              4402

▷ Properties

*Application Classification    *Component Classification
[Global ▽]                     [Standard ▽]

*Outcome Type
[Enable Edit for Field ▽]      — 4404

Description
Enables the field for edit from the page

*Effective Date                *Expiration Date
[Defaults to current date 📅]  [Defaults to system max date 📅]

[Save]

▷ Configuration

Select the extended field to configure

*Data Source
[Select ▽]

Rule Properties

Name
Determine Next Outcome

Description
Determines what outcomes should be selected

Expression Name
IsClaimWorkersCompensation

☐ Select Existing Message

Please select the Search criteria you wish to use and then run the search.
Once you have selected the message you wish to use, click the Continue button.
To return the previous page without adding message, click the Close button.

I'm Looking For...    Messages
    Where    Message
    Contains    [Date injured] — 4502

[🔍 search]

Message Text

⦿ Date Injured cannot be before claim loss date
○ This is another error message
○ This is another error message
○ This is another error message 4504 —[ Continue ]     4506 —[ Close ]

EXPRESSION EDITOR TOOL

RELATED APPLICATIONS

This application claims priority to U.S. Provisional Patent Application Ser. No. 61/470,265, filed Mar. 31, 2011, which is also incorporated herein by reference in its entirety.

TECHNICAL FIELD

This disclosure relates to an application development tool. More specifically, this disclosure relates an expression editor tool that allows a user to build a rule that specifies an action programmed to occur during execution of a target application.

BACKGROUND INFORMATION

Explosive growth in digital processing technology has led to the ubiquitous presence of applications of every kind running on an immense spectrum of devices. Unfortunately, organizations do not have the application tools to effectively manage and/or leverage existing or newly developed applications. Current application development and management tools do not allow users to modify or create different outcomes for target application without expensive software development efforts. An expression editor tool allows a user to build a rule that specifies an action that may occur during execution of a target application.

Application development and maintenance professionals spend considerable time and effort to analyze a target application before modifying the logic of the target application to produce a different action or outcome. In addition, available tools do not provide an easy way to confirm the context in which an action may occur and the variables available in the context, during execution of the target application so that a proper new action or outcome may be implemented efficiently.

A need exists to solve this problem and others previously experienced with application design.

SUMMARY

An expression editor tool allows a user to build a rule that specifies an action that may occur during execution of a target application. The expression editor tool is implemented using a computer system (i.e., the expression editor system) that includes a computer memory operable to store the expression editor tool, and a database operable to store an action point definition that includes an action point identifier that specifies an action point located in application program code of the target application. The expression editor system includes a processor in communication with the memory and the database. The processor is operable to read the action point definition from the database, determine from the action point definition a dataset that is in-context at the action point in the application program code, and execute the expression editor tool. The expression editor tool is operable to display an expression definition interface that includes data source selectors for obtaining selected data fields from among the dataset, and an operator selector for obtaining a selected logical operator to connect the selected data fields. The expression editor tool is operable to construct a new expression from the selected data fields and the selected logical operator, display an outcome selection interface that includes an outcome selector for obtaining a selected outcome for the new expression, create a rule that includes the new expression and the selected outcome, and store the rule in the database linked to the action point definition.

Other systems, methods, features and advantages may be, or may become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

FIGS. 3A and 3B show an example of the expression editor 'define calculations' page.

FIGS. 8A and 8B show examples of the 'define single expressions' page.

FIG. 13 shows an example result of a group selection with items selected.

FIG. 14 shows another example result of a group selection with items selected.

FIG. 15 shows another example result of a group selection with items selected.

FIG. 16 shows another example result of a group selection with items selected.

FIG. 17 shows an example that illustrates the use of the expression editor to create an expression for a page action point.

FIG. 19 shows an example of the 'action point' details with output.

FIG. 23 shows example of an action point page for a browser side action.

FIGS. 25A and 25B shows example editing of an existing rule.

FIG. 26 shows an example of a 'new rule' page.

FIGS. 27A and 27B show an example of an action page with a Get Expression Result activity selected.

FIGS. 28A and 28B show an example of an action page with a Get Calculation Result selected.

FIG. 29 shows an example of an outcome page with Add Error or Warning Message selected.

FIGS. 30A and 30B an example of an action page with the 'Publish An Event' activity selected with no event selected.

FIGS. 31A and 31B shows an example of an action page with 'Publish An Event' selected and the Entity ID specified.

FIGS. 32A and 32B show an example of an action page with 'Publish An Event' selected and the event selected has no associated level.

FIG. 33 shows an example an outcome page with Send an Email selected.

FIG. 34 shows an example of an outcome page with Assign Value to a Custom Data Field selected.

FIG. 36 shows an example of Outcome-RTNCATKEY.

FIG. 37 shows an example of an outcome page with Select Value selected.

FIG. 38 shows an example of Outcome-RTNCNTXT-output non-group type.

FIG. 39 shows an example of an outcome page with Select Value selected.

FIG. 40 shows an example of an outcome page with Select Value selected.

FIG. 41 shows an example of an outcome page with Stop Processing of Action Point selected.

FIG. 42 shows an example of an action/outcome page.

FIG. 43 shows another example of an action/outcome page.

FIG. 44 shows an example of an outcome page.

FIG. 45 shows an example of the scoped search overlay.

FIG. 46 shows an example of Add/Modify Variable Overlay.

DETAILED DESCRIPTION

Figure 1:
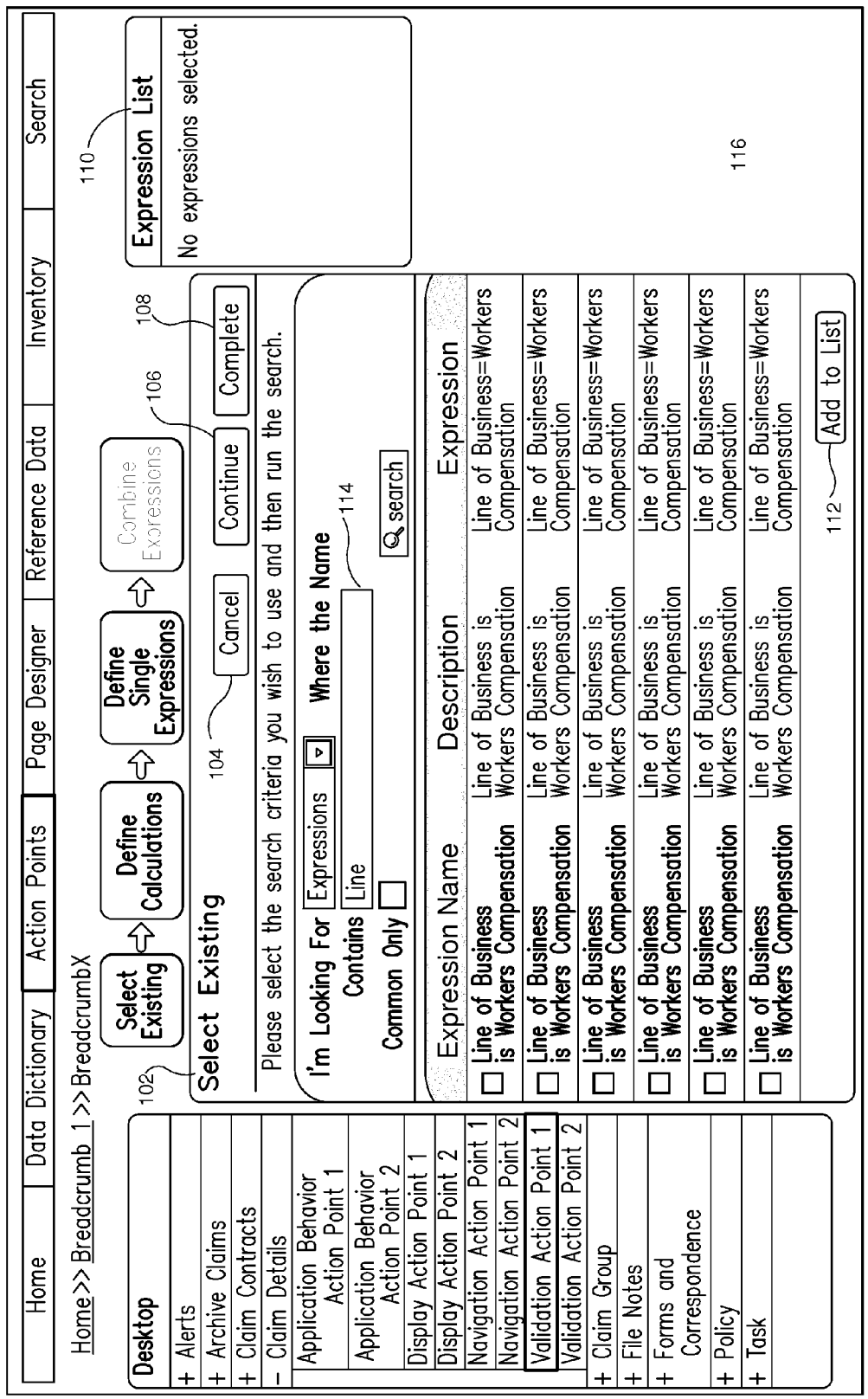
FIG. 1 shows an example of an expression editor 'select existing' page with search criteria and corresponding results for existing expressions.

The expression editor tool allows a user to build a rule that specifies an action programmed to occur during execution of a target application. The expression editor tool is implemented using a computer system (i.e., the expression editor system) that includes a computer memory operable to store the expression editor tool, and a database operable to store an action point definition that includes an action point identifier that specifies an action point located in application program code of the target application. The expression editor system includes a processor in communication with the memory and the database. The processor is operable to read the action point definition from the database, determine from the action point definition a dataset that is in-context at the action point in the application program code, and execute the expression editor tool. The expression editor tool is operable to display an expression definition interface that includes data source selectors for obtaining selected data fields from among the dataset, and an operator selector for obtaining a selected logical operator to connect the selected data fields. The expression editor tool is operable to construct a new expression from the selected data fields and the selected logical operator, display an outcome selection interface that includes an outcome selector for obtaining a selected outcome for the new expression, create a rule that includes the new expression and the selected outcome, and store the rule in the database linked to the action point definition.

The expression editor tool allows a user, also referred to as a configurator, to build an expression in the context of an action point. The expression editor uses a set of navigable pages and a scoped search overlay (e.g., searchable fields) designed to allow the configurator to view and edit expressions and calculations. Expressions and calculations can be re-used and expressions and calculations may be viewed or edited in the context of a specific action point. An action point is a point in the logic of an application where an event occurs. An application developer inserts action points and definitions of action points into a data model, along with definitional metadata, for a target application that the developer intends to create or modify expressions for by using the expression editor. The developer may include an action point call in the target application code similar to a function call that specifies the action point unique identifier. Additionally, although the expressions and calculations are displayed the same to the configurator, expressions and calculations are created to either run on a server or on a browser, based on the related action point. An expression may be a named set of one-to-many conditions which evaluate to true or false. The configurator uses the expressions to drive application behaviors, for example, showing and hiding custom data fields on a page, creating events, or other outcomes. The configurator may assign the output of the expression as the output of the action point.

For a particular action point, a set of data is in context and defined in the database. Given a particular context, only certain fields of an application may be useable at certain action points, and the expression editor may constrain the user to a meaningful set of variables and guide the user logically through user enterable fields so that the user may define or modify expressions for a target application. Expressions are created using the expression editor. The expression is always in the context of a particular "action point". An action point is a point in an application where one or more expressions are evaluated. Each action point has a set of data "in context," which can be requested and then set up through a database. When an expression is created, the data that is in context for the action point is available. Logical operators defined in the expression depend on the 'field' value selected. For example, if the field is of "business data type" number, then the available operators are greater than, less than, greater or equal to, less than or equal to, equal, and not equal. For the remaining business data types, the available operators are equal and not equal. An expression may be expressed as <Field><logical operator><value>. Using the expression editor, two or more of expressions may be combined into a "combined expression". A user may define expressions by selecting different data sources such as another expression or function. The expression editor defines functions as another form of evaluating data, such as count numbered of items in a list, does the list contains, and get sum of items in the list. When the user selects a function, the user then selects the list to evaluate and the selection replaces the value of <Field> in the structure of the expression: <Field><logical operator><value>.

Action points determine the variables that are available for use in an expression. An action point is a point in the application programming logic where an event occurs (e.g., where one or more expressions may be evaluated). Examples of action points include configuring how and/or when a web page appears, how Graphical User Interface (GUI) elements appear, or some other action. Action points are points in the logic of the application where rules are evaluated. The rules may relate to anything, for example, the selection of a GUI element. Because action points are tightly coupled to the application, action points may not be created in the console of the expression editor in some implementations.

During coding, the developer may specify an action point that is invoked, for example by the click of a button on a particular user interface screen. The action point is specified by a unique identifier, which is a primary key for the action point in the database. Each unique identifier identifies a link between a point in the programming logic (code) and an action point. For example, the user may want to invoke action point 'validation action point' that is linked to a corresponding unique action point identifier and action point record with the action point description 'validation action point' in the database, along with corresponding metadata, (e.g., name, description, data in context, as well as other information about the action point). An action point call appears in the code similar to a function call that specifies the action point unique identifier.

The database definition of an action point is referred to as an extension point in the action point expression framework (AEF) database. In order to define the data available to the user, the expression editor provides an extension point input table (e.g., EXTPT_INPT) that allows the user to define an extension point, a data item for each of the application fields and data objects linked to the action point (expression). The EXTPT_INPT table associates action points to data items. The data item column of the EXTPT_INPT table is a reference to a data item table. The data item table stores data about all the data objects and fields in the application of interest. While the expression editor provides separate tables for associating data items to fields, the data item table stores all the raw unassociated data objects and fields.

In order to link an expression to an action point a rule is defined for the action point. A rule defines one or more outcomes that may happen when an expression valuates to true or false. For example, possible outcomes resulting from applying a rule include hiding a field, sending an email, invoking another action point, showing an error message, or populating a field.

The expression editor provides an 'edit existing rule—rule details' page that includes a summary of the expression incorporating the rule and the outcomes for the expression. The expression editor may present the rule summary to the user as read only. The rule summary shows a combination of the expression and the outcomes for the expression when the rule valuates to true. The expression section shows the expression, and when a user selects the expression (e.g., a hyperlink of the expression name) the expression editor navigates the user to the 'select existing' page and presents the expression to the user to edit.

The outcomes may evaluate to true or false (Boolean). A 'page action point' may include an outcome, one per page, executed when the corresponding application page is loaded. A 'show, hide, enable, and disable' action point may be called before a page is displayed, in order to configure the page, and the action point may have four possible outcome types, including show, hide, enable, and disable a page. A business service action point located in the application code may retrieve a result of a calculation, display an error message, invoke another action point, populate a field, send email, or perform a page navigation.

The expression editor provides an 'Add Outcome' page for a user to define outcomes for action points. Outcome types may be presented in a drop down selectable menu, based on the type of action point (e.g., page vs. business). The expression editor populates the configuration section of the action point page for an action point based on the outcome type corresponding to the action point.

The expression editor uses an EXPRSN table to store expressions, and all the information about the expression, while the actual expression may be stored in the T_EXPRSN_STMNT field as the actual syntax of the expression. The expression editor uses local tables to store information exposed to the user in the configuration console based on a local ID (e.g., English, US, French, FR), so that the expression editor displays the names of action points according to the local ID.

A calculation is a special case of an expression in which the conditions evaluate to a numeric value. The configurator normally uses calculations within the context of an expression to simplify the creation of a complex expression. For example, a calculation such as Total Financials for Line might add up specific field values related to financials for a line. The calculations may contain other calculations, but may not contain expressions. The configurator uses the output of a calculation in an expression. In some implementations, the configurator assigns the output of a calculation as the output of an action point.

The complexity of an expression can range from very simple (e.g., If Field 'A'>0) to very complex. The complexity of an expression can include calculations, numerous expressions, and conditions. In some cases, setting the order of the evaluation is important. The expression editor is designed to allow the configurator to support the full range of these requirements. The expression editor includes four pages that the user may navigate through in a wizard-like fashion or move around in the order that the pages are selected. The expression editor does not have to utilize all of the pages unless otherwise required by the user.

The fields, expressions, calculations and functions which are made available to a configurator in the edit or addition of an expression are limited to those fields that are considered available in "context" for that action point.

For a server side action point, data may be considered in context from three sources. The first source of context is the definition of the action point in the console database, and includes zero to many data items. Second, a data item or field may be considered in context because the data item or field was added to context by the configurator through the use of actions and outcomes. Finally, the context includes custom fields for which the context data from the two previous sources includes the key to the logical table. The context information is stored in the DATAITEM_TBL.

The "context" of a page (browser side) action point includes all of the standard fields associated with the page through the PAGE_CLS_CTRL table and all of the custom fields associated to display groups through the DSPLY_GRP_DATAITEM table. Date type fields may be unavailable to use in an expression created in the context of a page action point, even if the date is in context. Similarly, in one implementation, no calculations may be used in expressions for page action points.

To support more complicated expressions, the expression editor allows the configurator to build an expression list as the configurator traverses through the expression pages. The expression list displays as a portlet on the right for the 'select existing expressions' page, 'define calculations' page and Single Expression page. When the configurator has completed the expression list, the configurator uses the Combine Expressions page to name the expression list, order items on the expression list and save the expression list to the database. The configurator may also modify the order of the expression list and control the order of operation by using the Combine Expressions page. As mentioned previously, the configuration items made available to the configurator are based on the action point context.

The expression editor includes four pages including the 'select existing' page, the 'define calculations' page, the 'define single expressions' page, and the 'combine expressions' page. The 'select existing' page includes a scoped search of existing expressions, allowing the user to select one or more for inclusion. For all action points except page type, the 'select existing' page includes a scoped search of calculations, allowing the user to navigate to the 'define calculations' page to modify an existing calculation. The 'define calculations' page allows the user to create new calculations, and load the calculations into the expression editor in order to edit an existing calculation. The 'define calculations' page does not apply to page type (browser) action points. The 'define single expressions' page allows the user to create a new single expression. The expression may be named and saved as a re-usable expression or simply included in the expression list. The 'define single expressions' page contains an area for defining the left side of an expression, a combo box to select the logical operator, and another area for defining the right side of an expression. The 'define single expressions' page also contains an optional section to allow the configurator to name of the expression. A single expression contains one and only one logical operator. The right and left side of the expression can be made up of only one item, and thus does not include arithmetic operations. The configurator may include a calculation in the expression for the purpose of including arithmetic operations. Also, the 'define single expressions' page may be used to edit unnamed expressions of an expression the configurator is creating. The 'combine expressions' page applies only to expressions made up of more than one expression combined with logical operators. In order to control the order of operation, and remove selected expressions, the 'combine expressions' page allows the user to modify the properties of the expressions of a combination of expressions and the order of the expressions, and group (or ungroup) the expressions. The configurator may use links to allow the user to navigate to expressions to edit. Once the configurator completes the edits of an expression, the expression editor persists the expression to the database.

For the expression editor pages, wherever a calculation or expression is displayed, the calculation or expression is shown with the expression display name. The expression editor may use hover text to display the calculation or expression detail including detail at the field level. For example, the expression list may display "Is Claim Workers Comp" which is an expression display name. The hover text for that item might be "Claim. Claim Loss State='Nevada'". In another example, a calculation may be displayed on the grid as Calculation 1 on one line and Calculation 2 on a second line of the grid. The expression editor pages may display identically for browser-side and server-side expressions and calculations, except that functions may not be available for browser-side expressions or calculations. The expression editor may indicate to the configurator when functions are a valid data source, based on context information.

When the configurator navigates to an expression editor page to edit an existing expression, and more than one row is displayed in the expression list, the expression editor loads with the 'name selected list' page. The expression editor loads the 'single expression page, and prompts the user with a 'dirty flag' warning message if appropriate, when only one line is displayed in the expression list.

The expression is one of the two unique configuration items in which multiple "versions" of the same item may be stored in the database simultaneously. The EXPRSN_LCL table stores multiple versions of the same item using a primary key D_BEG in the EXPRSN_LCL table. The EXPRSN_LCL table stores the actual expression or calculation. Modifications to the data elements related to an expression or calculation (i.e., expression metadata) stored in the EXPRSN table may not be "versioned."

When the configurator modifies a calculation or expression, the configurator may modify the 'effective date' field in order to create a new "version" of the item. The 'effective date' may not be modified to before the current date or after the 'expiration date'. If the 'effective date' is modified, the previous "version" of the expression or calculation expires. The date used by the expression editor is set to one day less than the 'effective date' of the new item so that the expression editor prevents overlaps between the "versions".

The configurator may modify an expression, calculation, the description and/or display name of an expression or calculation. If the configurator does not modify the 'effective date' of the modification, the expression editor overlays the previous values of the expression, calculation, description and/or display name with the new modified values, and the expression editor may not make the previous values accessible.

In another example, the configurator may capture the previous values for an expression, calculation, display name, and description, and modify the 'effective date', and because the 'effective date' value is part of the primary key of the EXPRSN_LCL table, the expression editor creates a new database record for the newly entered data, and causes the existing row (database record) for the expression to expire. Thus, the database stores the previous expression, calculation, display name, and description values reusing the same N_EXPRSN_ID with a different 'effective date' value.

The expression editor allows the configurator to create multiple "versions" of an expression and/or a calculation in the future. For example, the configurator may create a database record in the EXPRSN_LCL table using dates Mar. 1, 2010 to Jun. 1, 2010 and another record using Jun. 2, 2010 to 'max' date, as long as the effective dates otherwise follow other stated business rules.

The expression editor includes rules to determine when to display a 'dirty flag' warning. The 'dirty flag' warning is a status indicator that indicates to the configurator that the expression editor has pending changes (unpersisted) that have not been persisted to the database and the user may be about to perform an operation that may cause those unpersisted changes to be lost. The rules to determine when to display a 'dirty flag' warning may be more complicated for the expression editor to perform. For example, because the four pages of the expression editor may function as an application wizard, standard architecture tools may be inadequate to assist in making the 'dirty flag' warning determination. The expression editor may include programming logic coded to work in coordination with various database architecture tools that manage the commit and rollback functions (i.e., functions that identify persisted and unpersisted data), so that the expression editor may properly determine when to set the status of a page to "dirty" and issue a 'dirty flag' warning.

The expression editor uses the term "dirty" to identify a new expression that has not been added to database yet, when one of the following conditions is met: 1) an item is added to the 'selected list'; and 2) the page the user is on is dirty. The expression editor uses the term "dirty" to identify an existing expression, when one of the following conditions is met: 1) the combine expressions page is dirty; and 2) the page the user on is dirty. The expression editor prompts the user with the dirty warning message when the user clicks on and/or selects the 'cancel' button, links to another expression from the 'combine expressions' page, 'any bread crumb', 'secondary navigation on left', or 'primary navigation on top' and one of the following conditions is met: A) adding a "new" expression which has not been persisted to the database, and the page is dirty as defined below or any items (e.g., expressions) have been added to the selected list or B) editing an existing expression, and the page is dirty as defined below, an item has been added or removed from the selected list, or a modification has to the existing expression.

In one implementation, if both a single page is dirty and the expression editor is in a dirty state, then clearing the page level dirty flag may also clear the expression editor dirty flag. For example, if the user is on the 'define calculations' page of the expression editor, and the 'define calculations' page is dirty and the expression editor is also dirty because the user added 2 more expressions to the list, then if the user clicks the breadcrumb, the user is presented with a dirty flag. If the user clicks okay, both page level changes and expression editor changes may be discarded and/or lost.

An expression editor page may be defined as dirty when a user is on the 'select existing' expression page, and a search result item has been checked but the "Add To List" has not been clicked (selected), or when the user is on the 'define calculations' page and at least one field on the 'define calculations' page has been modified (e.g., including adding or removing items through the overlay). The "Drag and Drop" reordering feature of the expression editor may not create a dirty flag because drag-and-drop reordering is persisted separately to the database on the drop. The 'Define Single Expression' page may be defined as dirty when at least one field on the page has been modified through user interaction. The 'combine expressions' page may be defined as dirty when any expression has been added or removed from the 'selected list' on the page, or when at least one field on the page has been modified through user interaction. Selecting the 'complete' button does not create a dirty warning message.

Selecting the 'select existing' button of the expression editor, may cause a dirty flag to be created, if an expression is selected and the expression editor does not list any other expressions in the 'selected list', the expression editor returns the listed expression to the calling page. If one or more expressions are selected, and/or at least one other expression exists in the Selected List, the expression editor validates that the Combine Expressions data is complete. The expression editor otherwise provides errors and/or saves the data as appropriate. If the expression editor determines that the data is valid, the expression editor returns the expression to the calling page. If the expression editor determines that the Define Calculation page is dirty, the expression editor validates and saves the data on the page. If no expressions are in the expression list, the expression editor provides a warning indicating that no expression has been selected. If the expression editor shows an expression in the Selected List, the expression editor returns that expression to the calling page. If the more than one expression is in the Selected List, the expression editor validates that the Combined Expressions data is complete. The expression editor otherwise provides errors and/or saves the data as appropriate. If the expression editor determines that the expression data is valid, the expression editor returns that expression to the calling page. If the expression editor determines that the Define Single Expression page is dirty, the expression editor validates and saves the data on the page. If the expression editor shows no other expressions in the Selected List, the expression editor returns that expression to the calling page. If the expression editor shows at least one other expression in the Selected List, the expression editor adds the expression to the Selected List and validates that the Combined Expressions data is complete. The expression editor otherwise provides errors and/or saves the data as appropriate. If the expression is valid, the expression editor returns that expression to the calling page. If the expression is dirty, the expression editor validates whether the data is complete, and provides errors and/or saves the data as appropriate. If the expression is valid, the expression editor returns that expression to the calling page. Selecting the 'Continue' is configurable to either create or never create a dirty warning message. Selecting the Select Existing adds any selected expressions (check box is checked) to the Selected List. If the Define Calculation page is dirty, the expression editor validates and saves that calculation. If the Define Single Expression page is dirty, the expression editor validates and saves that calculation, and adds the expression to the Expression list if the expression has not already been added. Any of the 4 links to the expression editor pages: If the user clicks on the same page the user is already on (except for Combine Expressions), the expression editor may provide a dirty flag if that page is dirty as defined. If the user selects/clicks okay, the expression editor functions as follows for each page: The Select Existing, Define Calculation page may load as if for first time (not populated). The Define Single Expression may load with the page not populated, even if the first time loaded was editing a specific expression. Selecting the combine expressions page may not give a dirty flag, and the combine expressions page may load with all the fields unchanged. The data in the page may always be persisted. If the user clicks on a different page (except for Combine Expressions) the expression editor provides a dirty flag if that page is dirty as defined on the left for each page. The expression editor includes four pages including the 'select existing' page, the 'define calculations' page, the 'define single expressions' page, and the 'combine expressions' page that may cause dirty flag issues to arise during the user interactions for which the expression editor may use various techniques to address.

FIG. 1 shows an example of an expression editor user interface 100 'select existing' page 102 with search criteria 114 and corresponding results for existing expressions 116. The expression editor user interface 100 allows a user to define a scoped search that allows the user to identify one or more existing expressions from which to select. Once the user enters and/or selects search criteria 114 to identify one or more expressions, the expression editor retrieves the expressions search results 116 and displays the expressions selected in the selected expressions list 110 portal. If the user selects a single expression, the user may click or select the 'complete' button 108 to return to the calling page.

The expression editor allows the user to navigate between user selectable pages to create a new expression, and select and modify an existing expression. The combine expressions link is enabled when more than one selected expressions in the expression list. The expression editor user interface includes 'cancel' button 104, 'continue' button 106 and 'complete' button 108 function the same on each page, unless otherwise indicated by the expression editor 100. The complete button 108 validates that the configuration of an expression is complete. If the expression configuration is complete, the expression editor persists any un-persisted data and returns to the calling page with the expression. If an expression includes more than one item in the selected expression list 110, then the user may use the 'combine expressions' page to populate the expression property fields before the new expression is added to the repository of existing expressions. If a user clicks the 'complete' button 108 without first naming the expression, then the expression editor may prompt the user with the following error message, "Please provide a name for the expression." Similarly, if the user clicks the 'complete' button 108 when no item is listed in the expression list, the expression editor may prompt the user with the following error message, "Please either select at least one expression or click Cancel." If only one expression is displayed in the selected expression list and the expression is a named expression, then the expression editor returns the expression to the calling page. The 'continue' button navigates to the next enabled page within the expression editor, and cause the expression editor to persist un-persisted data. The 'cancel' button causes the expression editor to navigate back to the page that called the expression editor, and causes the expression editor to not persist un-persisted data, but does not cause the expression editor to roll back data that has already been saved. The expression list portal displays the named expressions and "snippets" (i.e., non-named single expressions) that have been selected for inclusion in the expression. The expression list portal also displays the logical operator associated with each expression. The expression list may be read-only and not include links to other expressions. A separate database table may be used in the configuration console database to support the functionality of expression list portal. The separate database table may include all expressions and calculations which can be processed by the expression editor console.

The 'add to list' button 112 when selected causes the expression editor to add selected expressions from the search results to the expression list. The 'add to list' button may not cause the expression editor to save data to the database or navigate to another page. The "AND" logical operator is the default logical operator between selected expressions. A user may select one or more expressions to add to the list. If the user clicks the "add to list" button and has not selected at least one item, the expression editor may prompt the user with the following error message: "You have not selected an expression to add to the selected list." The expression editor allows a user to remove an item from the selected list by navigating to the combine expressions page.

The scoped search 114 provided by the expression editor allows the user to search for existing expressions for which the fields are in context. The expression editor displays 'Expressions' as the default value for the "I'm looking for" combo box. The 'contains' text box allows the user to enter the name or part of the expression name. The 'common only' checkbox allows the user to search for expressions marked as common. When the user does not check 'common only' checkbox, the expression editor retrieves search results that include both common and non-common expressions. When the search results identify expressions that include the text as entered in the 'contains' text box, then the expression editor displays the expressions in the search results. The expression editor may not display a named expression in the search results that a user is currently editing. The expression editor limits the number of characters displayed in the 'expression' column to a configurable number, but the expression editor displays the entire expression when the user uses a pointing device to hover over the 'expression' of interest under the 'expression' column. The search results may not be dynamic, so that when the user changes the search criteria, the user clicks the 'search' button in order to execute a search based on the new criteria. If the expression editor does not identify expressions that match the criteria, the expression editor may prompt the user with the following message 'No Expressions match the criteria'. The user may invoke a series of searches in order to select multiple expressions. The expression editor uses uniform error messages across the application related to searches, such as the length of the field. When the expression editor loads in the context of a page (e.g., browser) type action point, the expression editor may limit the search results to expressions where EXPRSN.B_CLNT_EXPRSN is true.

Figure 2:
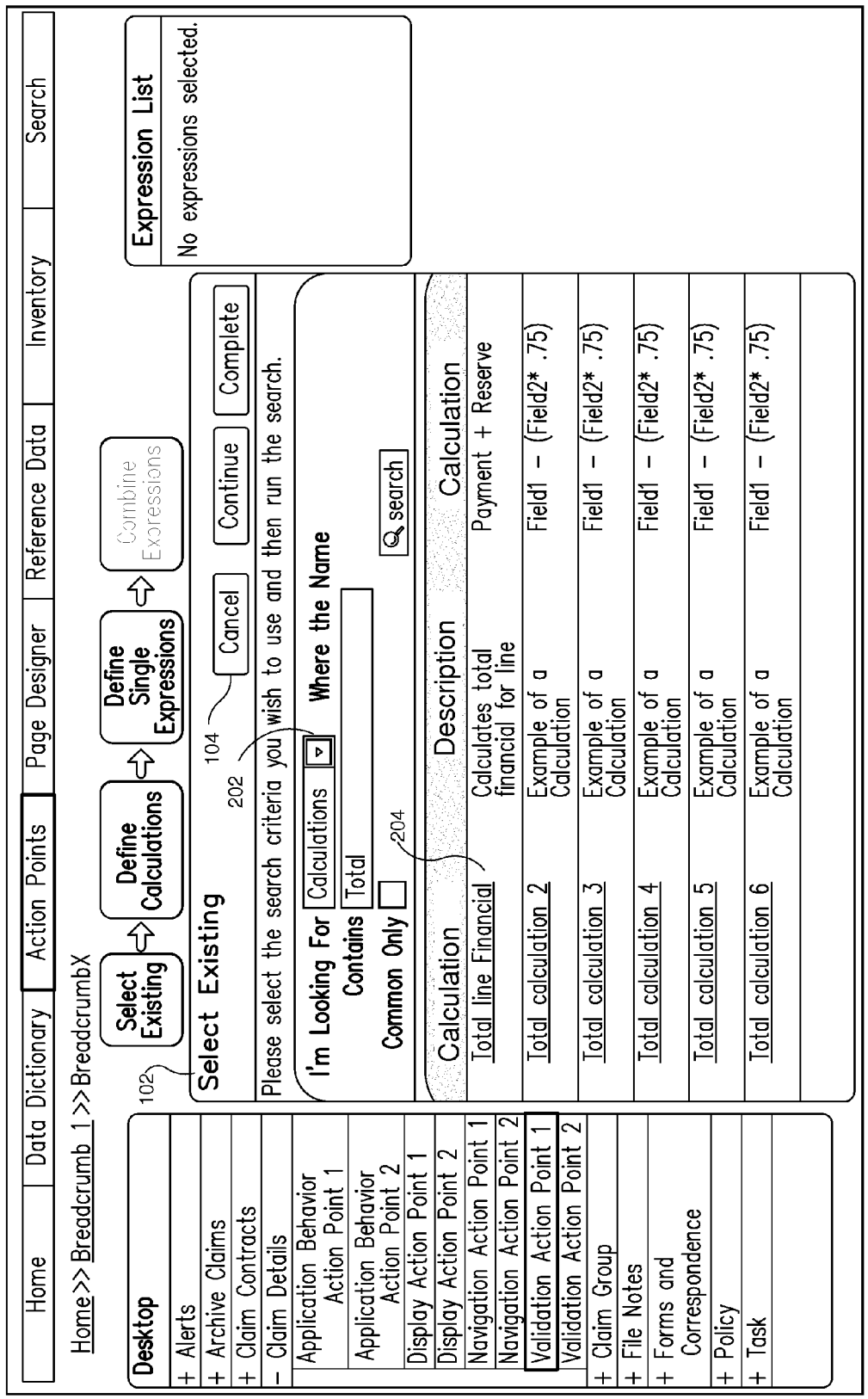
FIG. 2 shows an example of the expression editor 'select existing' page with search criteria and corresponding results for existing calculations.

FIG. 2 shows an example of the expression editor 'select existing' page 102 with search criteria 202 and corresponding results 204 for existing calculations. The scoped search provided by the expression editor allows the user to search for existing calculations for which the fields are in context. The 'contains' text box allows the user to enter the name or part of the expression name. When the search results identify expressions (calculations) that include the text as entered in the 'contains' text box, then the expression editor displays the expressions in the search results. The expression editor limits the number of characters displayed in the 'calculation' column to a configurable number, but the expression editor displays the entire expression when the user uses a pointing device to hover over the 'expression' of interest under the 'calculation' column. If no calculations exist that match the search criteria, the expression editor may prompt the user with the following message 'No Calculations match the search criteria'. The expression editor displays the calculation name as a link configured to navigate to the 'define calculations' page so that the user may edit the calculation. The 'cancel' button 104, 'continue' button, and 'complete' button function as previously described. The 'select existing' page 102 uses a scoped search 202 to retrieve a list of calculations 204 for which the action point context contains all of the fields in the calculation. The search results include a named link configured to cause the configurator to navigate to the 'define calculations' page to edit the selected calculation.

Figure 3A:
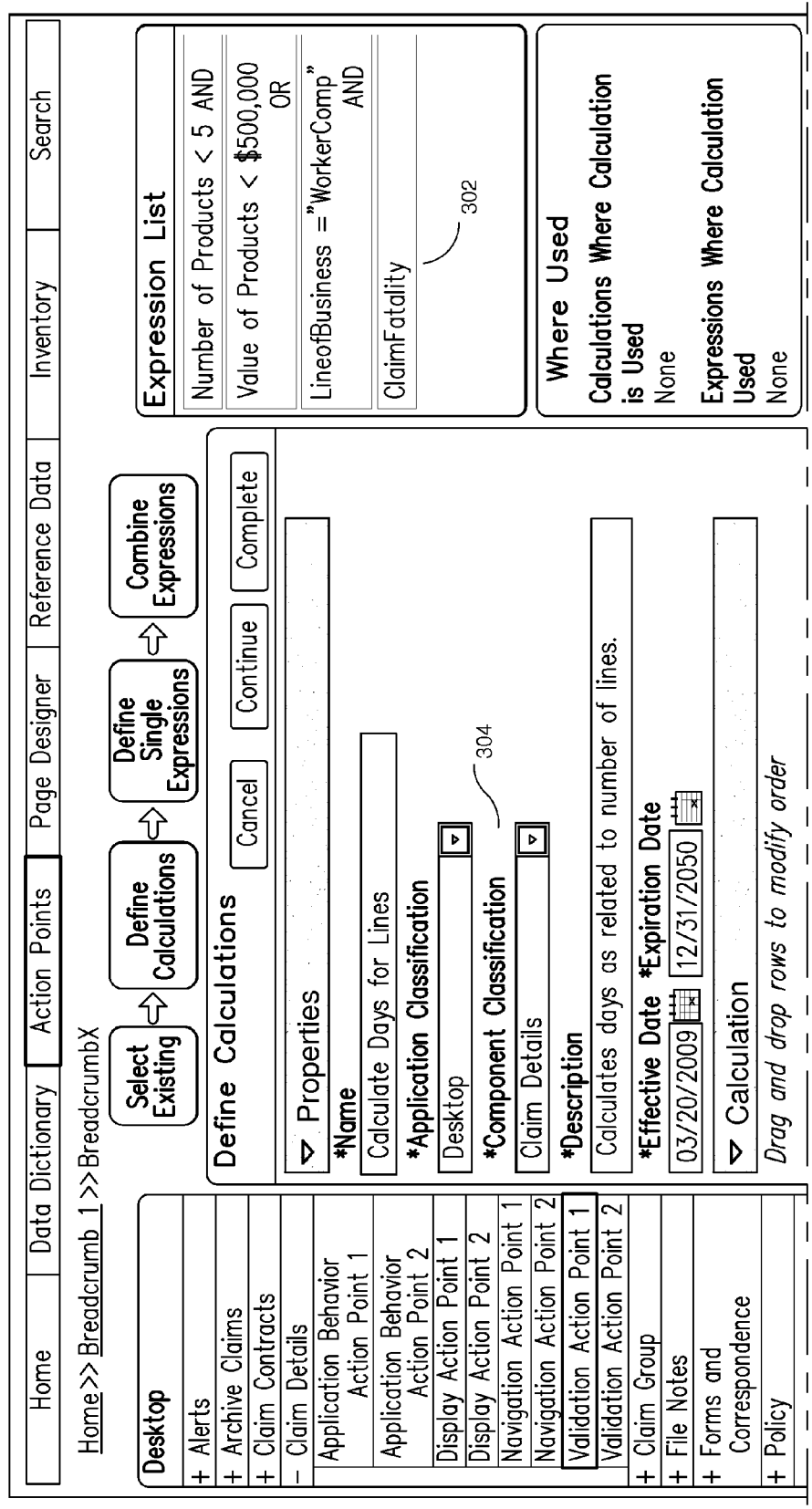

FIGS. 3A and 3B show an example of the expression editor 'define calculations' page 300. The 'define calculations' page 300 displays when the user edits an existing calculation. The 'define calculations' page allows the user to add or edit calculations to the database so that the calculations may be utilized as needed in the building of expressions 302 or other calculations. If the configurator does not need to create a calculation, the configurator may either click next to navigate to the Single Expression page or use the page navigation buttons to select a specific page. When the user clicks the 'define calculations' button, the expression editor validates the data, and, if valid, the data is persisted to the database. The 'define calculations' page reloads to allow the user to enter another calculation if needed. The expression editor may prompt the user to populate all of the fields in the Calculation Properties section 304. The 'define calculations' button loads a modal window 302 which may be used to select each item to be utilized in the calculation. Items may be selected, and once an item is selected, the item may be displayed in the grid with the arithmetic operator combo box in the right hand column and a check box to the left 310. The combo box may default to "Plus (+)" (e.g., the 'AND' operator). The order of the items can be changed by using drag and drop. The drag and drop feature may move all of the items included next to a single check box. The valid values for the arithmetic operator combinations include '+', '−', '/' and '*', and these values may be modified regardless of the position of the values in the grid.

The Group button nests the selected items, still in single lines, into the same line on the grid, in the same order. May use grids within a grid to capture groupings. When lines are grouped, the grid may modify so that only one check box displays next to the top line which is grouped. Lines do not have to be next to each other to be grouped, but when lines are grouped, the lines may be in the same order as displayed on the grid before being grouped. The group may appear in the same place as the top item grouped. For example, if the configurator clicked items 1 and 4 and clicked the Group button, the grid would reload with 3 check boxes, and the top checkbox may have a line with two lines nested in it.

The Ungroup button 314 may remove the first left parenthesis in the expression and the right parenthesis that corresponds to the first left parenthesis. From a grid perspective, the expression editor may un-nest what is combined into one checkbox and split what is combined into one checkbox into separate checkboxes. The Ungroup button may not completely ungroup all items. A user may receive an error message if the user clicks an item that is not grouped. the expression editor allows the user to check multiple checkboxes at the same time and click Ungroup button.

The Calculation Preview section 310 shows the calculation indicating order of operation through parenthesis and is view only. The expression editor may enclose grouped items in parenthesis. If items have been grouped multiple times, the items may appear as grid lines within another gridline in the Expression grid and may have multiple parentheses in the section. The define calculation page display may be refreshed whenever any change is made in the Calculation grid 310 above through the use of the Add 308, Remove 312, Group or Ungroup 314 buttons. The Where Used portal may display all expressions in the database which use the specific calculation which is being edited. The Where Used portal may also show all calculations which utilize the loaded calculation. If the user is creating a new calculation, the portal may be blank. The Calculation Versions section 318 default display is always closed, and the section displays the versions (including any future versions and the version the page is showing) of the calculation along with the effective and expiration dates. Editable versions (except the version the page is showing) may display in the list as a link. If a calculation includes the use of other calculations, the calculation may display in the grid with the names of those items. However, when the user hovers over the calculation in the grid, the expression editor may display the calculation in complete detail, down to the field level. When a new calculation is added 306, the define calculations page defaults to application classification and component classification of the action point 304. If the configurator edits an existing calculation, the expression editor displays search results from the database.

Figure 4A:
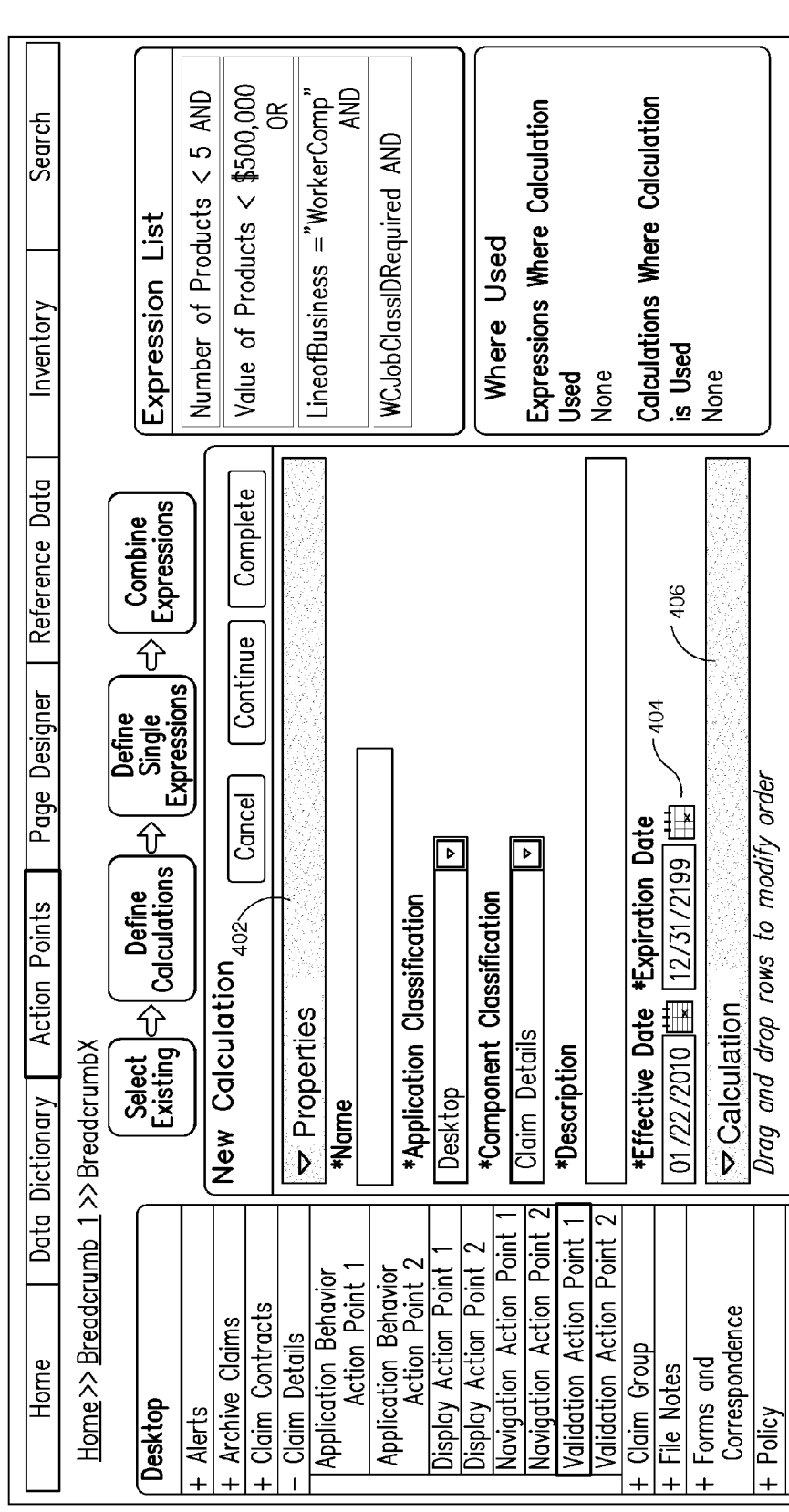
FIGS. 4A and 4B show an example of the expression editor 'define calculations' page for a new calculation.
Figure 4B:
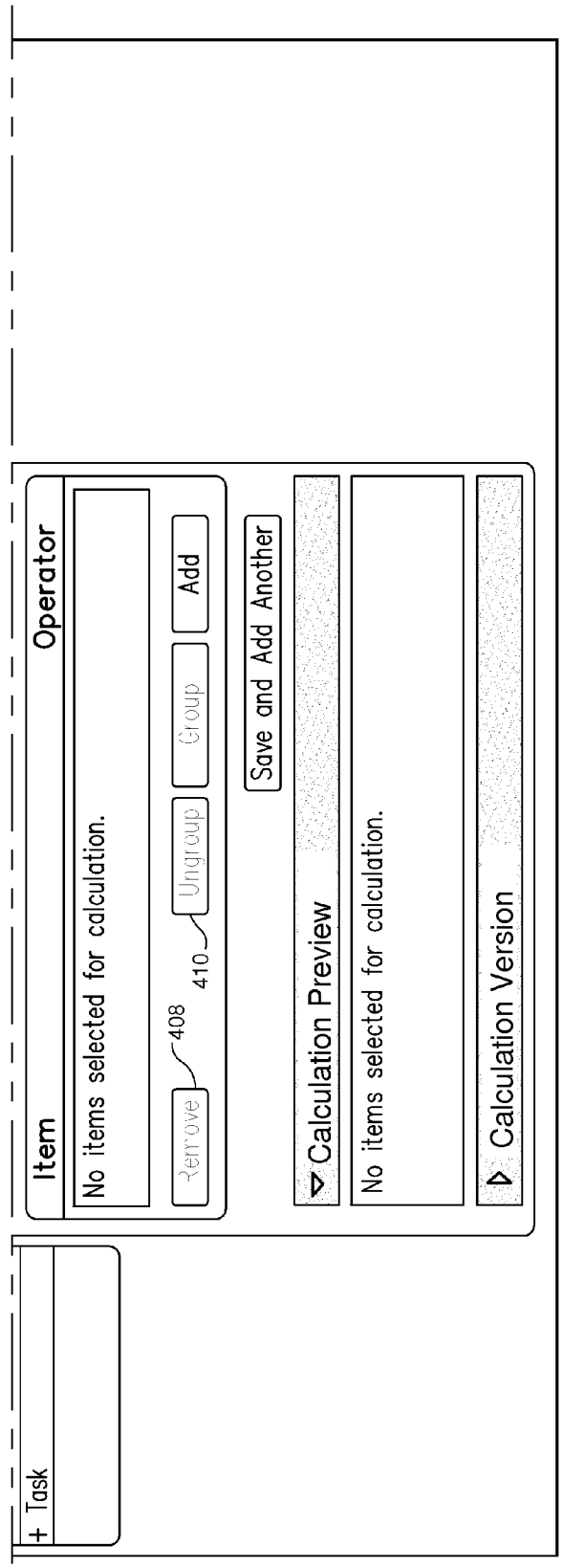

FIGS. 4A and 4B show an example of the expression editor 'define calculations' 400 page for a new calculation. The Properties section 402 may be defaulted to open when the page 400 loads. The 'effective date' is defaulted to current date and 'expiration date' is defaulted to max system date 404. The Calculation grid section 406 may be defaulted open when the page 400 loads. The expression editor defaults calculation versions to a closed status. The Remove button 408 may be disabled until one item is added. Once one item is added, the Remove button 408 may be enabled. The expression editor enables the Group and Ungroup buttons 410 when more than one row is populated in the grid. The expression editor displays the 'define calculations' page when the user clicks on the 'define calculations' page navigation button. The expression editor loads the 'define calculations' page in "add" mode to allow the user to add a new calculation. If the configurator does not create a calculation, the configurator may click Continue to navigate to the Single Expression page or use the page navigation buttons to select a specific page.

Figure 5:
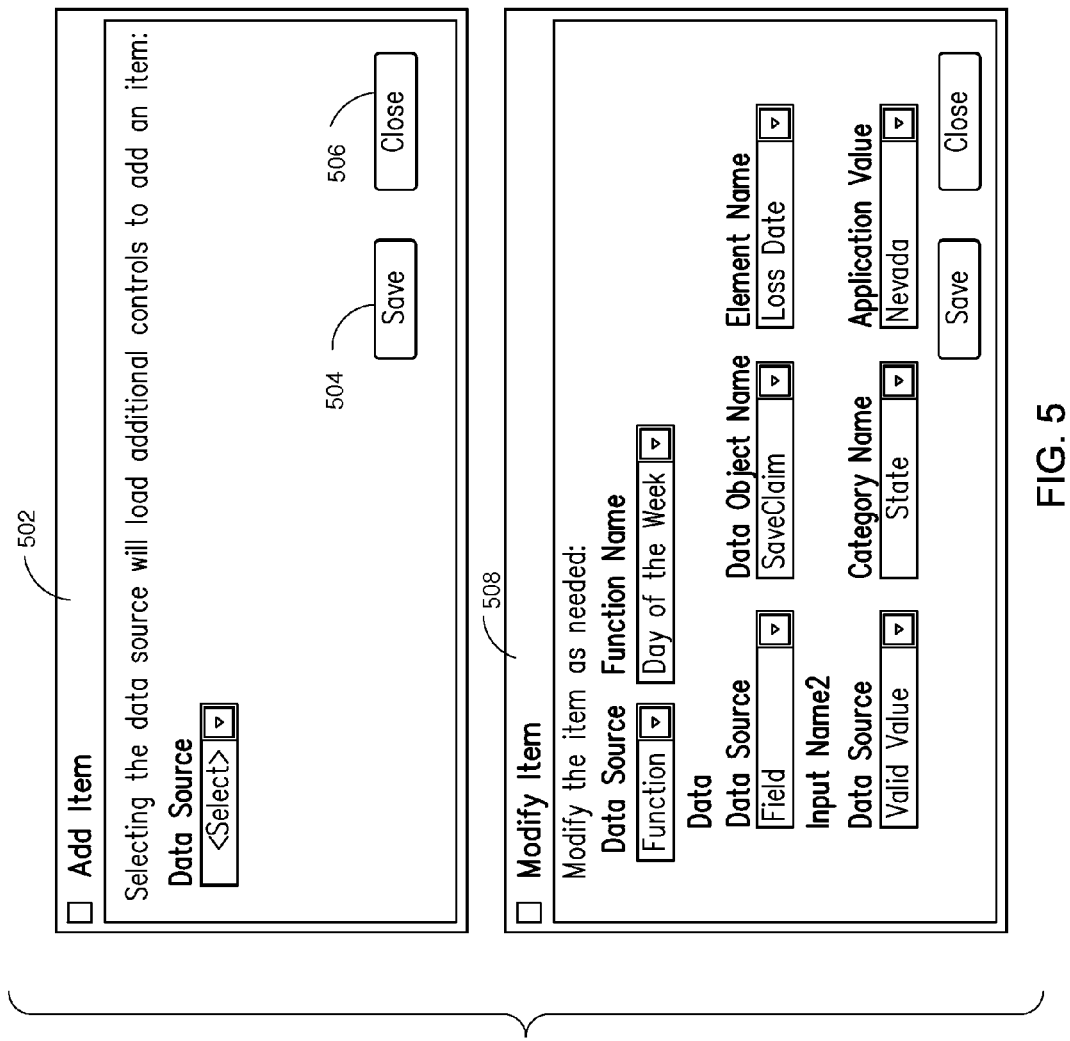
FIG. 5 shows an example of the 'define calculations' page 'add item overlay'.

FIG. 5 shows an example of the 'define calculations' page 'add item overlay' 502. The Add Item overlay 502 may display when the Add button 410 is clicked from the 'define calculations' 400 page. Based on the selection from the data source combo box, additional combo boxes or other controls may be displayed to allow the selection. The Save button 504 may not persist data to the database, but returns the selection to the appropriate grid location in the 'define calculations' 400 page. The Close button 506 provides a dirty flag if any selection has been (even partially) made but returns to the page without return any selection. The Modify Item overlay 508 allows the modification of the selected item which may display on the 'define calculations' 400 page. No date fields may be displayed if the 'define calculations' 400 page is loaded in the context of a page (BROWSER type) action point.

Figure 6:
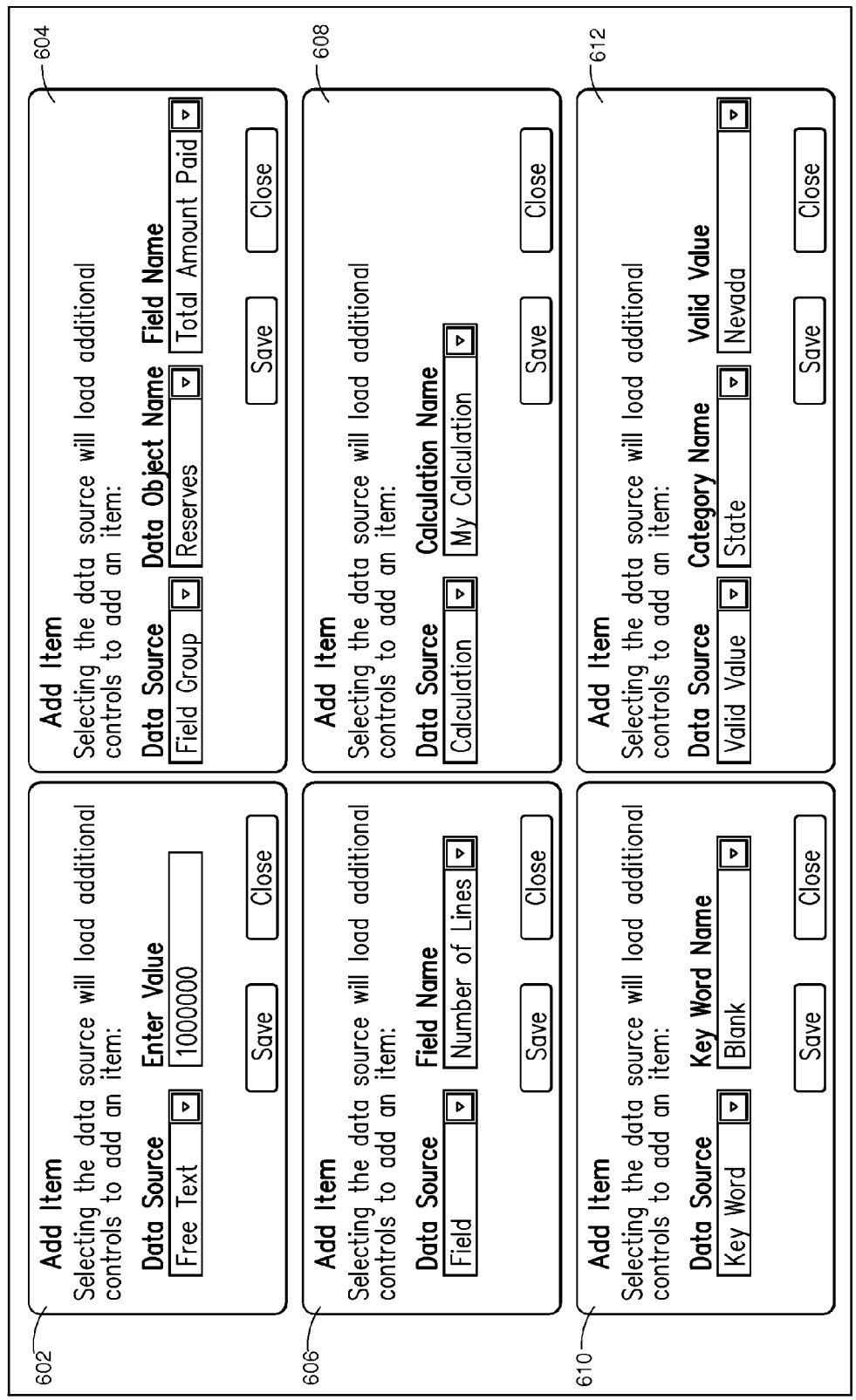
FIG. 6 shows examples of the 'define calculations' page 'item overlay' data sources.

FIG. 6 shows examples of the 'define calculations' page 'item overlay' data sources. The overlay allows the configurator to add or modify an item in the Calculation page. Based on the selection of the Data Source combo box, additional controls may display. Selecting the Free Text 602 data source may cause a text box to display with a mask based on the appropriate database type. The Free Text 602 data source may not be available as the first field. Selecting the Field Group 604 data source may cause a combo box to display with data objects as follows: 1) names of standard and business data objects (group type data items) which were specified as input to the action point, after selecting the specific data object, the user may select the element name; and 2) the group type variables that have been associated to the action point. After the user selects the specific data object, a combo box of the fields in the data object may be displayed (limited to numeric fields except as input to a function). Selecting the Field 606 data source may cause a combo box to display with the following fields (limited to numeric fields except as input to a function): 1) data items (standard or custom) specified as input to the Action Point, but specified on a field as opposed to the data object level; and 2) variables that have been associated with the action point which are not group type variables. Date fields may not be displayed if the expression editor is loaded in the context of a page (BROWSER type) action point. Selecting a Calculation 608 from the Data Source combo box, may cause the Calculation Name combo box to load. The Calculation Name combo box may contain all Calculations for which all of the fields of the calculation are in context. If the calculation utilizes a variable, the expression editor automatically associate that variable to the action point on the save, and displays a warning that indicates to the configurator to populate the variable. Once a calculation is selected, a link loads under the Calculation Name combo box, and clicking link provides the appropriate dirty flag and causes the expression editor to navigate to the 'define calculations' page with the calculation loaded. The Calculation may not be available if the expression editor is loaded in the context of a page (BROWSER type) action point. Selecting Key Word 610 from the Data Source combo box may cause the next combo box to display "Blank" (unless a function is being populate). The Key Word data source may not be available as the first field in an expression. The Valid Value 612 selection from the Data Source combo box is available as input to a function. After selecting Valid Value 612 from the Data Source combo box, the application category names load in the Category Name combo box. The configurator then may select the appropriate valid value from the Valid Value combo box.

Figure 7:
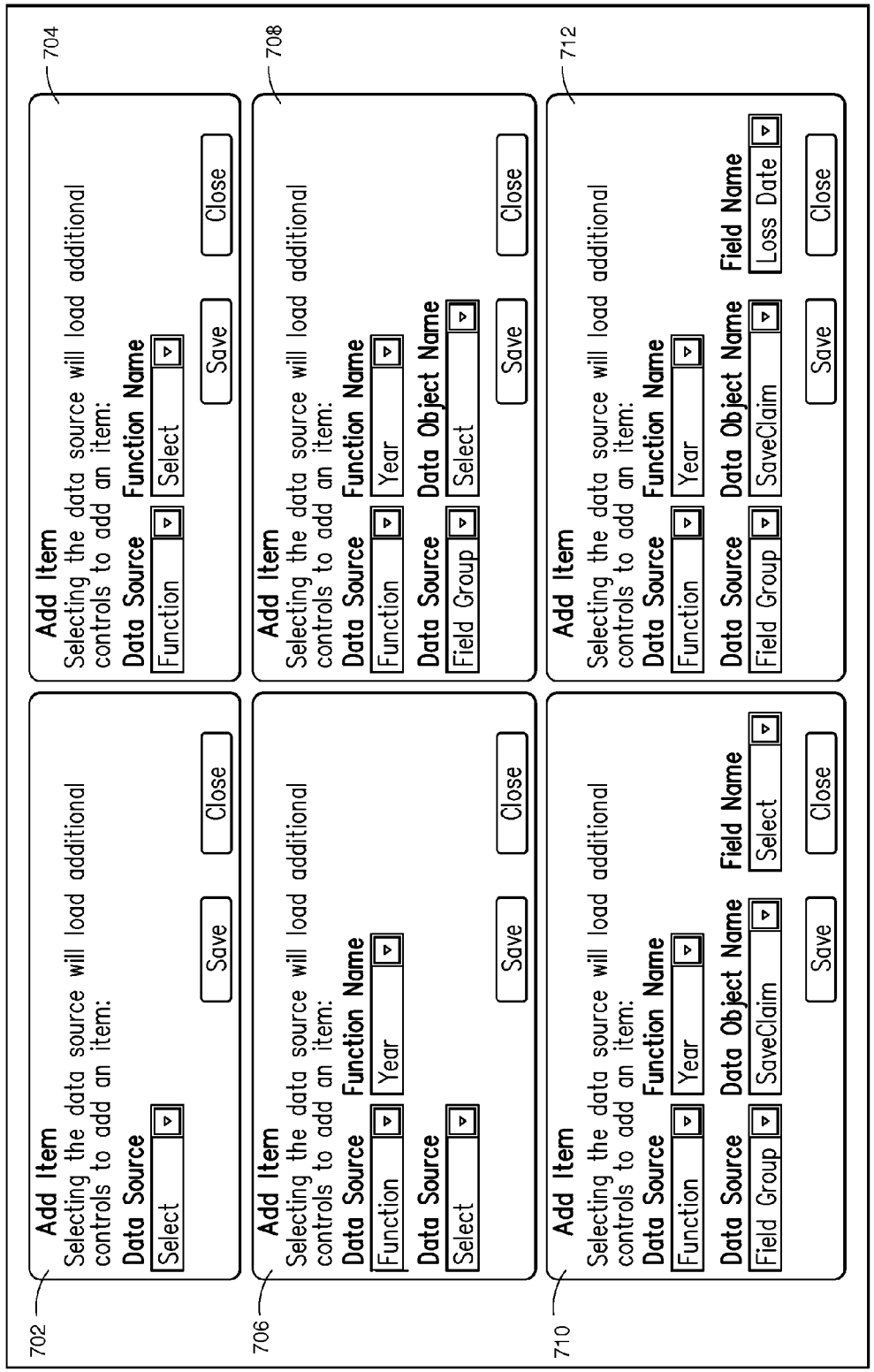
FIG. 7 shows examples of the 'define calculations' page 'item overlay' functions.

FIG. 7 shows examples of the 'define calculations' page 'item overlay' 700 functions. The 'define calculations' 400 page may depict the progression of the steps related to configuring a function for use in a calculation. If the configurator modifies an existing item, the page title displays as Modify Item instead of Add Item. Functions may not be available for expressions created for a page (BROWSER) type action point. The Item Overlay is used to populate each item on the grid in the 'define calculations' page. (Each item and the arithmetic operator for the item may be displayed on one line of the gird). The Item Overlay may display for configuring. The data types displayed in the bottom section of the single expression may be limited to the data type of the field selected in the top section or to the data types needed for the input to a function. Sections 702 and 704 display the configurator selecting Function from the Data Source combo box. When the Function Name combo box loads, the functions included may support the following constraints: 1) the expression editor determines whether at least one field exists in context matching the data type of each of the function inputs; and 2) each function defines a numeric output, and the input fields for the function do not have to be numeric. When the configurator selects a function 706, the expression editor generates additional lines under the function line which include the name of each input (from the function method signature in the database). The expression editor displays the Data Source (708, 710, and 712) combo box below each input name to allow the configurator to select the appropriate input. Based on the input data needed for the selected function, the configurator may then use the combo boxes to make the selection. The Data Source combo box includes fields, field groups, valid values, key words and free text. The expression editor prompts user selections to match the data type of the input fields for the function. For example, if the function is expecting an integer as the first input for the function, only integers may be offered for selection. Although the example above shows one input, the actual inputs may be deduced from the function definition in the database and may range from 0 to many inputs based on the function signature.

Figure 8A:
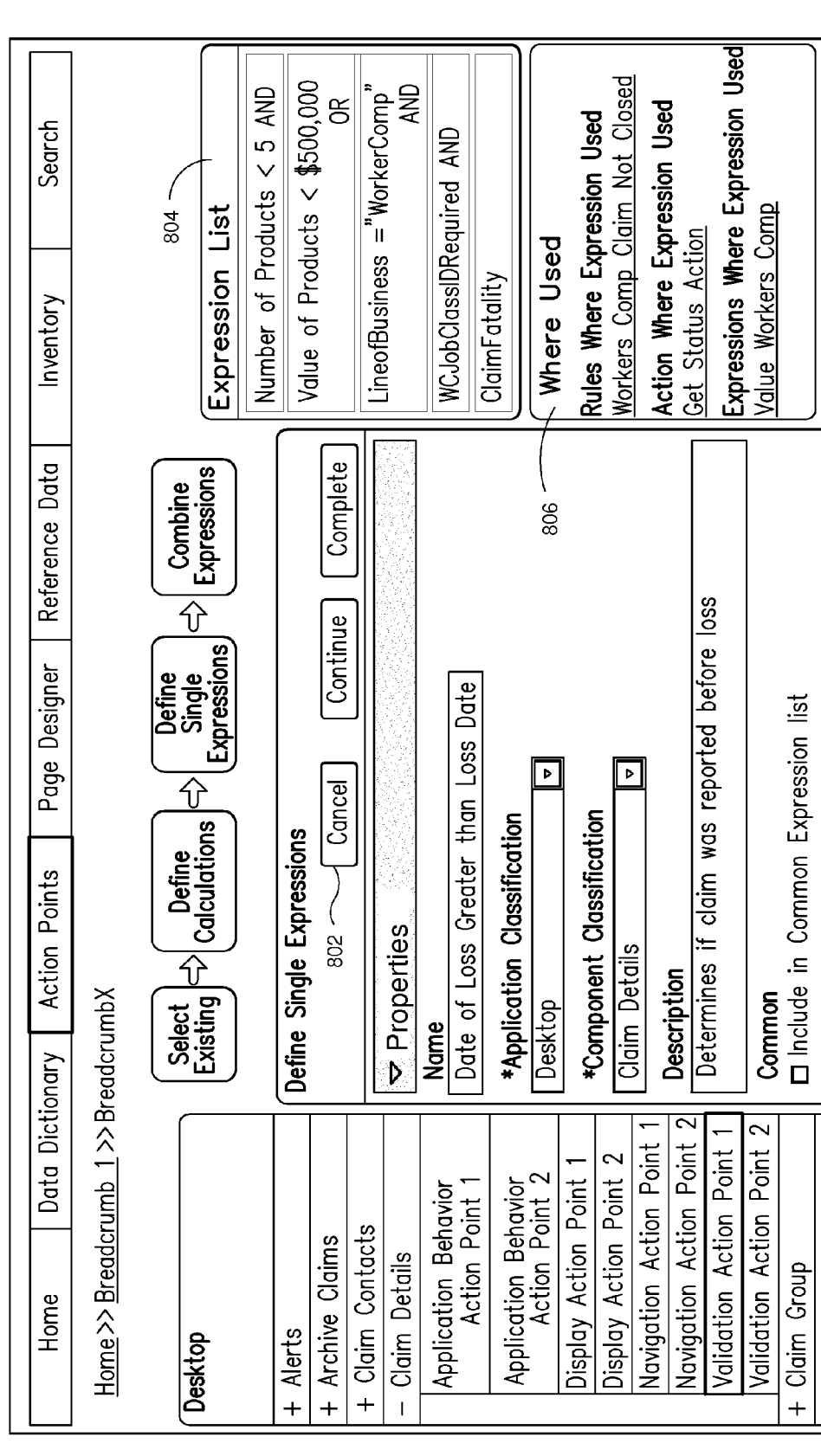
Figure 8B:
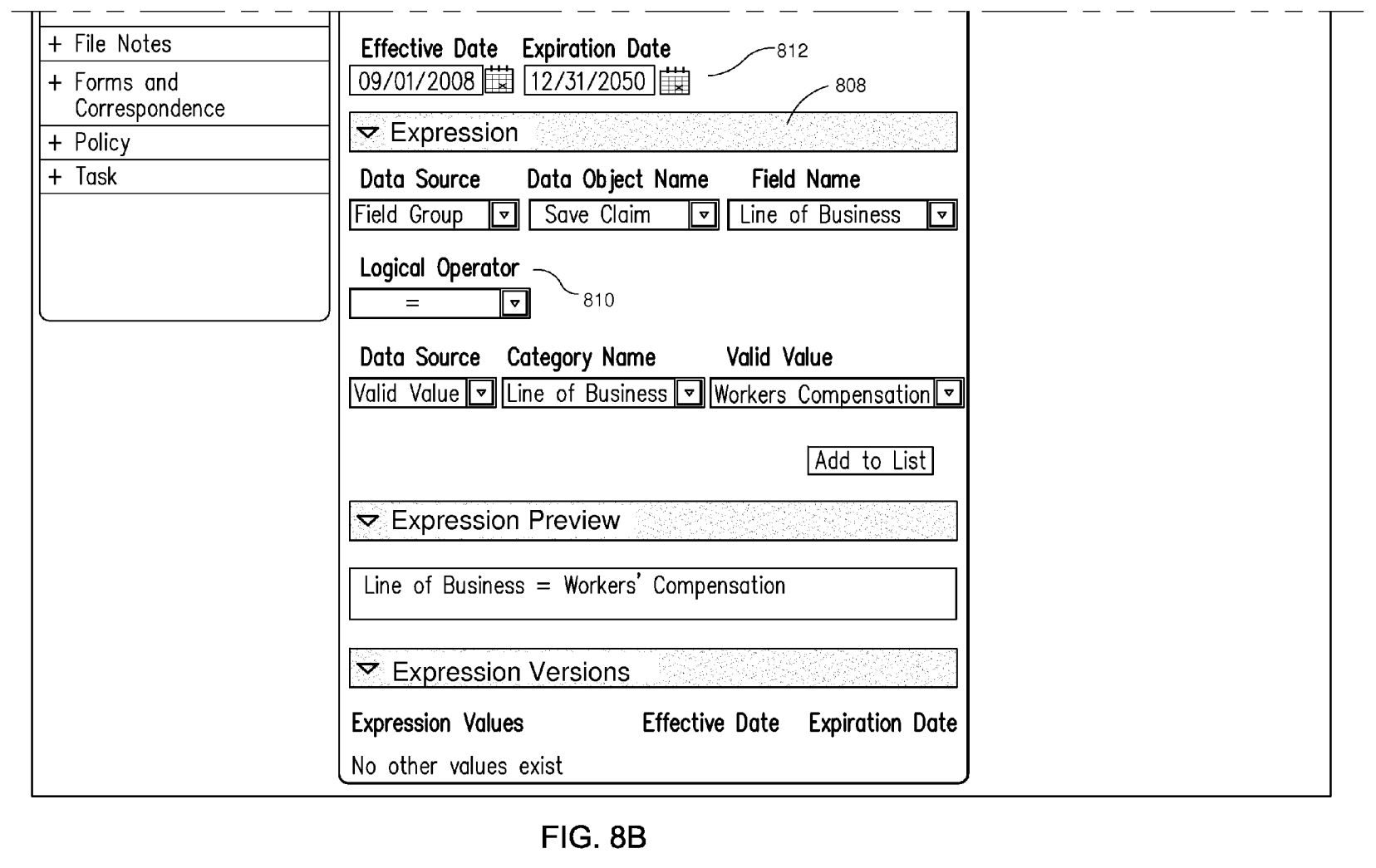

FIGS. 8A and 8B show examples of the 'define single expressions' page. FIGS. 8A and 8B depict the edit of an existing named expression using the 'define single expressions' page. An expression 804 may contain at least three items, including two items on the left and right of the logical operator and the logical operator. For example, Total Paid Amount>1,000,000. 1: For a single expression, the configurator can select one item on the left and right of the logical operator. The configurator may be presented initially with a combo box in the top section 808 of Data Sources, and the configurator may select the data to be included in the left side of the expression. Based on the selection of the data source 808, another combo box may display to allow the next selection. As the user makes a selection, the next control in the line is automatically generated. Each row in the grid may have the combo boxes necessary to display an item. A function may span multiple lines on the page: one for the function name and one line below for the each input item for the function. The combo boxes, includes applicable functions, calculations, fields, and expressions. A function spans multiple lines in the grid, including a line for the function name and a line for the each input item for the function. The combo boxes, includes applicable functions, calculations, fields, and expressions. The configurator selects the first item in order to enable the logical operator combo box and the combo box to specify the second item. The expression editor separates the two selections by a logical operator combo box, where those logical operators that apply based on the data selected may be enabled. Logical Operators 810 may always be displayed on the page. The expression editor enables the appropriate logical operators, when the user selects the preceding fields completely, and the data type selected drives the logical operators. When the user has completed the expression, the user may select the Add to List or Continue button 802 is clicked. if the user has populated any of the fields (except the dates) in the Named Expression section, then validation may occur to make sure that Name, Description and the Effective and expiration dates have been populated. Once the validation is complete, the expression is saved to database. If the expression is not named, the unnamed expression may be simply added to the Expression list. A warning may be display if the configurator edits an existing expression that is listed in the 'Where Used' portal. The 'effective date' may be defaulted to today's date and the 'expiration date' may be defaulted to a system max date 812. The 812 fields may be required if the user has populated any of the other fields in the Named Expression section. For named expressions 804, the Where Used 806 portal may display rules and expressions where the expression is used, if any exist. When displaying a non-named expression or a new expression, non-named expression or a new expression may be blank. Named and unnamed expressions may be added multiple times to the Expression list 804. To add an unnamed expression multiple times, the configurator adds the unnamed expression multiple times twice in the Single Expression page. An expression may be referred to using multiple names, but the decision to use multiple names to refer to an expression may be at the discretion of the configurator. If an unnamed expression is in the list multiple times and the configurator edits one of the unnamed expression listed multiple times in order to add a name, the expression editor updates the corresponding entry in the Expression list to show the name instead of the snippet, and other snippets may not be affected.

Figure 9:
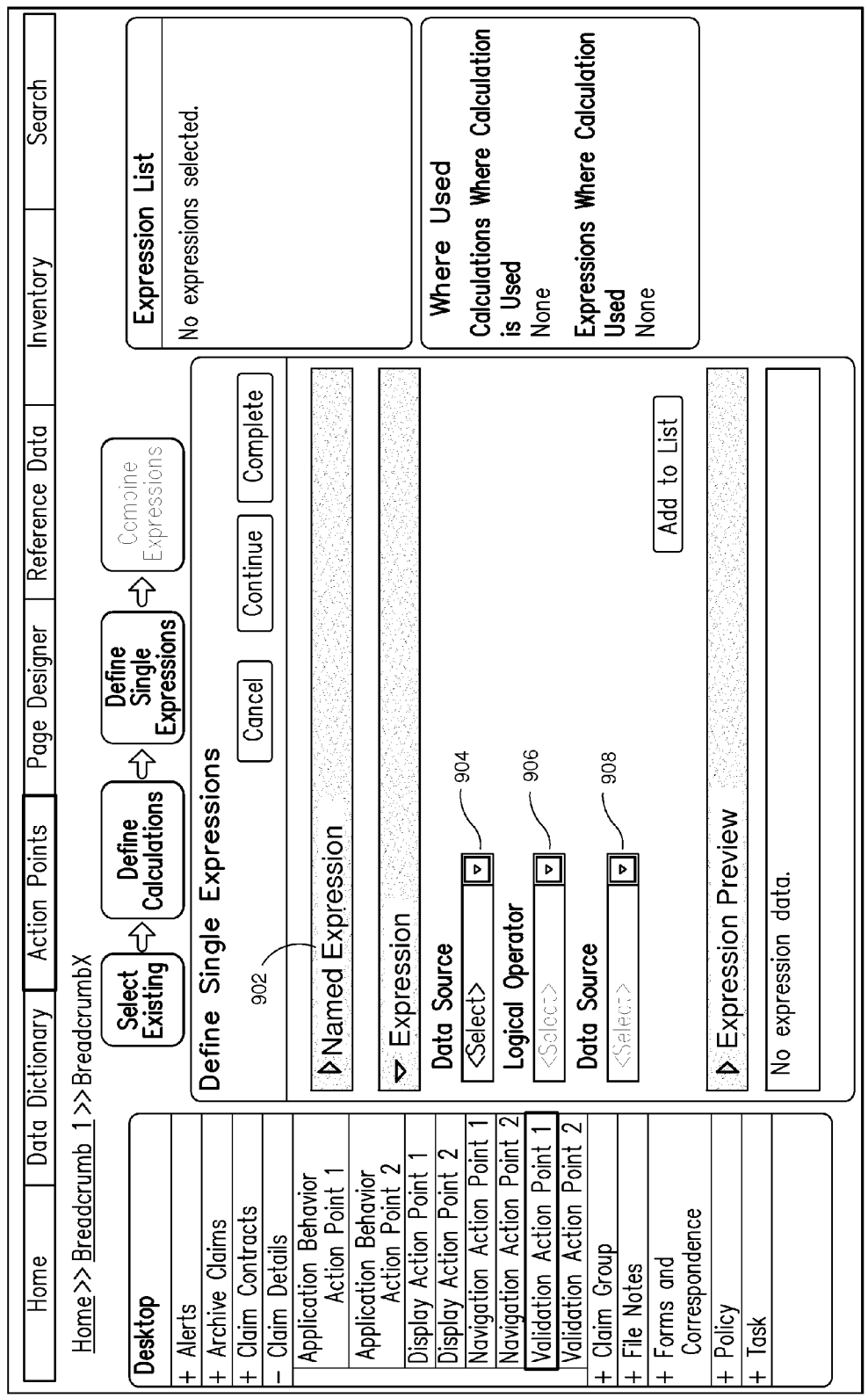
FIG. 9 shows examples of the 'define single expressions' page.

FIG. 9 shows examples of the 'define single expressions' 900 page. The default display of the 'define single expressions' 900 page section is closed. The 'define single expressions' page is shown open to illustrate how the fields may display if the user opened the section before selecting any items. The 'define single expressions' 900 page may load for the first time or after the user clicks "Add to List" after successfully adding an expression (named 902 or unnamed) to the Selected List. The 'define single expressions' page contains a line for the left side of an expression 904, a combo box to select the logical operator 906, a line for the right side of an expression 908, and an optional section to allow the naming of the expression. Details. The 900 page loads when the user clicks on the Define Single Expressions link, the Named Expression section 902 may default to closed. The Expression section 902 and Display section may default to 'expanded'. The Expression Version section may not be visible. When the 900 page loads for a new expression, only the first combo box in the top section is enabled. The combo box allows the user to select the source of the data to be used in the expression, and based on the selection of the first combo box 904 a second 906 and possibly a third 908 combo box may be displayed. Once the user has completely selected the data for the top item 904, the logical operator 906 combo box is enabled and contains the appropriate logical operators based on the item selected (e.g., Greater Than, Less Than, Greater or Equal To, and Less Than or Equal To display for numeric selections, Equal and Not Equal display for numeric selections and non-numeric selections, and the symbols and/or the verbal descriptions may be displayed in the combo box). Also, the bottom Data Source combo box 908 may be enabled and contain the appropriate items in context based on the data type of the top item 904 selected.

Figure 10:
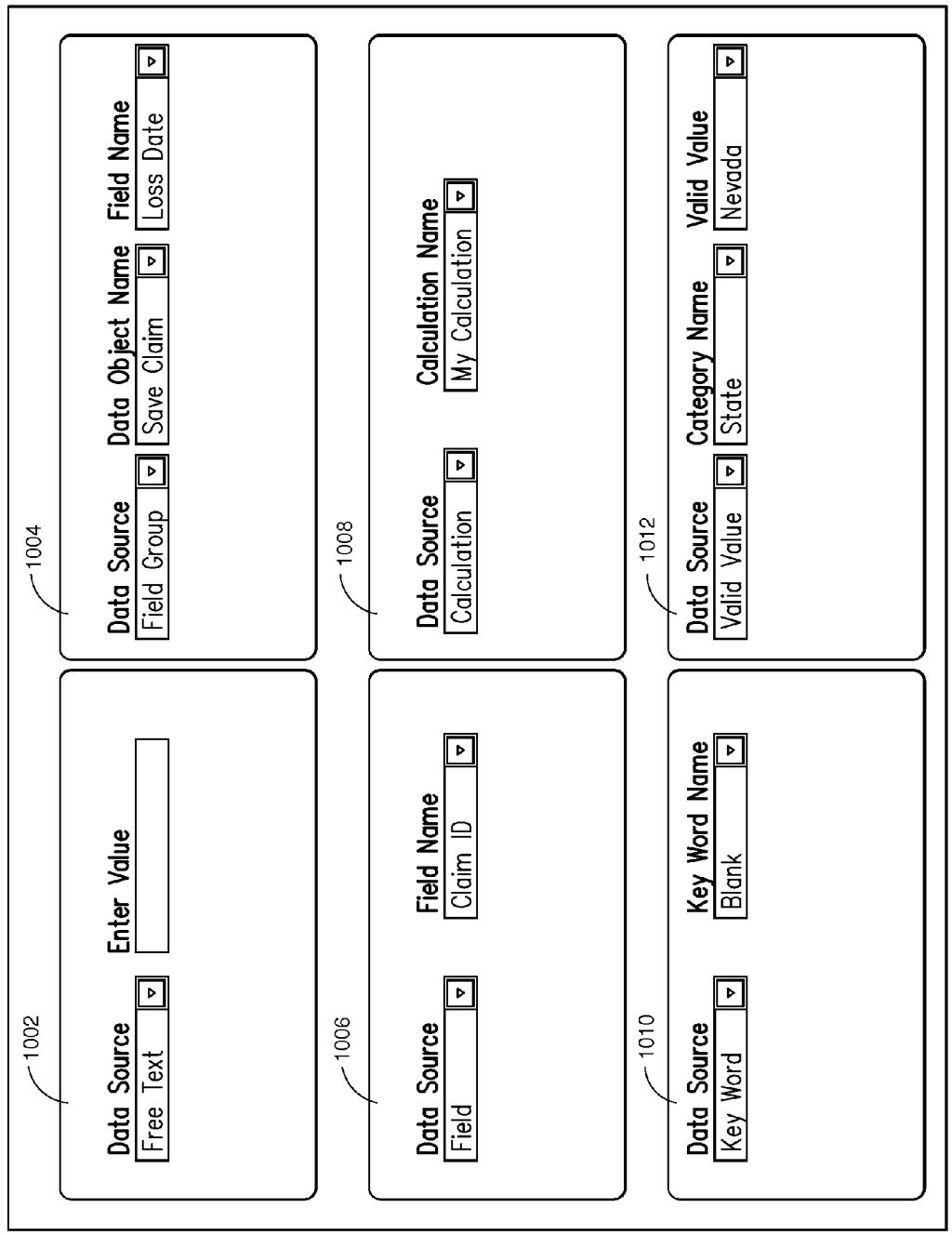
FIG. 10 shows examples of the 'define single expressions' data sources.

FIG. 10 shows examples of the 'define single expressions' data sources. Selecting the Free Text 1002 data source may cause a text box to display with a mask based on the appropriate database type. The Free Text 1002 data source may not be available as the first field. Selecting the Field Group 1004 data source may cause a combo box to display with data objects as follows: 1) names of standard and business data objects (e.g., group type data items) specified as input to the action point, and after selecting the specific data object, the user may select the element name; and 2) group type variables that have been associated to the action point, and after the user selects the specific data object, a combo box of the fields in the data object may be displayed (limited to the appropriate data type as necessary). Selecting the Field 1006 data source may cause a combo box to display with the following fields (limited to the appropriate data type as necessary): 1) individual data items (standard or custom) specified as input to the Action Point, but specified on a field as opposed to the data object level; and 2) variables that have been associated with the action point which are not group type. If the expression editor is loaded in the context of a page (BROWSER type) action point No date fields may be displayed. Selecting the Calculation from the 1008 Data Source combo box, the Calculation Name combo box may load. The Calculation Name combo box may contain the Calculations for which the fields of the Calculation are in context. If the calculation utilizes a variable, that variable may be automatically associated to the action point on the save and a warning may be displayed to indicate to the configurator to populate that variable. If the expression editor is loaded in the context of a page (BROWSER type) action point the calculation may not be available. Selecting the Key Word 1010 from the Data Source combo box, the next combo box may display "Blank", "Yes", "No", Current Date, and Locale. The expression editor allows the Blank value to be used for data types. The expression editor allows 'Yes' and 'No' values for Boolean data types. The expression editor allows Current Date for date or date_time data types, but may only display the date. The Current Date key word may not be available if the expression editor is loaded in the context of a page (BROWSER type) action point. Locale may be available for string data types, and when the locale data source loads as the first field in an expression, the locale data source may only have Locale as a selection. Selecting Valid Value 1012 from the Data Source combo box, the expression editor loads the application category names in the Category Name combo box. The configurator may then select the appropriate valid value from the Valid Value combo box. in the case of an expression in which the data item selected in the top item is associated to a category (for example, State of Loss=Nevada), if the user selects Valid Value from the 1012 Data Source combo box, the Category Name may default to the category associated to that data item, or otherwise, the expression editor may prompt the user to select the category and the valid value.

Figure 11:
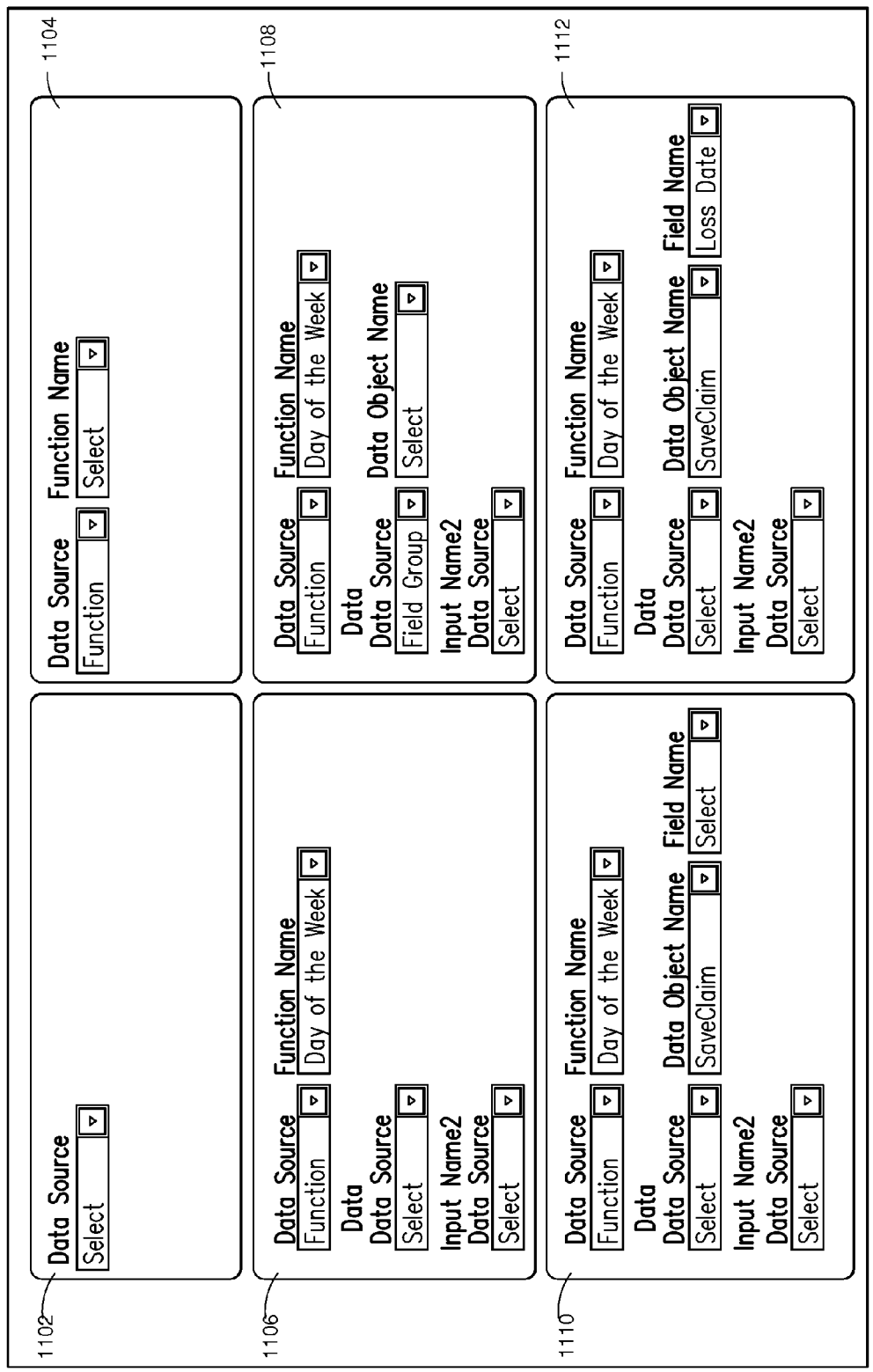
FIG. 11 shows examples of the 'define single expressions' functions.

FIG. 11 shows examples of the 'define single expressions' functions. Function: FIG. 11 shows examples of the progression of the steps related to configuring a function for use in an expression. The Function data source may not be available for browser-side expressions, in the context of a page type (BROWSER) action point. Sections 1102 and 1104 display the configurator selecting Function from the Data Source combo box. When the Function Name 1104 combo box loads, the functions included in the Function Name combo box support the following constraints: If the Function is not the first element selected in the expression, then those functions with the same output data type as the first item may be included in the Function Name combo box. The expression editor determines whether at least one field is in context matching the data type of each of the function inputs. When the configurator selects a function 1106, additional lines may be generated under the function line that includes the name of each input (from the function method signature in the database). Below each input name the expression editor may include the Data Source combo box to allow the configurator to select the appropriate input. Based on the input data needed for the selected function, the configurator may then use the combo boxes to make the selection. The Data Source combo box may include fields, field groups, valid values, key words and free text. The expression editor determines whether the data type of the input fields match the function specifications. For example, if the function is expecting an integer as the function's first input, the expression editor offers integers for selection. The examples 1108, 1110, 1112 show two inputs, but the expression editor may deduce the actual inputs from the function definition in the database and the number of inputs may range from 0 to many inputs based on the function signature.

Figure 12A:
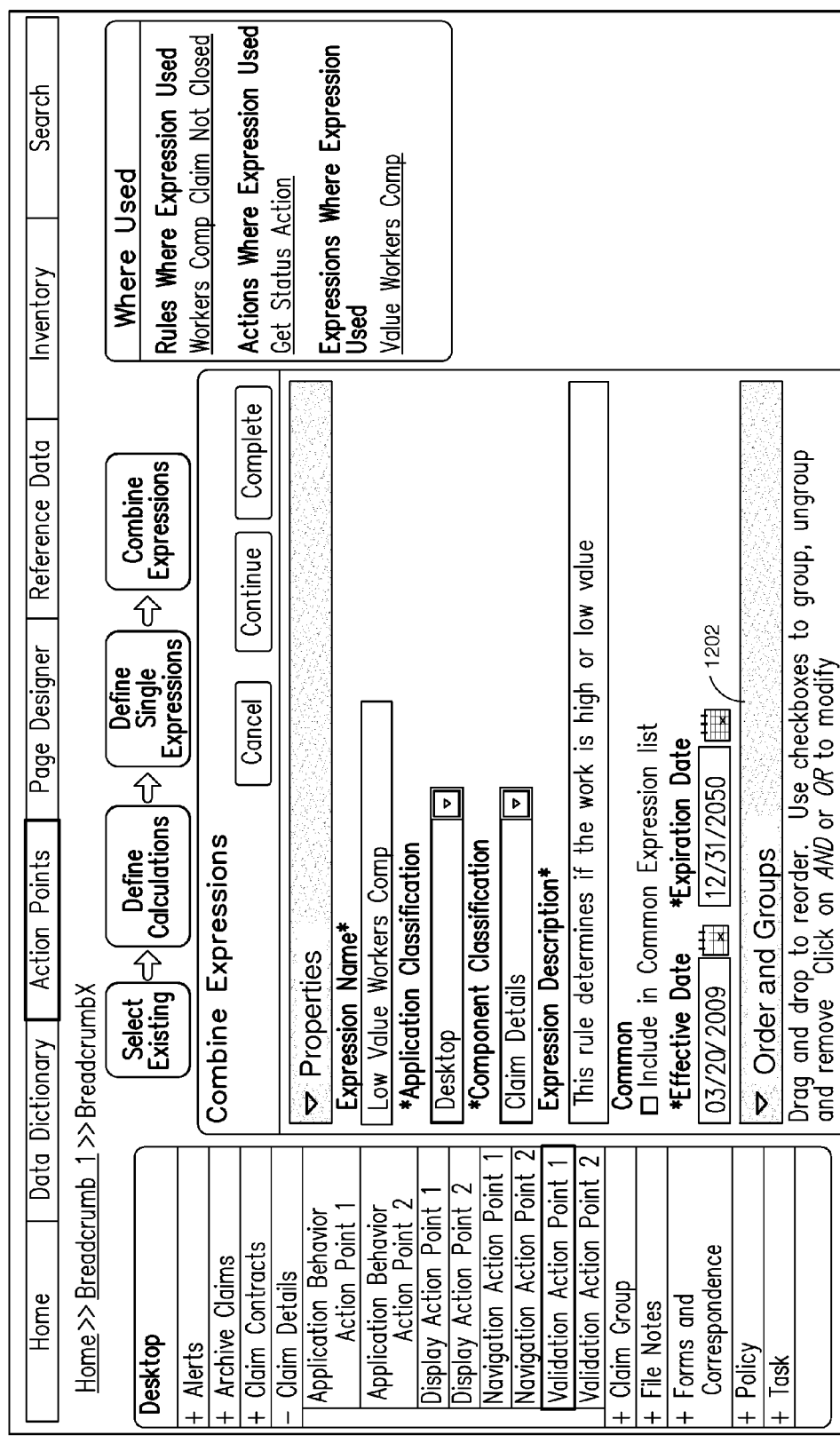
FIGS. 12A and 12B shows an example of the 'combine expressions' page.
Figure 12B:
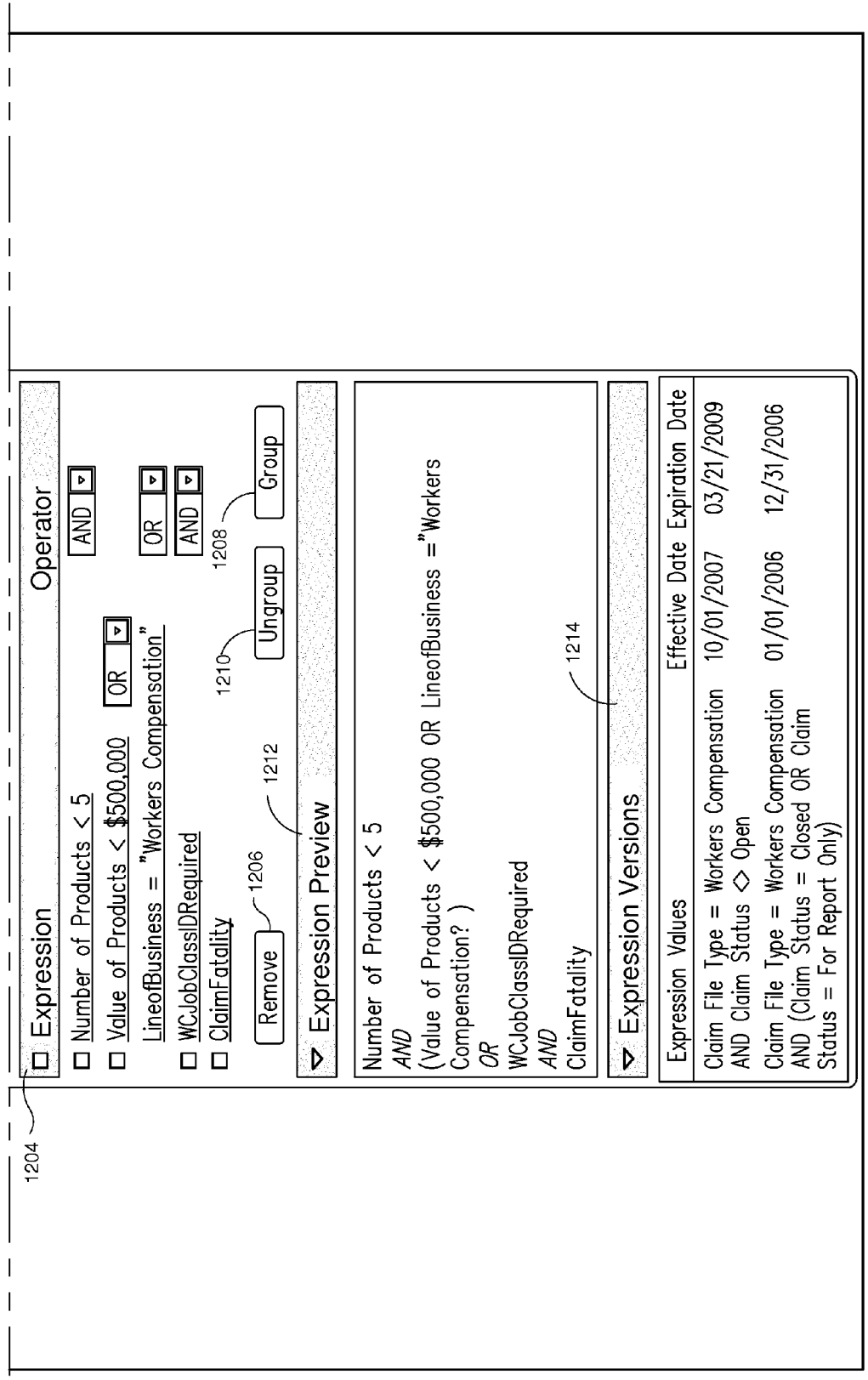

FIGS. 12A and 12B shows an example of the 'combine expressions' 1200 page. The 'combine expressions' page allows the configurator to name and dictate the order of operation of the items in the Expression list. Link only enabled if more than 1 item exists in Expression list. The page displays the concept of the order of operation 1202 in two ways: 1) through the use of nested grids and one with parenthesis, the configurator may use the grid to group and ungroup which is synonymous with adding and removing parenthesis. The lower section may be read only and display the expression with parenthesis. The expression editor console may store data to assist in the display of the 1200 page, capturing data to indicate the grid structure. If the combine expression is selected, the combine expression may cause the expression editor to check all items in the grid. If combine expression is not selected the combine expression may uncheck all items in the grid. Selecting the 'combine expression' button after selecting particular check boxes may remove those items from the Expression list and from the display grid. If the remove 1206 operation reduces the number of selected expressions to one or none, and the configurator selects 'complete', the expression editor may communication to the user the following error message "To save a combined expression, select at least two expressions." The order of the items can be changed by using drag and drop. The drag and drop feature may move all of the items included next to a single check box. The operators may be modified regardless of the position of the operator in the grid. The lowest level item in the grid may function as a link, allowing the user to edit the entry. For example, two items grouped together may be displayed as two separate links. If the user clicks on an unnamed expression, control may navigate to the Define Single Expressions page to load the unnamed expression. If a user clicks on a named expression and unpersisted data exists, the expression editor may prompt the user with a dirty flag warning. If unpersisted data exists, the expression editor may navigate to the page for the named expression. The user may also select the Back, Cancel, Continue, or Complete button.

5: The Group button 1208 nests the selected items, still in single lines, into the same line on the grid, in the same order. May use grids within a grid to capture groupings. When lines are grouped, the grid may modify so that only one radio button displays next to the top line which is grouped. Lines do not have to be next to each other to be grouped, but when the lines are grouped, the lines may be in the same order as displayed on the grid before the lines were grouped. The group may appear in the same place as the top item grouped. For example, if the configurator clicked items 1 and 4 and clicked the Group button, the grid would reload with 3 check boxes, and the top checkbox may have a line with two lines nested therein.

6: The Ungroup button 1210 may remove the first left parenthesis in the expression and the right parenthesis that corresponds to the first left parenthesis. From a grid perspective, selecting the ungroup button may un-nest what is combined into one checkbox and split them into separate checkboxes. Selecting the Ungroup button may not completely ungroup all items. A user may receive an error message if clicks an item that is not grouped. The user may check multiple checkboxes at the same time and click ungroup button.

The Expression Preview 1212 shows the expression indicating order of operation through parenthesis and is view only. Grouped may be enclosed in parenthesis. If items have been grouped multiple times, the items grouped multiple times may appear as grid lines within another gridline in the Expression grid and may have multiple parentheses shown in the section. The Expression Preview 1212 may be refreshed whenever any change is made in the Expression grid 1204 above through the user of the Remove, Group or Ungroup buttons.

The Expression Versions 1214 section default display may always be closed. The Expression Versions 1214 section displays all versions (including any future versions and the version the page is showing) of the expression along with the effective and expiration dates. Editable versions (except the version the page is showing) may display in the list as a link. If an expression includes the use of other calculations or expressions, the expression may display in the grid with the names of those items. However, when the user hovers over the calculation in the grid, the expression editor may display the expression in complete detail, down to the field level.

Figure 13:
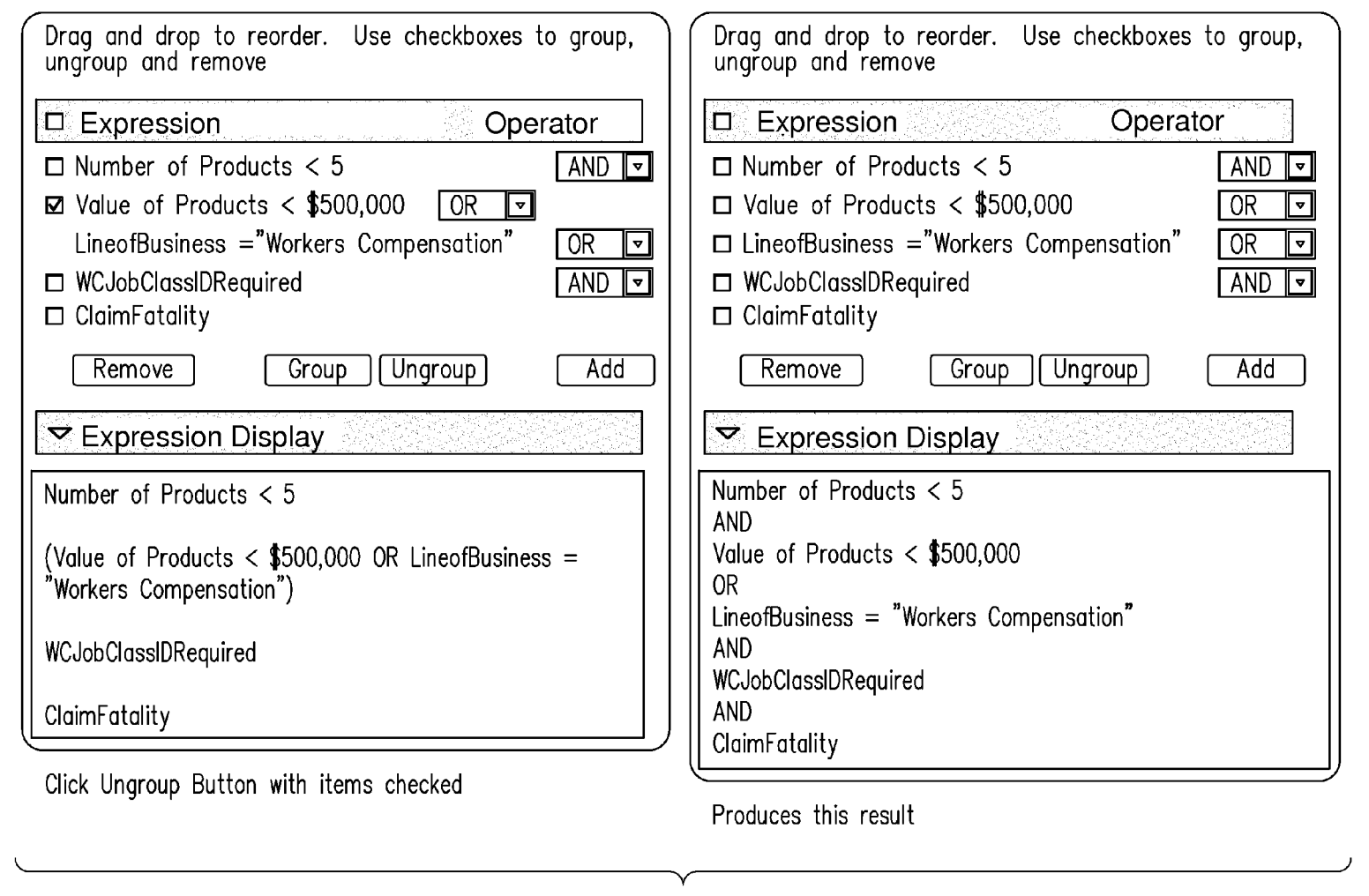

FIG. 13 shows an example 1300 result of a group selection with items selected. FIG. 13 illustrates a results page displayed as a result of the user selecting the ungroup button with items checked.

FIG. 14 shows another example 1400 result of a group/ ungroup operation with items selected. The expression editor uses the 'AND' logical operator as the default logical operator. If a logical operator is not connected to an item, the expression editor supplies the 'AND' operator by default. The order of a grouped item may be moved to the first checked item. FIG. 14 shows as an example the logical operator, after WCJobClassIDRequired, is removed as result of selecting a group/ungroup operation with items checked and/or selected.

FIG. 15 shows another example result of an ungrouping of selected items. FIG. 15 illustrates a results page displayed as a result of the user selecting the ungroup button with items checked.

FIG. 16 shows another example result of an ungrouping of selected items. FIG. 15 illustrates a results page displayed as a result of the user selecting the ungroup button with items checked.

Figure 17:
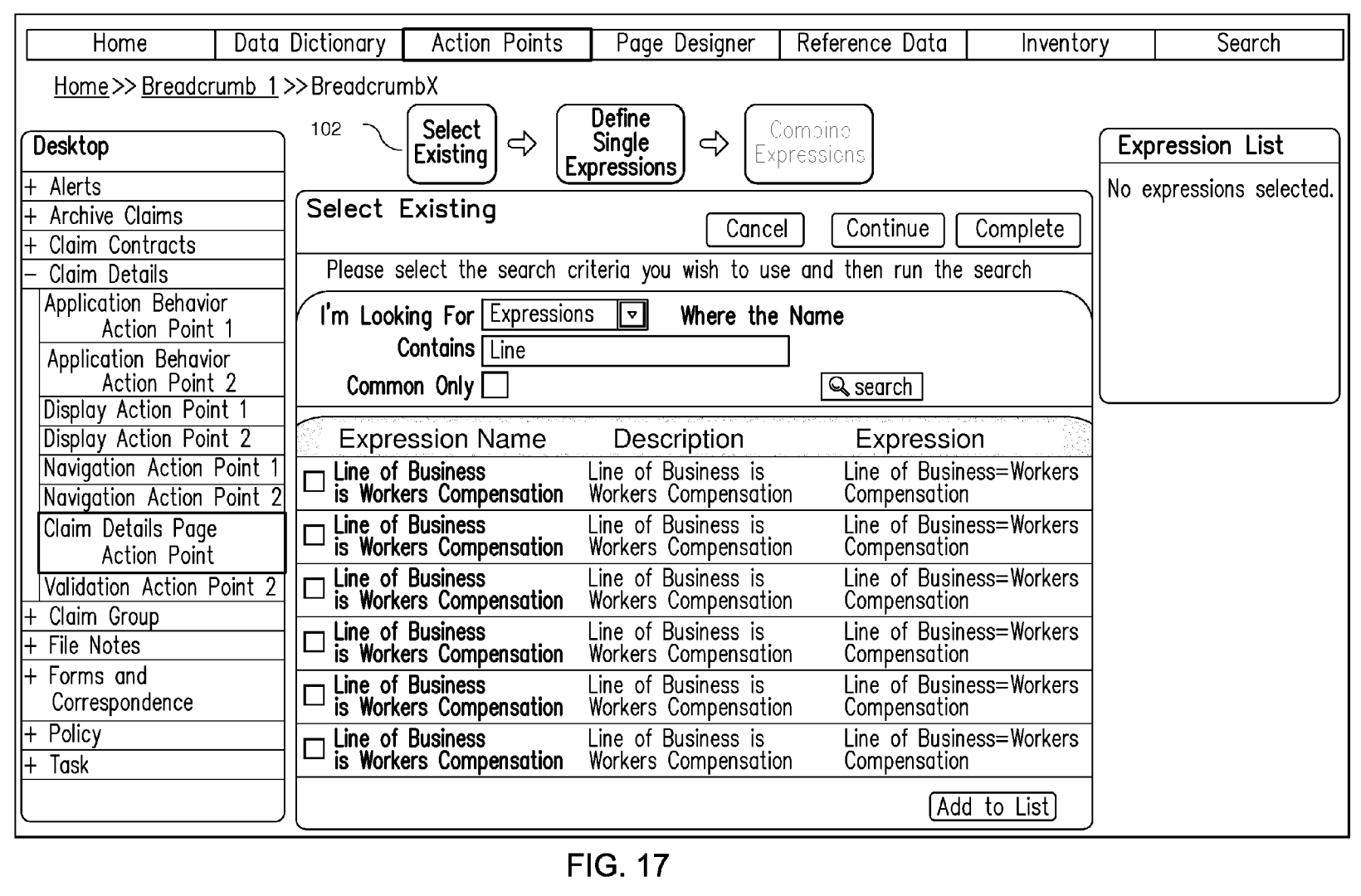

FIG. 17 shows an example use of the expression editor to create an expression 102 for a page action point. When the expression editor loads in the context of a Page (BROWSER) type action point, the Define Calculations button may not be displayed. The expression editor provides a configurable time calculation option that enables and disables the ability to use time calculations for page type action points. When the time calculation is disabled the expression editor may not make available date fields for use in an expression, if the expression editor is loaded in the context of a page (BROWSER type) action point.

Figure 18:
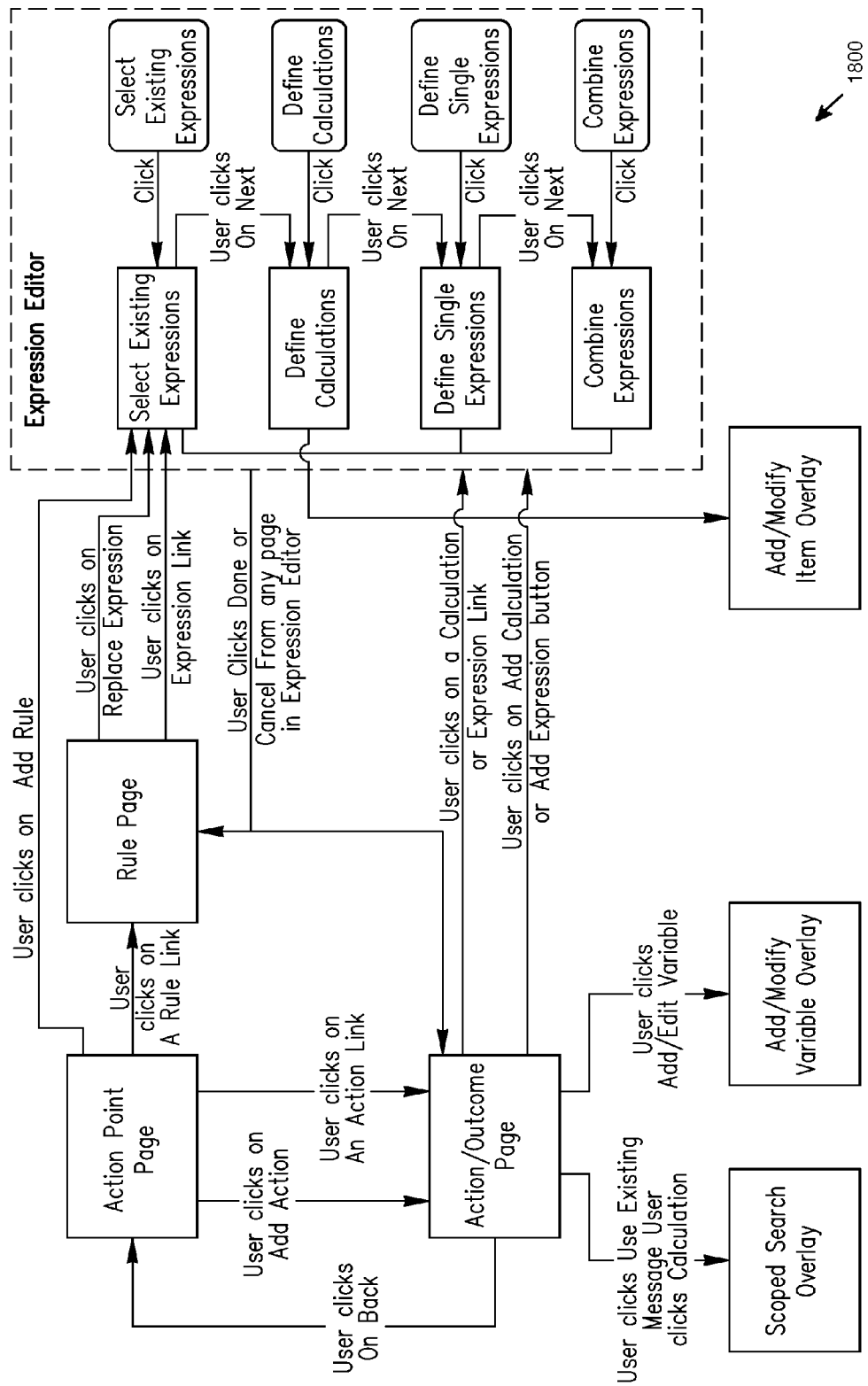
FIG. 18 shows an example block diagram of the navigation flow of the expression editor.

FIG. 18 shows an example block diagram of the navigation flow of the expression editor. The 'action point' display page allows the user to view and modify configuration data related to action points. Configuration data related to action points and code from the target application may be added to the database. A configurator may add a rule or an action to an action point. A rule is the combination of an expression and outcomes of the rule. An expression is a set of one-to-many conditions that evaluate to true or false. An outcome is an activity that the architecture may execute if the expression evaluates to true or to false. For example, the expression might be "claim loss date <Jan. 1, 1990". If the expression evaluates to true, the outcome might be to generate a specific event. If the expression evaluates to false, the outcome may be to send an email and navigate to a specific page. An action is an activity which the architecture may always execute as part of the action point processing.

An action point is configured to run on the server and/or the browser. A page may always have one and only one page (or browser) action point related to the page. The page action point may execute when there is a change event related to one of the fields on the page which has the rules value set to true, which applies to custom and standard fields. Server action points are mainly characterized by the output: none, Boolean, one value, or many values. For those action points which have an output, the data type of that output is an important piece of information. The configuration effort includes populating the appropriate output for an action point, and the application code processes the output. Another type of action point is "Event." A server action point may not have an output, although the server action point is created specifically to run as an event.

When a developer executes a server side action point in the code, the user may make certain data available to the logic engine to use when running the action point. The available data is referred to as "context" and is an important part of the developer-supported definition of an action point. Data may also be added to context by the configurator through the use of actions and outcomes. Additionally, the expression editor console determines the extended data available in context, based on the data included in the extension point definition and added through actions and outcomes.

The expression editor may use various pages related to creating and managing action points, that include the 'select existing' page, the 'define calculations' page, the 'define single expressions' page, and the 'combine expressions' page. The Action Point component makes use of several scoped searches displayed as overlays. The 'action point' page displays action point properties including input fields and the output definition. The fields may be populated by the developer and may not be modified through the configuration console. The 'action point' page also displays actions and rules which have been added through configuration to the action point. The user can re-order existing rules and actions from the 'action point' page. Also, links exist to navigate to the appropriate pages to add new rules or actions and modify existing.

The Rule Page captures rule data, such as name, the expression and the selected outcomes. The configurator may use the scoped search to select an existing expression or the configurator can navigate to the expression editor to add a new expression. The user may order the outcomes from the Rule Page. Also, links exist to navigate to the Action/Outcome Page to add new outcomes and modify existing outcomes.

The 'Action/Outcome' page displays both actions and outcomes as described previously. The configurator may map any inputs to data items from context and may map output data as well. The architecture is shipped with a set of architecture activities in the code and the configuration database.

The expression editor allows the creation or modification of expressions and calculations. A calculation is a set of one-to-many conditions that evaluate to anything other than true or false. Calculations are used as part of an expression, an action or outcome to return the evaluation value of the calculations. The expression editor allows the configurator to select an existing expression or calculation or create a new one. The expressions and calculations may range in complexity from a simple snippet involving two fields or a complex, grouped set of conditions and expressions.

FIG. 19 shows example 'action point' details with output. FIG. 19 depicts the Action point page for a server side action point which has been configured with three actions. The properties 1902 section displays action point characteristics and the fields may not be editable in the configuration console. The configuration 1904 section includes a list of the actions which have been configured for the action point. The list includes the action display name, whether action is a rule or action type, and the description. The user may modify the order of actions for the action point through drag and drop. In order to remove an action or rule from the list, the user edits the action, populating the 'expiration date' as appropriate. Clicking the Name link 1906, 1908 for a rule type action may direct the user to the Rule Details page for that rule. Clicking the Name link 1906, 1908 for an action type action may navigate to the Action/Outcome page. Clicking the Add Action 1910 link may navigate to the Action/Outcome page in the add action mode. Clicking the Add Rule 1912 link may direct the user to the Select Existing Expression page in the 'add new rule' mode. The Data Information 1914 portlet displays the input and output characteristics of the action point, although the input and output characteristics of the action point may not be editable in some instances. The Data Information 1914 portlet may assist the configurator in assuring that the appropriate action point output is passed. The Data Information 1914 portlet may include a list of links to rules (with the appropriate outcomes) and actions, in the order in which the rules or actions may be executed, which fit the requirements to populate the action output. The View by Status 1916 combo box allows the user to select to display Active, Active and Pending, Pending, or Expired actions. Pending actions have a future 'From' date. When the user selects a different value from the combo box, the list of actions is redisplayed to display the appropriate actions. The expression editor sets the default value in the 1916 combo box to Active. The expression editor may disable the Drag and drop ordering when the configurator selects the Expired status from the Status 1916 combo box. Also, the expression editor may make the combo status visible only when actions configured for the action point exist. The data information 1914 portlet display displays links to rules (with the appropriate outcomes) and actions when the action point has an output defined. The data information 1914 portlet display displays nothing when no rules/outcomes or actions are defined or when the rules/outcomes and actions do not have outputs to return to the target application. The actual output to the application may depend on the rules and/or ordering of the rules.

Figure 20:
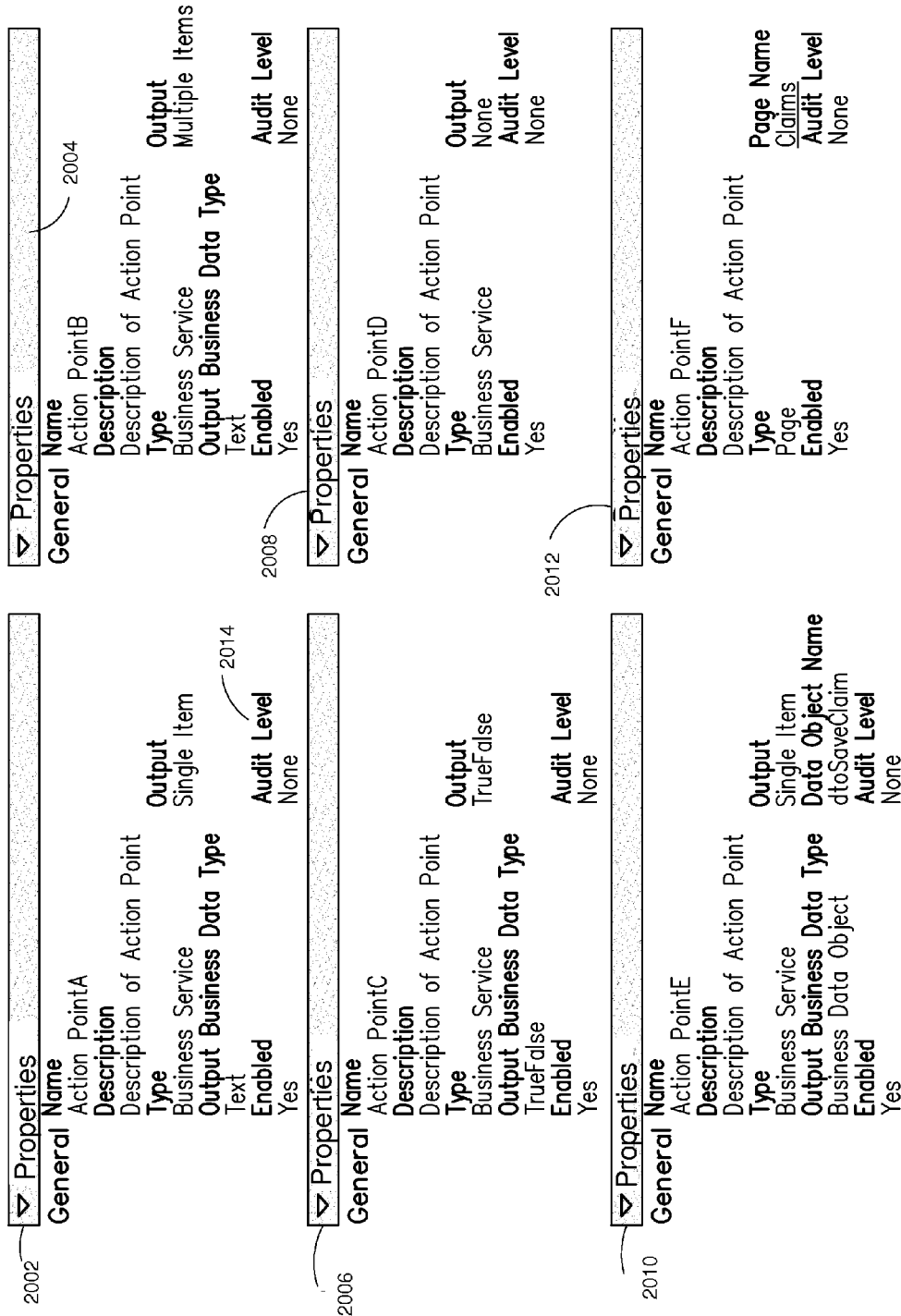
FIG. 20 shows example 'action point' properties.

FIG. 20 shows example 'action point' properties. FIG. 20 shows different ways the properties section may display based on whether the action point is a business service or page type. If the action point is business service type, the properties may load on the 'action point' properties (2002, 2004, 2006, 2008, 2010, 2012) page based on output type of the action point. The Type, Output (or Page Name), Output Business Data Type, and Data Object Name fields may also display in the Action Point Properties portlet on the Rule or Action Page based on the description below. The properties of an Action Point may be read only. The Type field may be "Business Service" if the C_EXTPT_TYP field in the EXTPT table is not "BROWSER" or "EVENT". If the C_EXTPT_TYP field is "BROWSER" then the Type field may display "Page". If C_EXTPT_TYP field is "EVENT" then the Type field may be "Event level". The Output field may also display based on the C_EXTPT_TYP field in the EXTPT table. If the value of the C_EXTPT_TYP field is "BROWSER", the label name may be "Page Name" and the display name of page to which the action point is associated may be displayed (C_PAGE_CLS). If the value of the C_EXTPT_TYP field is "EVENT", the label name may be "Event Level". The Output Business Data Type field may only display if the C_EXTPT_TYP field value is "EXECBOOL", "EXECMANY" or "EXECONE". Otherwise, the row may not be displayed at all. If the data type of the action point (C_OUTPT_DATATYP) is a native C# data type, the value displayed may be the business data type which corresponds to that value. Otherwise, the value displayed may be Business Data Object. In that case, there may be a Data Object Name field which may contain the display name of the data object in the C_OUTPT_DATATYP field. The 'action point properties' 2002 illustrates an "EXECONE" action point with a string output. The 'action point properties' 2004 illustrates an "EXECMANY" action point with a string output. The 'action point properties' 2006 illustrates an "EXECBOOL" action point which may always have a Boolean output. The 'action point properties' 2008 illustrates an "EXECONLY" action point which may not have an output. Note that no fields for output exist. The 'action point properties' 2010 illustrates an "EXECONE" (but could apply to an "EXECMANY") action point with a business data object as an output. The Output Business Data Type value may be "Business Data Object", and an additional field may exist for the display name of that business data object. The 'action point properties' 2012 illustrates a "BROWSER" action point. The field next to Type may have a label of Page Name (instead of Output) and may include the display name of the page to which the action point corresponds. The display name may be a link to a page designer for that page, and the user may receive a dirty flag before navigating to the page designer page. A database record for an action point output may not be created when the action point does not have an output.

Figure 21:
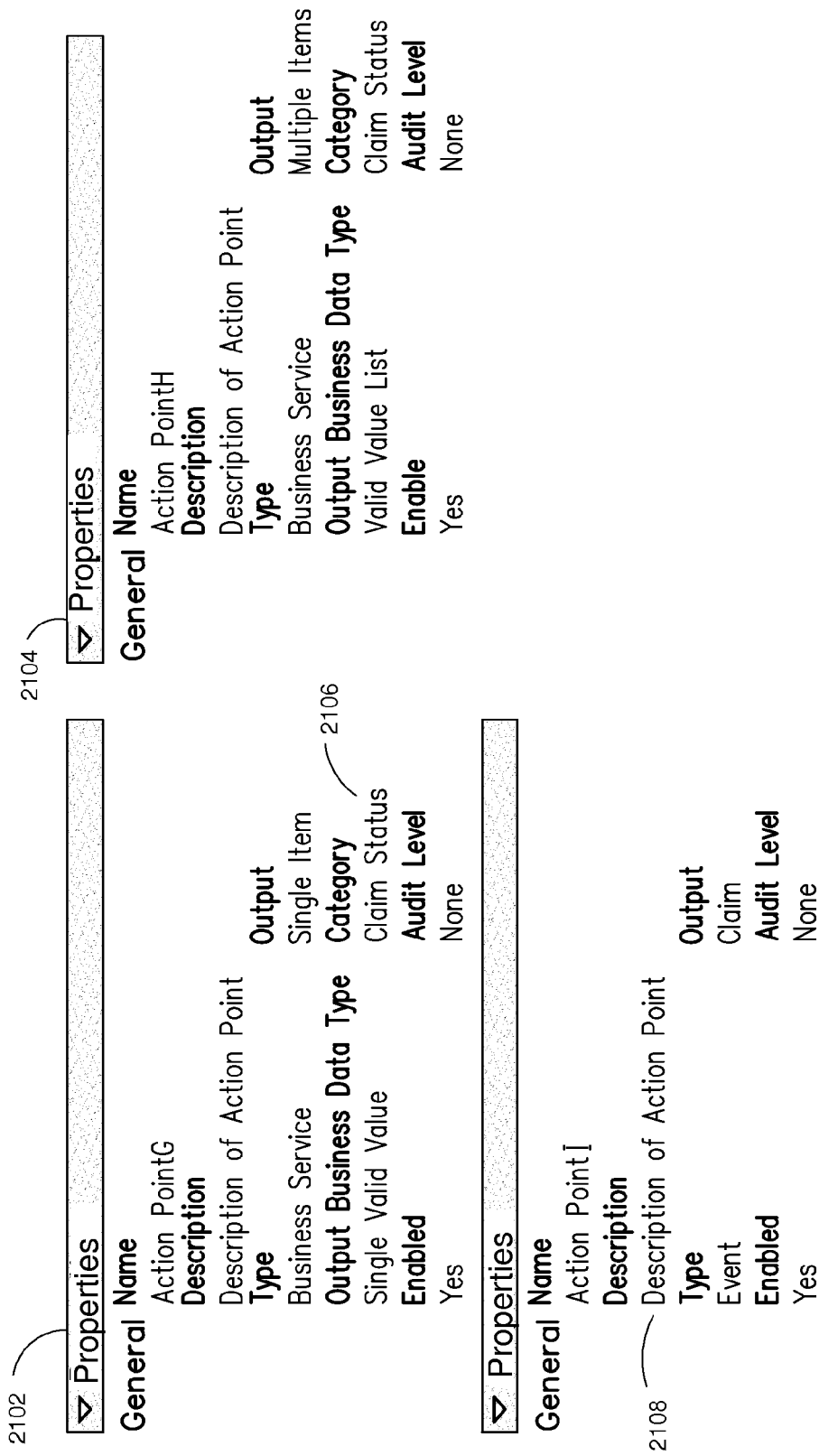
FIG. 21 shows other example 'action point' properties.

FIG. 21 shows other example 'action point' properties 2100. FIG. 21 shows other ways the properties section (2102, 2104) may display based on whether the action point is a business service or page type. If the action point is a business service type, the properties may load on the 'action point' properties page based on output type of the action point. The Type, Output (or Page Name), Output Business Data Type, and Data Object Name fields may also display in the Action Point Properties portlet on the Rule or Action Page based on the description below. The properties of an Action Point may be read only. The Type field may be "Business Service" if the C_EXTPT_TYP field in the EXTPT table is not "BROWSER" or "EVENT". If the C_EXTPT_TYP field is "BROWSER" then the Type field may display "Page". The Output field may also display based on the C_EXTPT_TYP field in the EXTPT table. If the value of the C_EXTPT_TYP field is "BROWSER", the label name may be "Page Name" and the display name of page to which the action point is associated may be displayed (C_PAGE_CLS). The Output Business Data Type field may only display if the C_EXTPT_TYP field value is "EXECBOOL", "EXEC-MANY" or "EXECONE", or the row may not be displayed. If the data type of the action point (C_OUTPT_DATATYP) is a native C# data type, the value displayed may be the business data type which corresponds to that value. Otherwise, the value displayed may be Business Data Object. A Data Object Name field may contain the display name of the data object in the C_OUTPT_DATATYP field. The 'action point properties' 2102 illustrates an "EXECONE" action point in which the N_RSLT_CAT field is populated. The 'action point properties' 2104 illustrates an "EXECMANY" action point with a string output in which the N_RSLT_CAT field is populated. The Type field 2108 may be "Event" if the C_EXTPT_TYP field in the EXTPT table is "EVENT". An event action point may be defined with one or more event levels. The Type field captures those action points which have been created specifically to be run as events. Instead of Output, the label may display "Event Level". The action point event level may be defined in the C_ENTY_TYP field in the EVNT_EN-TY_TYP table. The C_ENTY_TYP field may be defined by the AEFEntityTypes category and valid values may be stored in the ENTY_TYP table.

Figure 22:
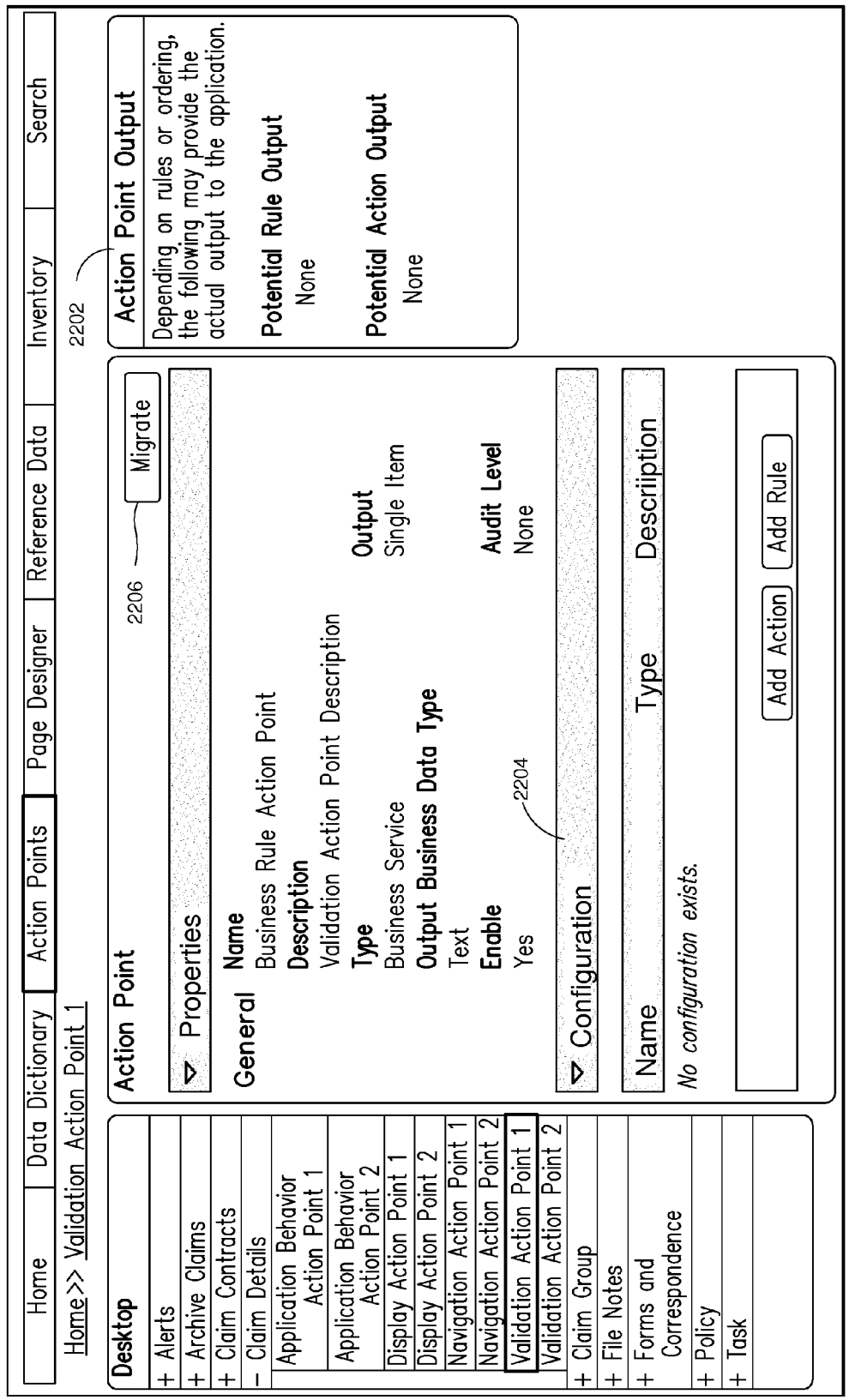
FIG. 22 shows example action point details an unconfigured action point.

FIG. 22 shows example action point details for an unconfigured action point. FIG. 22 illustrates how the configuration 2204 section and the output 2202 portlet may look when no actions or rules are configured, or none of the configured actions or rule outcomes has the potential to output to the application. The action point details 2202 portlet may only display for those action points that are defined to include an output. Clicking the migrate 2206 action point details button may insert the appropriate rows into migration queue tables that include the expressions, rules, actions that are part of the action point, the variables created for the action point, and the category keys used in error messages.

FIG. 23 shows example of an action point page for a browser side action point that has not yet been configured 2304. The action point properties tab shows details related to the Type and Page Name fields 2302. Each page may have one and only one page action point associated with the page. The page type action point supports the enable, disable, show, hide actions and/or outcomes related to custom fields on a display group on the page.

Figure 24:
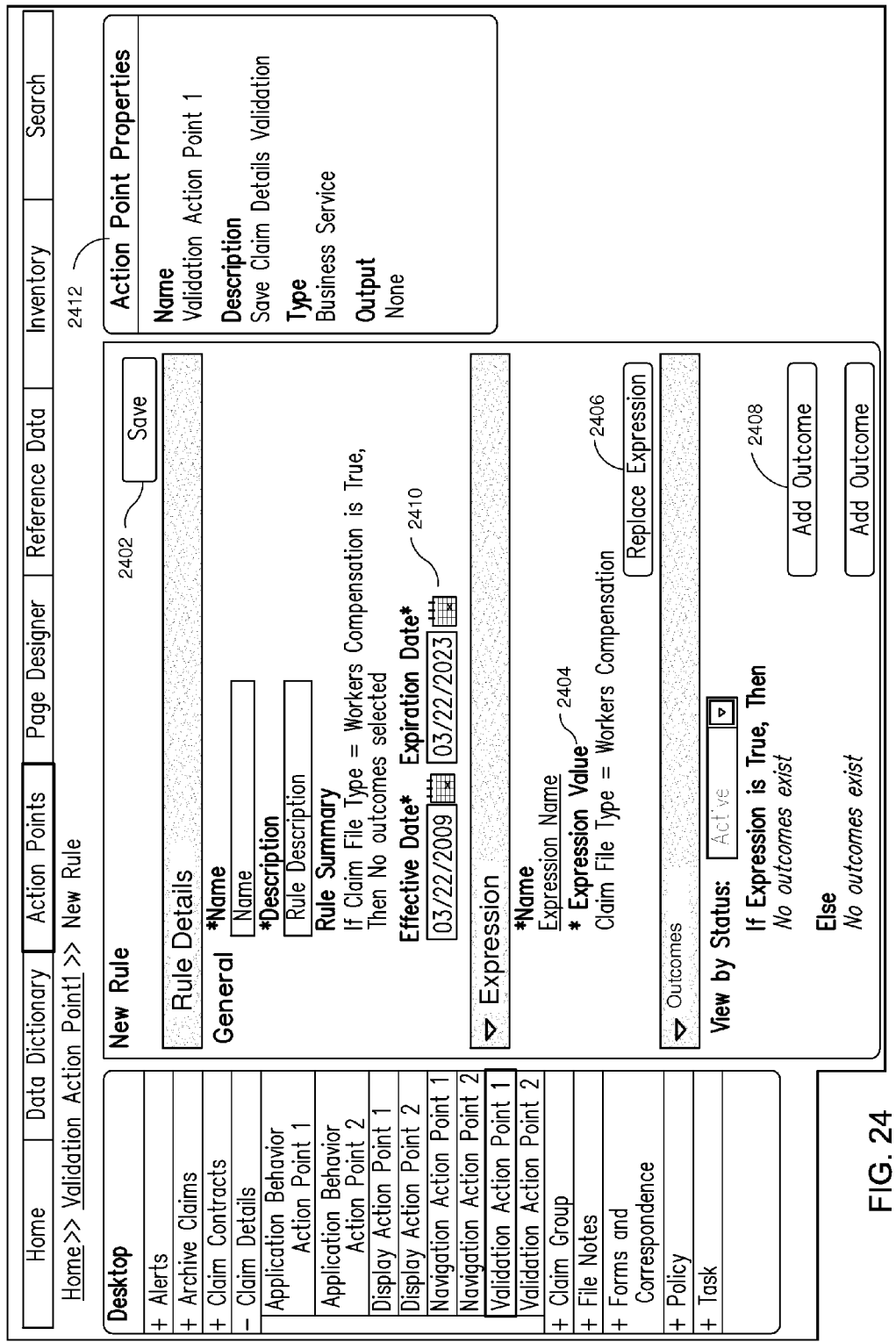
FIG. 24 shows an example action point page for a page (browser-side) action point.

FIG. 24 shows an example action point page for a page (browser-side) action point with a new rule where no outcomes have been selected. FIG. 24 shows a rule details 2400 page once the user has added an expression but has not selected outcomes. The rule details 2400 page validates the expression 2404, rule name, description, 'effective' and 'expiration' date 2410, and persists that data to the database. The 'expiration date' and 'effective' date 2410 follow standard validation requirements for these fields for the configuration items. The expression editor may prompt the user to save the rule with an expression before adding outcomes. The save button 2402 may not save outcome data. The expression editor may prompt the user with a dirty flag message if data on the page has been changed without saving the changes. Otherwise, the expression editor loads the expression to be edited. The expression editor allows the user to select a different expression 2406 for the rule, save data to state (fields in General section and expression selected), and adds the page to the navigation (nav) stack and transfers control to the Expression Editor. The Add Outcome 2408 buttons are visible after an expression has been selected and the rule has been saved 2410. The 'expiration date' is defaulted to current date, and 'expiration date' is defaulted to maximum date 2410. The action point properties 2412 displays key pieces of information related to the action point to which the rule is related. The Type, Output (or Page Name), Output Business Data Type, and Data Object Name fields may also display in the Action Point Properties portlet on the Rule or Action Pages based on the business rules described in the Action Point Properties tab.

Figure 25B:
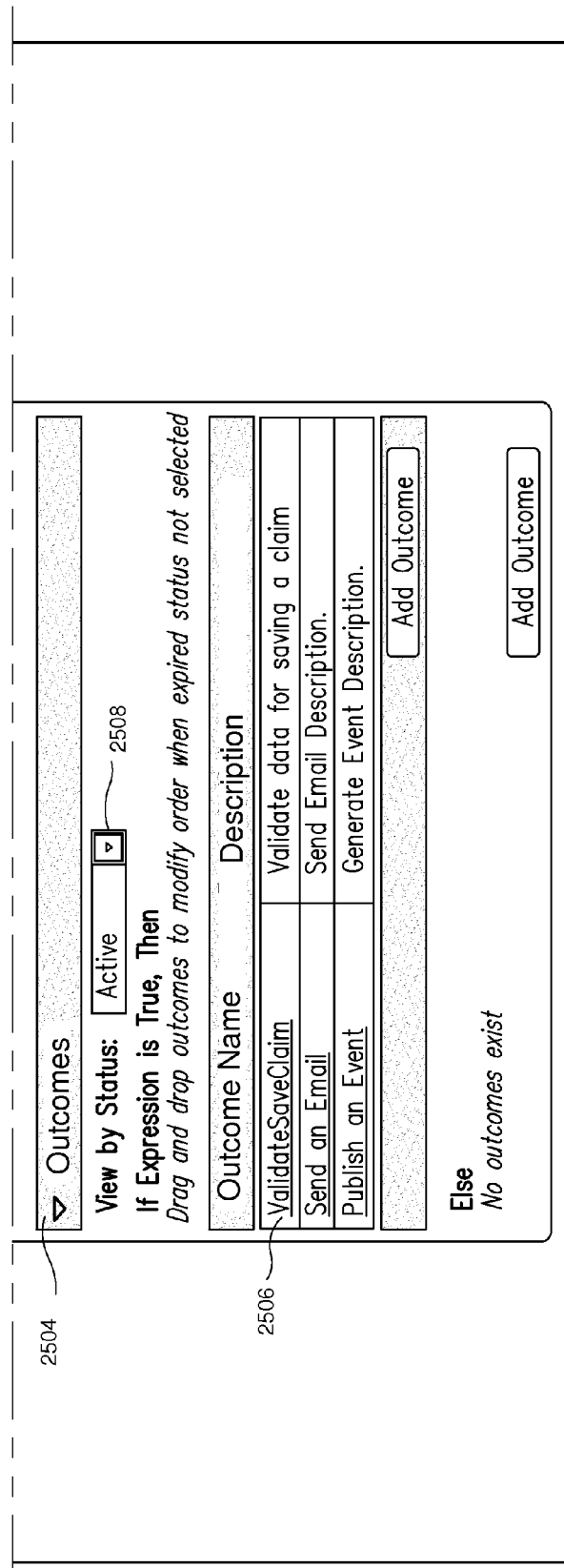

FIGS. 25A and 25B shows example editing of an existing rule that includes an expression and three outcomes 2502. The 'else' may not be visible unless outcomes related to the 'else' condition exist. In one implementation, the expression editor may not provide the negate rule functionality in the console, which may apply to action points of type "Code Decision" (which returns a Boolean value). If the EXTP-T_ACTN.B_NEG_RLE field is set to true for a rule, the opposite value of the expression evaluation may be returned to the action point. When a developer populates the B_NEG_RLE field with true, the expression editor may not display the rule. The Outcomes 2504 section includes at least two lists: outcomes that may be executed if the expression evaluates to true; and outcomes that may be executed if the expression evaluates to false. Each list includes the outcome name and the description. The user can modify the order of outcomes through drag and drop. The data may persist as the row is dropped. A user cannot drag an outcome from the one list to another. In order to remove an outcome from the list, the user edits the outcome, populating the 'expiration date' as appropriate. Clicking an outcome name 2506 may transfer the user to the Outcome page, which the expression editor may navigate to after checking status of the dirty flag. The outcome page may associate the outcome to the rule. Note that the name of an outcome may be displayed from the console category created to reflect the console selection for outcomes and activities. In one implementation, the architecture may allow not a user to create a name for an outcome. The View by Status 2504 combo box allows the user to select to display Active, Active and Pending, Pending, or Expired outcomes. The selection may affect both "if" and "else" outcomes. Pending outcomes include a future 'From' date. When the user selects a different value from the combo box, the lists of outcomes are redisplayed to display the appropriate outcomes. The default value selected in the combo box may be Active. Drag and drop ordering may be disabled when the Expired status is selected. Also, the combo status may only be enabled when there are outcomes configured for the rule. 4: the expression editor may display a table to display previous versions (expired) of the expression, if any exist. The table may include a link to the expired versions of the expression and may display the expressions read only in the expression editor page.

Table 1 illustrates example Rule Summary logic that may include the expression display followed by a list of outcomes, and an alternative outcome (e.g., a negate rule).

TABLE 1

Rule Summary Logic

If <Expression Display> is True, Then
<Outcome 1>
.
.
.
<Outcome n>
Else /** Negate Rule ***/
<Outcome X>

FIG. 26 shows an example of a 'new rule' page that the expression editor may navigate the user to in order to add a new rule to an action point. FIG. 26 shows an example of a 'new rule' page where the user clicked Add Rule from the action point page, but then the user clicked back without selecting or creating an expression. The expression editor may not considered such a sequence of interactions by the user as normal, and the user may not be allowed to save 2602 the rule without selecting an expression. When configuring a new rule, the user selects an expression and saves 2602 the rule with the appropriate data in the general section before adding outcomes. The user may receive a validation error if the use attempts to save the rule without an expression. The user adds an expression before selecting outcomes 2606. The View by Status 2604 combo may be disabled until at least one outcome has been selected. The Expression History section may load closed by default. If there are no expired versions of the expression, the section may indicate that "There are no expired versions of the expression".

Tables 2 and 3 illustrate an example EXTPT table and other Information Related to Action Points. Context Data is data available for use by the configurator in an action point. Server Side Action Points include particular available contexts, including: standard data objects and/or elements defined by the EXTPT_INPT table for server side action points and added to context by developer when the action point is called; added to by the use of activities/outcomes in which C_OUPT_DATATYP has not been populated and data type matches; and for custom data objects (extended data) may be determined based on which logical tables are associated. The data type may be used to determine extended tables for group type data items. Browser Side Action Points also include particular available contexts, including: context for fixed data defined by the FQN value in the PAGE_CLS_CTRL for that action point's page where B_CNTXT_DATA is true; and context for extended data defined by the FQN of the extended data included in each of the display groups on the page. Context may not be added for Browser Side Action Points to by using actions or outcomes, because get data type actions and outcomes may not be available from browser side action points.

TABLE 2

EXTPT table and Other Information Related to Action Points

| CEXTPT_TYP | Output (C_OUPT_DATATYP) | More on action point output based on action point type |
|---|---|---|
| Browser Side Rules* | Not applicable | Not applicable |
| Code Decision | Boolean | Populated by the output of the last expression run |
| Retrieve List of Items | Data type of things in the list | Populated by output of each activity if output matches action point output data type and outcome/activity does not have output data item selected. Continues appending each value. |
| Retrieve One Value | Data type of returned value | Populated by output of last activity run if output matches action point output data type and outcome/activity does not have output data item selected. |
| Execute Logic | Not applicable | Not applicable |
| Event | Not applicable | Not applicable |

TABLE 3

EXTPT table and Other Information Related to Action Points

| _EXTPT_TYP | Default Output (V_DFLT_RTN_VAL) | Page (N_PAGE_CLS) | C_OUPT_DATATYP | Output RefData Category (N_RSLT_CAT) |
|---|---|---|---|---|
| Browser Side Rules* | Not applicable | GUID of PAGE_CLS table | Not applicable | Not applicable |
| Code Decision | Boolean | Not applicable | Boolean | Not applicable |
| Retrieve List of Items | Not applicable | Not applicable | Any C# native datatype | Allows use of ACAGetResultsAsPartialItems, . . . to return a list of refdata for category specified or other activities |
| Retrieve One Value | Not applicable | Not applicable | Same as above | Allows user to configure an activity of type ReturnRefCatKey |
| Execute Logic | Not applicable | Not applicable | Not applicable | Not applicable |

TABLE 4

EXTPT table and Other Information Related to Action Points

| C_EXTPT_TYP | Description | Input |
|---|---|---|
| Browser Side Rules | Runs browser side, always one to one with page in application | Derived as described below; not in EXTPT_INPT table |
| Code Decision | Returns true or false | Zero to many dataitems, based on rows in EXTPT_INPT table |
| Retrieve List of Items | Returns zero to many of datatype defined in C_OUPT_DATATYP | Zero to many dataitems, based on rows in EXTPT_INPT table |
| Retrieve One Value | Returns datatype defined in C_OUPT_DATATYP | Zero to many dataitems, based on rows in EXTPT_INPT table |
| Execute Logic | Returns nothing | Zero to many dataitems, based on rows in EXTPT_INPT table |

TABLE 4-continued

EXTPT table and Other Information Related to Action Points

| C_EXTPT_TYP | Description | Input |
| --- | --- | --- |
| Event | Returns nothing - the Event action point may be the only action point useable as an event | Derived from C_ENTY_TYP field in EVNT_ENTY_TYP table; does not use EXTPT_INPT table. |

The Action/Outcome page allows the user to configure the processing that may occur in the action point. The action point causes the architecture to execute a specific piece of code which may be described as an activity, although the expression editor console may not display the terminology. Activities available to the configurator include those which are part of the architecture or the application. Data describing the input and output criteria of the activity is stored in the expression editor console database but may not be used in the actual execution of the activity items. Additional activities may be made available to the configurator, by configuring code from an alternative using application. The configuration architecture has a set of activities that is available for use by the configurator. The action/outcome page is designed specifically to support these architecture activities. Although there is some metadata included to describe each architecture activity, the action page may not load from the data. Instead, the page may be coded to support those items which have been made available by the architecture. An outcome is defined as an "activity" which is configured to run as the result of the evaluation of an expression. An outcome is considered part of a rule (which includes an expression and outcomes). An action is defined as an "activity" which is configured to run in the action point and is not dependent on the evaluation of an expression. The action/outcome page always loads as part of a specific action point. Both outcomes and actions are stored in the EXTPT_ACTN table. Outcomes also have data in the EXTPT_ACTN_ACTY table. The database defines 5 different types of action/outcomes which are described in the Activity Type Info tab. The definitions of the action/outcomes describe functionality offered by the architecture and reflect the database design. The console may abstract the information to create one activity list which may be offered to the user. Behind the scenes, the console logic may utilize the APIs to appropriately persist the configuration settings to the database. The Activity List tab includes the activity list. Additionally, there is a wireframe to illustrate how the action/outcome page may load for each of these selections. The fields made available to a configurator in the configuration of input fields are limited to those which are considered available in "context" for that action point. There expression editor employs six architecture variables that are available for use as input for configuration (both server side and page action points), including Business Function (ArchBusinessFunction), Client IP Address (ArchClientIPAddress), Current Date and Time (ArchCurrentDateTime), Locale ID (ArchLocaleId), Locale ID (ArchUILocaleId) and User Name (ArchUserName). One or more of the six architecture variables of the expression editor may be exposed to the configurator. For a server side action point, data may be considered in context from three sources. The first source is the definition of the action point in the expression editor console database and may include zero to many data items. Second, a data item or field may be considered in context because the data item or field was added to context by the configurator through the use of actions and outcomes. Finally, all of the custom fields for which the context data for the action point includes the key to the logical table. The correlation between the data items and the logical tables for which the data items contain the key is in the DATAITEM_TBL table. (a variable data type may be utilized to determine which logical tables are supported by that data item). The "context" of a page (browser side) action point includes standard fields associated to the page through the PAGE_CLS_CTRL table and all of the custom fields associated to display groups through the DSPLY_GR-P_DATAITEM table. Several of the available action/outcomes return a value. If the data type of the action/outcomes value matches the action point data type, the data type may be automatically assigned to the action point output and the assignment may function based on the action point definition. If the action point output is one item (EXECONE), the value may override any previous value to which the action point output may have been set. If the action point output is many items (EXECMANY), the expression editor may append the action/outcome output to the list. Note that the output cannot be assigned to any of the architecture variables. In some cases, the configurator may need to temporarily capture the output of an action/outcome. For example, if the output is needed as the input to another action/outcome. The functionality is available for some of the action/outcomes as indicated in the wireframes. If an output field is assigned, the output of that action/outcome, may not be passed automatically to the output of the action point even if the data type matches. Instead, the data item to which the action/outcome output has been assigned may be considered as part of the "context" of the action point. The expression editor console may keep knowledge of the "context" and display the "context" to the configurator. However, the expression editor may not track whether the configurator uses the data in a step which precedes the step which added data item. For example, if the data is added to context in the second action in the action point, but the first action in the action point is edited later to use the data, the configurator may not receive an error or warning, depending on a configurable option to disable providing a warning. The configurator may create a variable for use as output of activities and actions. Fields made available to the configurator for configuration may be limited to those in context as defined above, and may also be limited by the data type of the field. The pages of the expression editor may be coded in a three column metaphor.

FIGS. 27A and 27B show an example of an action page with Get Expression Result (True or False) selected. The Get Expression Result 2706 activity returns the true or false evaluation of the selected expression, and may be associated to an action or an outcome). There may be multiple actions/outcomes related to an action point which contain one or more of these result activities. The user may specify N_OUPT_DATAITEM for the action or outcome. The action page validates that data has been populated and persists the data to the database. If the outcome/action selected has an output but no output is selected, the expression editor associates the GetExpressionResultAsBoolean activity with the action if the GetExpressionResultAsBoolean activity is an outcome with an action. The activity instance input table may be populated with a unique key to the selected expression. The display name 2704 field may display for actions and outcomes. The action/outcomes included in the combo box for the creation of a specific action or outcomes are based on whether an outcome or action is being selected and the output characteristics of the action point. A console Application Value category may be created and include all of the entries in the Activity List. The console may create the appropriate activity instance or activity type to create an outcome or action based on the configuration selected by the user. If the user edits the selection of the action or outcome type, the expression editor clears the previous inputs in the Configuration section. The Error Behavior 2710 combo box displays values which are stored in the ACTY table B_TRNSCTNL and ACTY_INST_C_TXN_TYP. If the action or outcome does not support transactional functionality (e.g., B_TRNSCTNL is false or the action/outcome is not stored in the ACTY table) the control may not display. The 2710 combo box may display valid values of Cancel on Error (i.e., in database) and Save on Error (e.g., REQUIRENEW). The combo box may default to cancel on Error. 5: For those action/outcomes that have an output and the user can assign the output to an intermediate value instead of the application, the Destination Type combo box may display the valid values of "Application" and "Variable". Application may display if the output of the action/outcome matches the output of the action point. If a variable is selected, the Variable Name 2712 combo box may load with variables associated with the action point and of the same data type as the action/outcome output. The Destination Type combo box may not display for those activities which have no output. The name of the selected expression and the expression may be displayed. If user clicks on the expression name, the expression editor may save the state and load that Expression. When the user clicks "Done" from the define expressions page, navigation may transfer back to the action page, refreshing the expression data displayed. When the user selects the replace expression 2714 the define expressions page loads with no specific expression loaded. When the user clicks "Done" from the define expressions page, navigation may transfer back to the action page, refreshing the expression data displayed. The variable 2716 section may display if one of possible outcome destination types is 'Variable', and the outcome may default to 'closed'. The variable 2716 section may display variables that have been saved in the context of the action point. If the user clicks on the Add New Variable button, the Variable overlay may display. If the user clicks on the Modify button, the Modify Variable Overly may display, allowing the user to modify the variable which has the selected radio button. The Add New button may be disabled until the configurator selects the value of the output to be returned in the variable, because the expression editor console may need knowledge of the data type of the variable to be created.

FIGS. 28A and 28B show an example of an action page with Get Calculation Result selected. The activity returns the evaluation of the selected calculation, and the calculation may be associated to an action or an outcome. There may be multiple actions/outcomes related to an action point that contain one or more of the result activities. The user may specify N_OUPT_DATAITEM for the action or outcome. The action page may not provide navigation to add or edit a calculation 2804. The action page may display and function the same as the Get Expression Result, except that the action page applies to calculations. If the data is valid, the expression editor associates the GetExpressionResultAs activity with the action if the activity is an outcome. The selection of the "GetExpressionResultAs" architecture activity may be based on the output data type of the calculation. The activity instance input table may be populated with the key to the selected calculation. Calculations which are available, based on context, are loaded in the combo box by name. The Type, Output (or Page Name), Output Business Data Type, and Data Object Name fields may also display in the Action Point Properties 2806 portlet on the Rule or Action Page based on the business rules described in the Action Point Properties tab in the Action Point wireframe.

Figure 29:
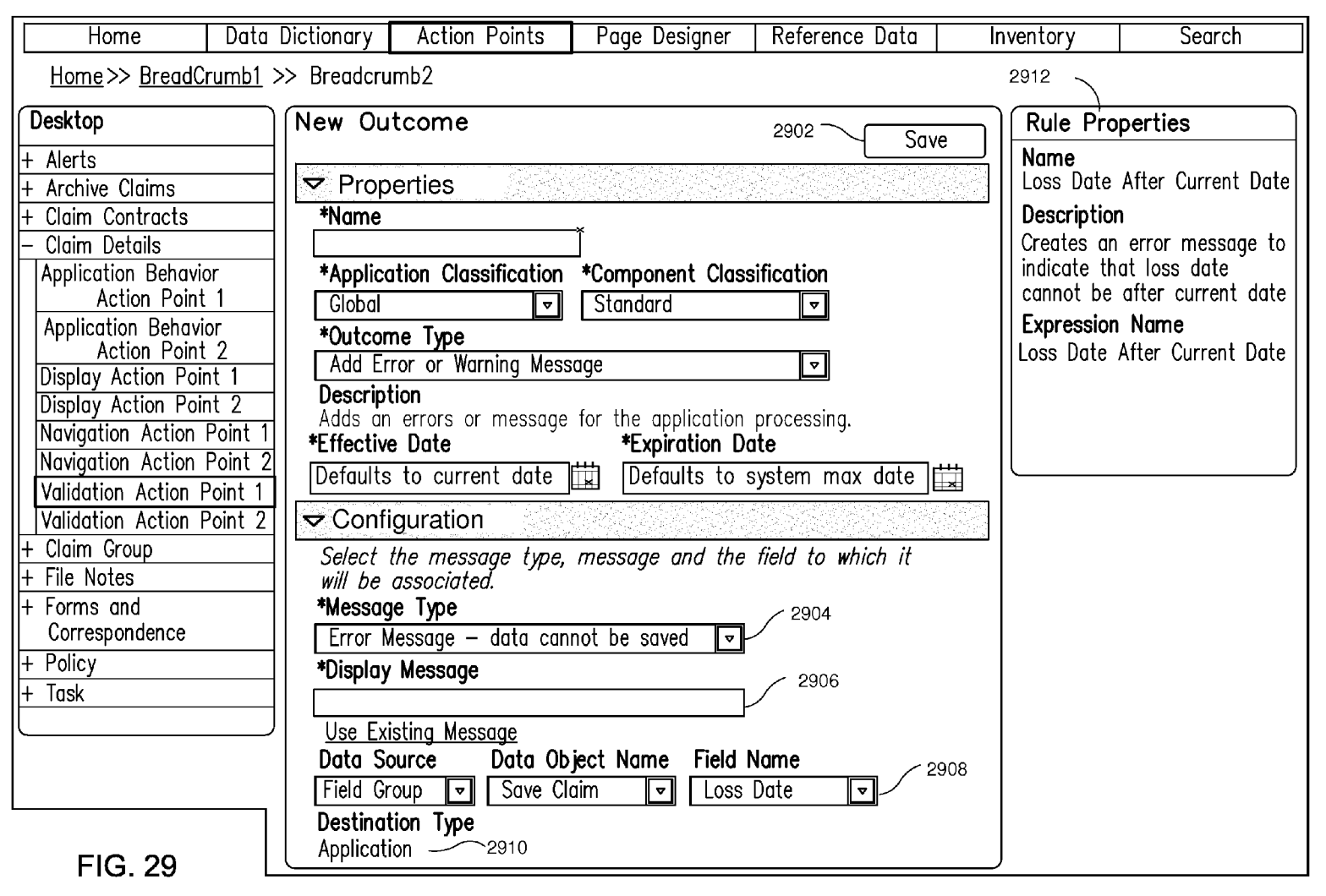

FIG. 29 shows an example of an outcome page 2900 with Add Error or Warning Message outcome selected. The activity adds a warning, error or informational message to the global error collection object. The activity may be associated with an action or an outcome. Multiple actions/outcomes may relate to an action point, and contain one or more result activities. The user may not specify N_OUPT_DATAITEM for the action or outcome, because the N_OUPT_DATAITEM adds messages to the global error collection. The Save 2902 button validates whether fields have been entered and may prompt the user with standard required messages. The user selects a standard or custom field, a message and a message type. The expression editor persists the action or outcome to the database, using the AddBusinessError architecture activity. If the user has typed in a new message, the user may also add the message as a new valid value in the AppErrorMessages Category. The activity instance input table may be populated with the configuration data. Valid values for the message type 2904 (category BusinessErrorTypes) include an error message—data cannot be saved, a confirmation message—requires confirmation, and an information message—no effect. The 2904 combo box defaults to Error Message. The user may type in a new display message 2906 or click on the Use Existing Message link. If the user selects the Use Existing Message link, a scoped search may display as an overlay. Selecting the field 2908 to which the message may be associated, the user selects whether the field is a field group for a field, and based on that selection the next combo box may load with the data objects that are in context. Similarly, once the data object is selected, the fields that are in context may load. If the data object has been added to the context, the fields of the data object may be considered in context. Variables may not be part of the data offered for selection. The expression editor displays the Destination Type field 2910 as "Application", although in the database the activity may not have an output value defined.

Figure 30B:
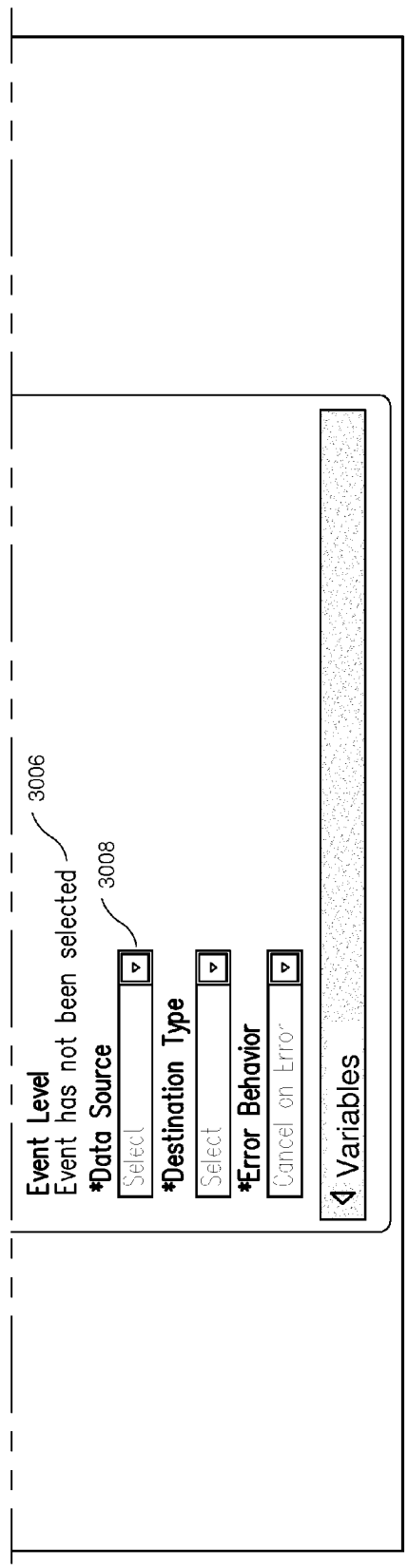

FIGS. 30A and 30B show an example of an action page with the 'Publish An Event' activity selected with no event selected. The 'Publish An Event' activity may insert a record (row) in the EVENT table, based on the selected action point. The configurator may provide values used to properly create a record in the EVENT table when the action or outcome is run by the logic engine. The activity may be associated with an action or an outcome, and there may be multiple actions/outcomes related to an action point that contain one or more of result activities. The user may specify N_OUPT_DATAITEM for the action or outcome. The activity output is the key of a newly inserted row in the EVENT table. The Save 3002 button validates whether the fields have been entered and may prompt the user with standard required messages. The 3004 combo box loads a list of action points that meet two qualifications, including first the action point type field is "Event", so that the C_EXTPT_TYP field in the EXTPT table is "EVENT", in order to capture action points that have been created specifically to be run as events, and second, the context of the action being configured includes the data item needed to configure the event. The Input Data Source, Destination Type and Error Behavior 3008 combo boxes may be disabled until an event is selected 3006. The Event Level may display as read-only data, and be stored the data in the EVNT_ENTY_TYP table (C_ENTY_TYP field) for that event. Valid values for the entity type may be in the AEF_EntityTypes category, stored in the ENTY_TYP table. Examples of valid entity type valid values include claim, line and participant. The Data Source 3008 may load with valid values of Field and Field Group. The Data Source 3008 may include those data items which are in context and derived, based on the data item included in the T_PRIM_KEYS_TBL field in the TBL table, and a specific data item record (row) may be based on the N_TBL field in the ENTY_TYP table. If the user selects Field in the Data Source combo box, the Data Source combo box may only have the data item that was specified in the T_PRIM_KEYS_TBL, if the data item specified in the T_PRIM_KEYS_TBL is in context as a variable, or as input to the extension point.

Tables 5 and 6 shows an example of combo boxes and values for a Field Group selection as the data source, the next combo box may display data objects that contain the data item specified in the T_PRIM_KEYS_TBL field, and a data item combo box may be displayed. For example, the Claim table may have been associated as the N_TBL for a specific event that has the C_ENTY_TYP display value of "Claim." The T_PRIM_KEYS_TBL may show ClaimID as the data item representing that key. Entities may be related to tables with multiple fields in primary key of the tables, and the expression editor may expose extended data to the user.

TABLE 5 example combo boxes and values for a Field Group selection

| * Data Source | * Data Object Name | * Field Name |
|---|---|---|
| Field Group | Save Claim | Claim ID |

TABLE 6 example combo boxes and values for a Field Group selection

| * Data Source | * Field Name |
|---|---|
| Field | Claim ID |

Figure 31B:
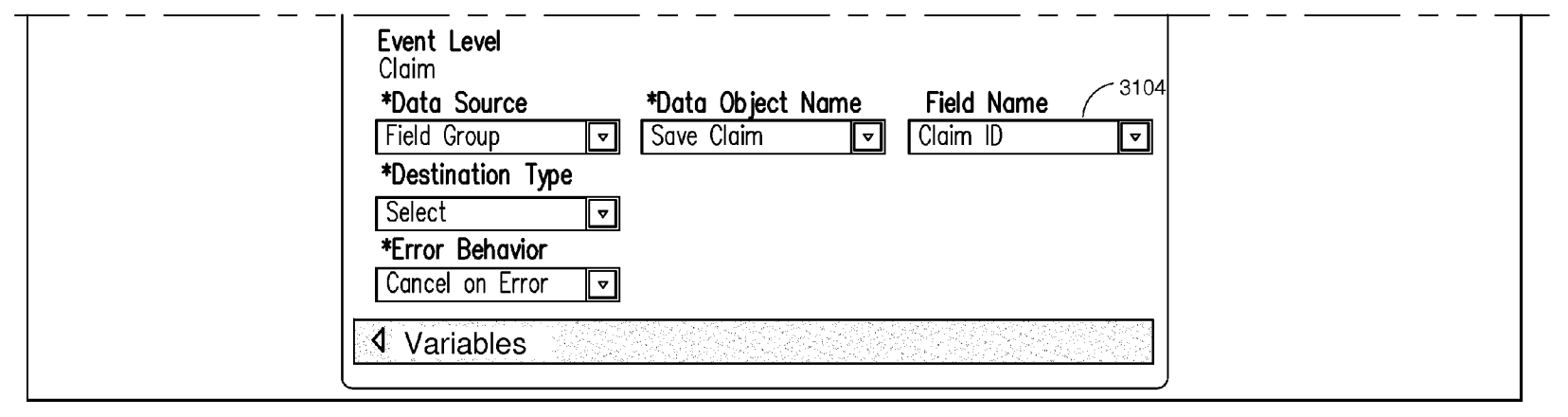

FIGS. 31A and 31B show an example of an action page with 'Publish An Event' selected and the Entity ID specified. FIGS. 31A and 31B illustrate an example of an action point for which the metadata indicates the event is at the claim level and that the Claim ID 3104 data item is one of the acceptable inputs to the event. Selecting the save 3102 button, the action page confirms whether the fields have been entered, and the action or outcome is persisted to the database. The EventType may be set to the action point key (N_EXTPT). The EntityID may be set to the selected data item fully qualified name. EntityType may be set to the Event Level code (C_ENTY_TYP). EventData may be a configurable option in the expression editor console.

Figure 32B:
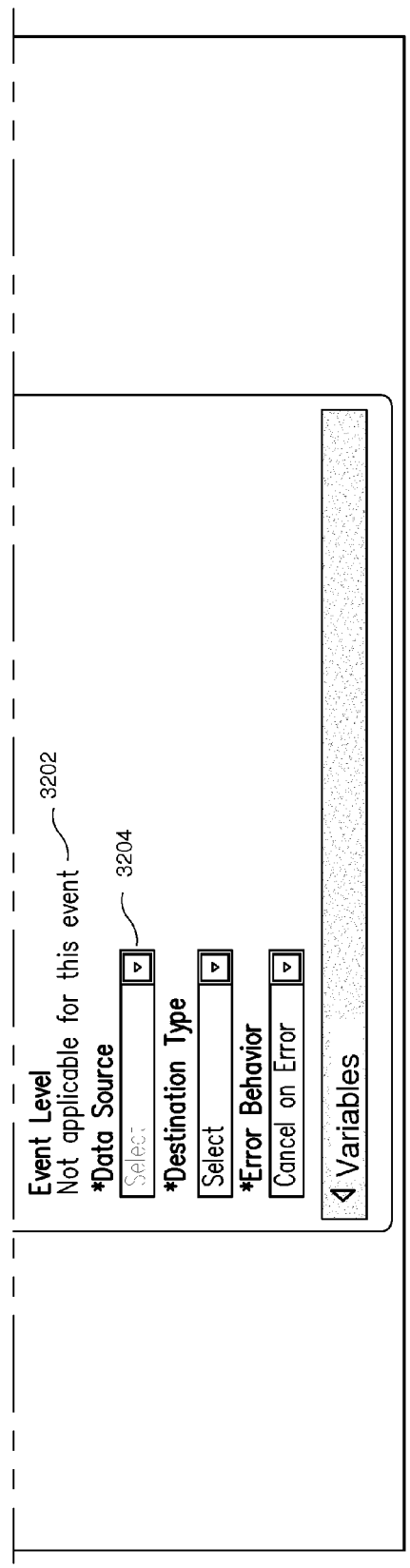

FIGS. 32A and 32B show an example of an action page with 'Publish An Event' selected and the event selected has no associated level. If an event does not have a level, the Event Level 3202 may display "Not applicable for the event". If an event does not have a level, the expression editor may disable the Data Source 3204 combo box because the Data Source combo box does not apply.

Figure 33:
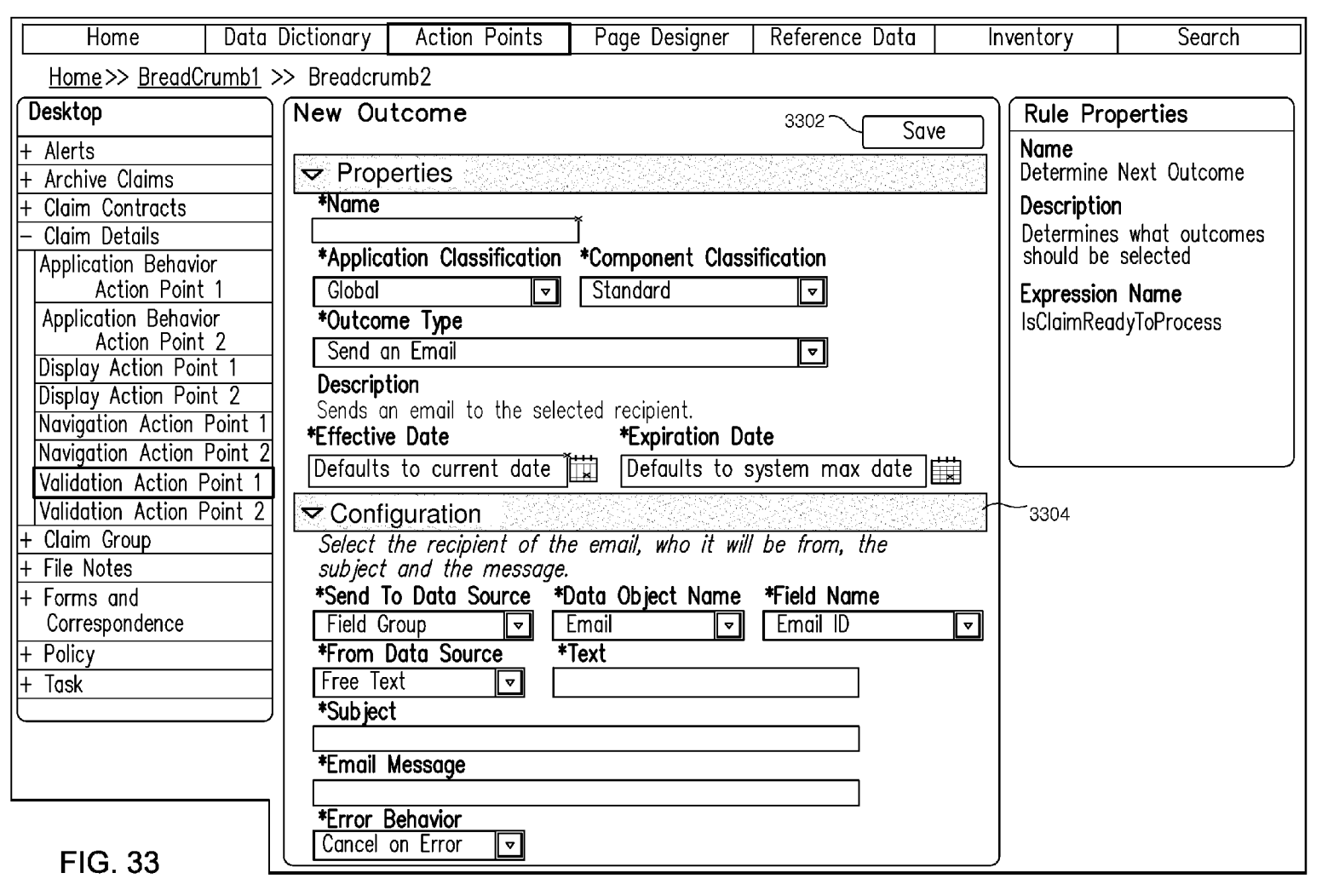

FIG. 33 shows an example an outcome page with Send an Email selected. FIG. 33 illustrates the selection of the Field Group for the selection of the Send to Data Source and Free Text as the From Data Source. Two inputs may not be displayed on the page, including SMTP server and Email Category Source. The expression editor may not require the SMTP server and Email Category Source fields, because the architecture may utilize a defaulted value as defined in the ACTY_INPT table for the SendMail activity. The Destination Type combo box may not be displayed because the action/outcome does not have an output. The Send an Email activity sends an email to utilizing the configured send to and from email addresses, subject and message, and the activity may be associated to an action or an outcome. Multiple actions/outcomes may be related to an action point, and contain one or more result activities. The N_OUPT_DATAITEM may not be specified for the action or outcome because the activity does not have any output. The Save 3302 button may validate that all required fields have been entered (standard required messages). The expression editor then persists the action or outcome to the database, using the SendMail architecture activity. The activity instance input table may be populated with the configuration data. Valid Values 3304 for "Send To" and "From" Selection include Field, Field Group, and Free Text. The expression editor loads the data objects in context for selection by the user.

FIG. 34 shows an example of an outcome page with Assign Value to a Custom Data Field selected. The Assign Value activity updates a specific custom field with the data entered by the configurator. The Assign Value activity may be associated with an action or an outcome. Multiple actions/outcomes may relate to an action point that contains one or more of result activities. The user may not specify N_OUPT_DATAITEM for the action or outcome because the Assign Value activity does not have any output. The Save 3402 button may validate that the fields have been entered (standard required messages). The expression editor persists the action or outcome to the database, using the SetExtendedData architecture activity. The activity instance input table may be populated with the configuration data. The expression editor may load the 3404 combo box only with those custom data objects for which the key is in context. The expression editor may store the custom data objects in the DATAITEM_TBL table, and stores the data items that have the primary keys to specific custom data objects (extended tables). The data item name which has the primary key to the selected custom data object may be passed in as the ExtendedDataKeyItem field when configuring the action or outcome. The Data Source 3404 combo box may be disabled until a selection is made from the Field 3406 combo box. Valid values in the Data Source combo box may be Free Text, Field and Field Group. If Free Text is selected, the text box which is displayed may be masked to match the data type of the field selected. If the field selected has an associated category, Valid Value may be made available instead of Free Text. If Field or Field Group is selected, the subsequent combo boxes may be populated only with those items that match the data type of the field selected and that are in context.

Figure 35:
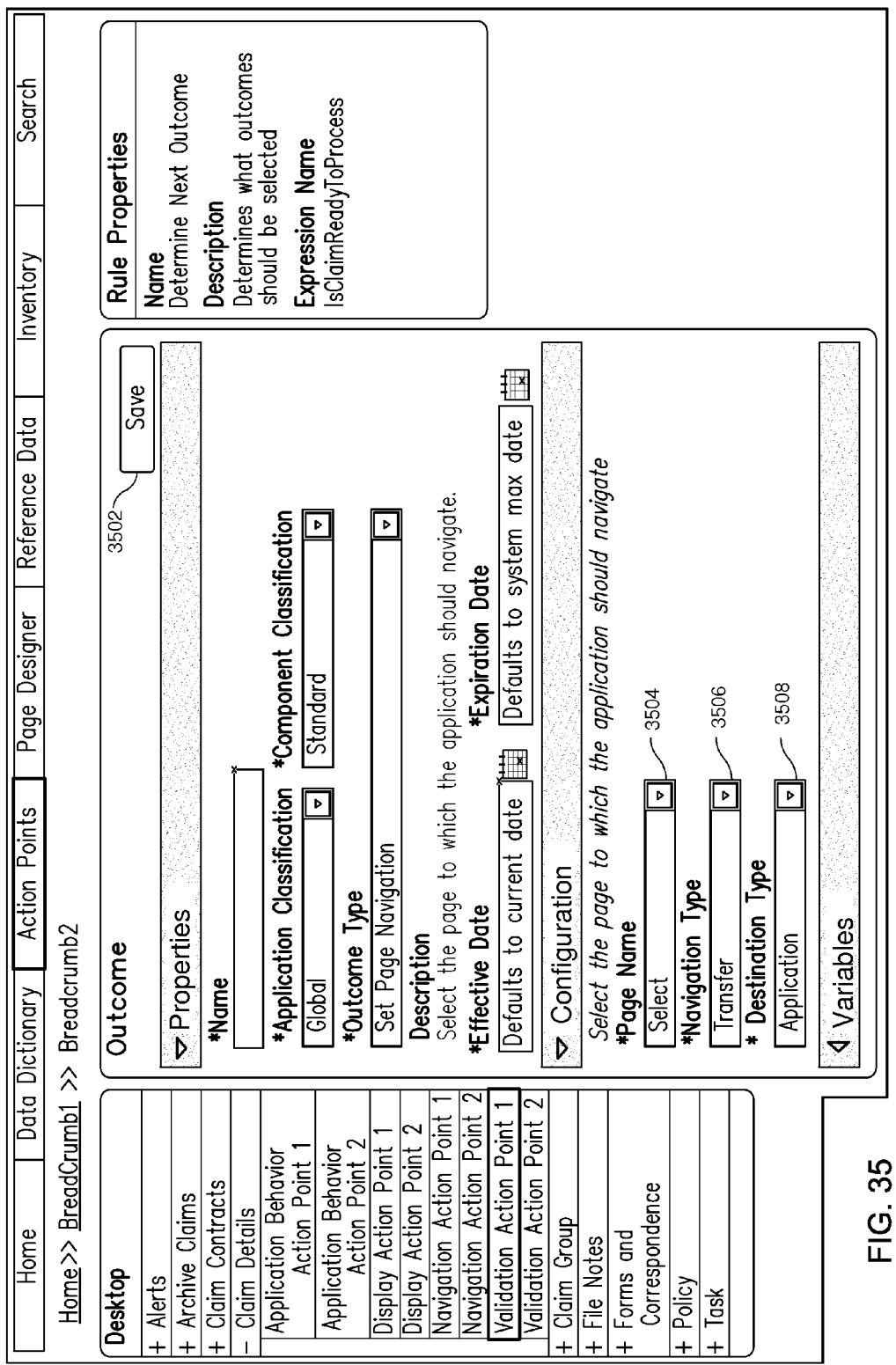
FIG. 35 shows an example of an action page with Set Next Page selected.

FIG. 35 shows an example of an action page with Set Next Page selected. The Set Next Page activity causes the application to navigate to the selected page. The Set Next Page activity may be associated with an action or an outcome. Multiple actions/outcomes may relate to an action point that contains one or more result activities. The user may specify N_OUPT_DATAITEM for the action or outcome. The N_OUPT_DATAITEM activity output may be an object of the NavigationDestination datatype. When the Save 3502 button is selected the expression editor may validate that data has been populated and persists the data to the database. The GetNavigationDestination activity is associated with the action if the activity is an outcome, and associated with the action point if the activity is an action. The activity instance input table may be populated with the configured data. The combo box may load with the 3504 page names to allow the user to select the page to navigate to, and the list to those pages for which the FQN's in the PAGE_URL_PARAM table may be required (B_RQRD) are included in context. The Navigation Type 3506 may default to Transfer, but the valid values may be Backward, Forward and Transfer. Valid values for Destination Type 3508 may include Application and Variable.

Table 7 below shows examples of Select Value Rules that apply to Business Service Action Points, including: EXECONE, EXECMANY and EXECBOOL (referred to in Table 7 as Single Item, Multiple Items and True/False). Table 7 shows information related to data sources available for Select Value action or outcome and Arch data that may be created. The select value rules may insert a row in the EXTPT_ACTN_ACTY table, populate C_EXTPT_ACTN_ACTY_TYP with the key value, and otherwise populate with ACTYINST. The select value rules may be actions or outcomes, and some of the select value rules may only be an outcome. Tabs follow to illustrate the Data Sources available based on conditions above. Some action points may have multiple data sources available based on the characteristics of the action points and/or the data sources available as described above.

TABLE 7

Select Value Rules Examples

| Cases Where Available - Action Point | Data Sources Available | Arch Data Created |
|---|---|---|
| Output is Single Item, Return Cat populated, Output datatype is String and configuring an outcome*** | Valid Value, Category read only, valid value combo box | RTNCATKEY* |
| Output is Single Item, Multiple Items, and output data item is a group and configuring an outcome*** | Field Group, Data Object Name combo box | RTNCNTXT* |
| Output is Single Item, Multiple Items or TrueFalse, and Output data item is not a "group" and configuring an outcome*** | Field, Field Name combo box AND Field Group, Data Object Name combo box and Field Name combo box | RTNCNTXT* |
| Output is Single Item, Multiple Items or TrueFalse, Output datatype is not a "group" and configuring an outcome*** | Free Text, text box masked as output data type | RTNCONST* |
| Output is Multiple Items, Return Cat populated and Output datatype is Ref Data Item and configuring action or outcome** | Valid Value, Category read only, valid value multi-select combo box | GetActionResultAsItems |
| Output is Multiple Items, Return Cat populated and Output datatype is Ref Data Partial Item and configuring action or outcome** | | GetActionResultAsPartialItems |
| Output is Multiple Items, Return Cat populated and Output datatype is String and configuring action or outcome** | | GetActionResultAsStrings |

FIG. 36 shows an example of an Outcome-RTNCATKEY. When the save 3602 button is selected the expression editor validates the Outcome-RTNCATKEY fields have been entered, and validates that at least valid value has been selected. The expression editor persists the data to the database. The expression editor creates an outcome of type RTNCATKEY and populates the T_RTRN_VAL field with the selected category key. The action point return category may not be modified by the configurator. The action point return category 3604 combo box displays the valid values for the action point return category, shown as a single select as one example.

FIG. 37 shows an example of an outcome page with Select Value selected. The Select Value activity may be used as an outcome. The Field Group activity may be selected as the data source and the action point output is a data group type data item. The outcome may return the selected data object to the application. The outcome page validates that fields have been entered, and also validates that at least data object has been selected. Then persists to the database. When the save 3702 button is selected the Outcome page creates an outcome of type RTNCNTXT and stores the data object data item name in the N_RTRN_DATAITEM_FQN field. The outcome page determines whether the data items offered in the selections match the output data type of the action point and are in context, which drives the data objects that may be included in the Data Object Name combo box. An extended table may be specified as the output of an action point, but business data objects may be more likely included over.

FIG. 38 shows an example of Outcome-RTNCNTXT-output non-group type. FIG. 38 shows an example of an outcome page where Select Value selected (used as an outcome) and the action point output is not a group type data object. Although the example shows Field Group Data Source selected the Field Data Source is another selectable option. The outcome shown as an example returns the selected field to the application. The outcome page validates that fields have been entered, validates that at least field has been selected. then persists new outcome data to the database. The outcome page Creates an outcome of type RTNCNTXT and stores the fully qualified data item name in the N_RTRN_DATAITEM_FQN field. When the data items offered in the selections match the output data type of the action point and in context, the fields are entered in the 'Field Values to Return' in the combo box.

FIG. 39 shows an example of an outcome page with 'Select Value' selected. The Select Value activity may be used as an outcome. The Free Text may be selected as the data source. The outcome may return the entered constant to the application. When the save 3902 button is selected the outcome page validates that fields have been entered, validates that a constant has been entered, and then persists the outcome to the database. Creates an outcome of type RTNCONST and stores the value in the appropriate field as specified in the Activity Type Info tab. The 3904 textbox may have the appropriate mask based on the output data type of the action point.

Figure 40:
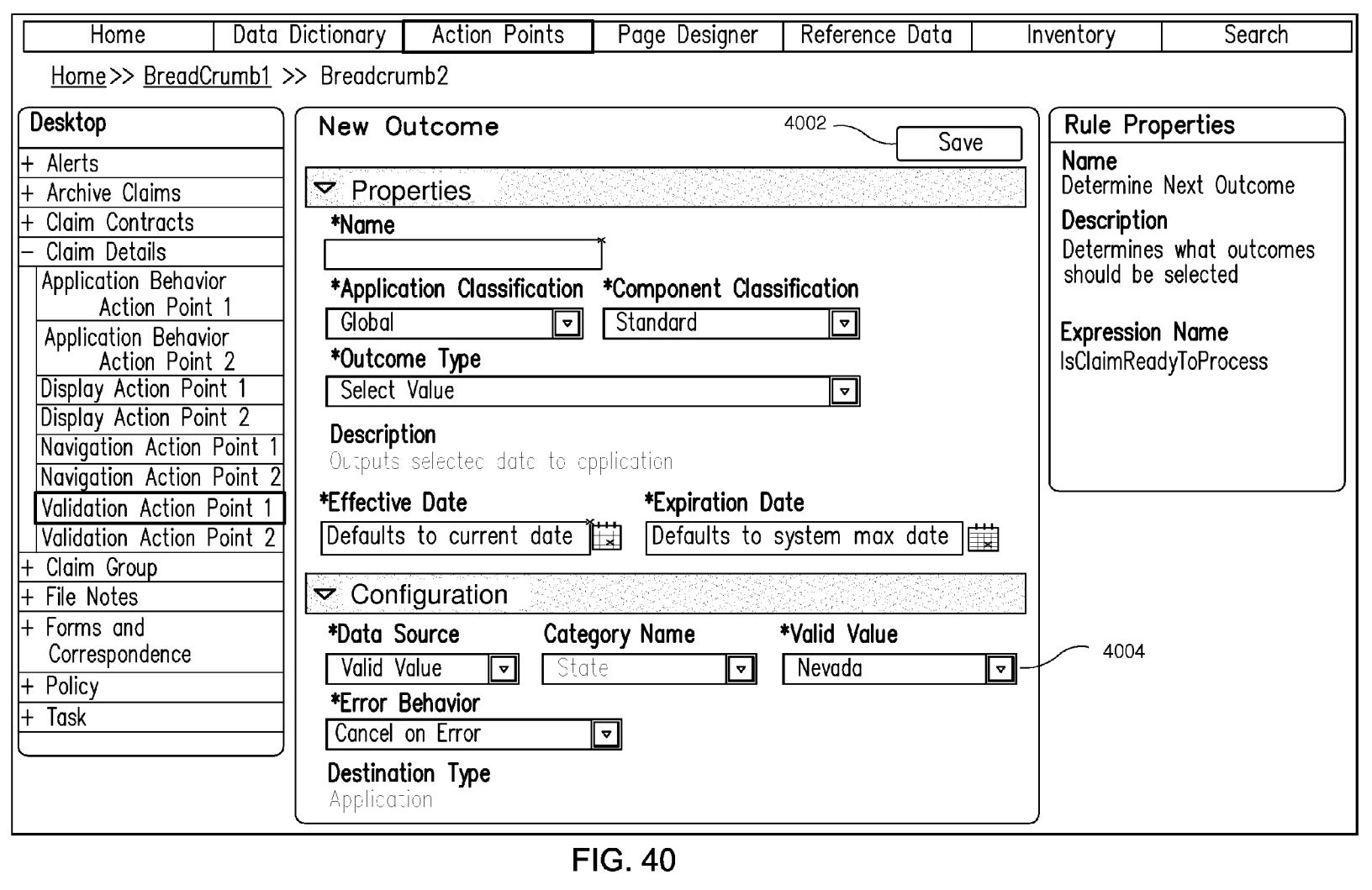

FIG. 40 shows an example of an outcome page with Select Value selected and illustrates the case in which the Select Value action/outcome may be associated to an action point as an action. The action/outcome may return a list of RefData Item Classes, RefData Partial Item Classes or Strings, depending on the output of the action point. When the save 4002 button is selected the outcome page may validate that fields have been entered and may prompt the user with standard messages, and the user selects at least one valid value. Once the data is validated, the outcome page may persist the outcome data to the database as an action or an outcome. Based on the action point output data type, an activity instance may be created. Example architecture activities may apply, including: GetRefDataKeysAsItems, GetRefDataKeysAsPartialItems and GetRefDataKeysAsStrings. Each of these three activities corresponds to a specific action point output data type. The console may select the appropriate architecture activity to associate based on the action point's output data type. For example, if the output data type of the action point is string, the console may use the GetRefDataKeysasStrings activity. If the output data type is RefData Item Class, the console may use GetRefDataKeysAsItems and if the output data type is Ref Data Partial Item Class the output data type may use GetRefDataKeysasPartialItems. Adds the selected category key(s), comma delimited, to the ACTY_INST table. The multi-select list box may be loaded based on the action point return category.

FIG. 41 shows an example of an outcome page with Stop Processing of Action Point selected. The Stop Processing of Action Point may only be used as an outcome. The user may indicate that no further processing of the action point may continue. The Stop Processing of Action Point is selectable for outcomes in the business service and event action point types. When the save 4102 button is selected the outcome page validates that fields have been entered, persists the data to the database, and creates an outcome of type STOP. No configuration 4104 may be available for The Stop Processing of Action Point outcome. The architecture dictates that one of the outcomes may be selected per "If" outcome and one per "Else" outcome in a rule.

Figure 42:
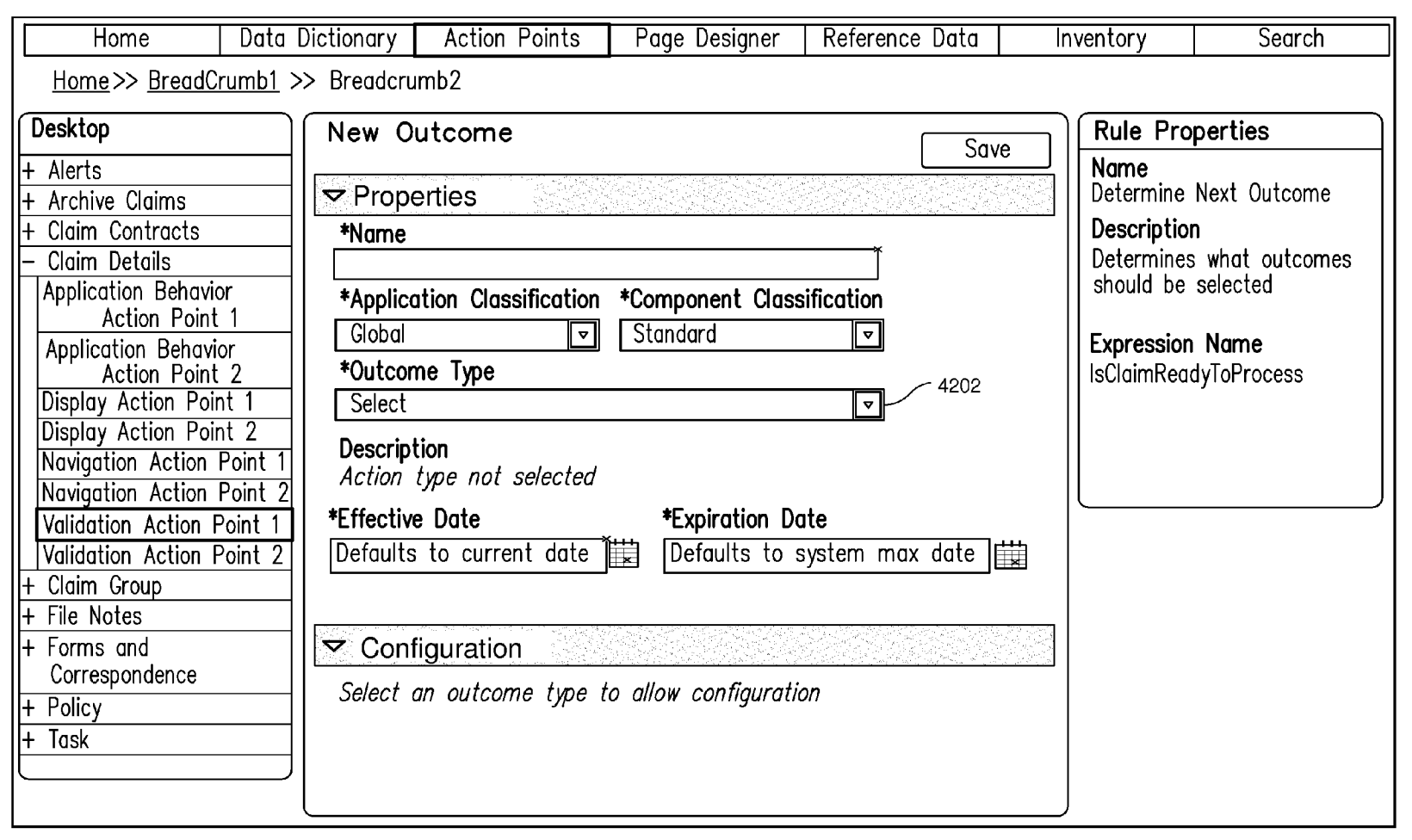

FIG. 42 shows an example of an action/outcome page when a user first clicks the Add Outcome button from the Rule Details page and selects Global and Standard classifications. After the configurator selects an outcome type 4202, the Configuration section may load as appropriate for that selection.

FIG. 43 shows an example of an action/outcome page when a user first clicks the Add Action button from the Action point page and selects Global and Standard classifications. Details. After the configurator selects an outcome (action type) 4302, the Configuration section may load as appropriate for that selection.

FIG. 44 shows an example of an outcome page for page outcomes and/or actions that support for page (browser-side) action points. The Save 4402 button may validate that fields have been entered and may prompt the user with standard required messages to indicate when a field needs an entry. The user selects the display group and field name. The outcome page may then persist the action or outcome to the database, using the appropriate architecture activity. FIG. 44 shows an example of a rules properties 4406 portal. The activity instance input table may be populated with the configuration data, which may be a control path of the selected field. Valid values 4404 for the outcome type include Enable Edit for Field, Disable Edit for Field, Show Field, and Hide Field. The architecture activities that correspond to these values are EnableElement, DisableElement, ShowElement and HideElement. The user selects the Data Source for the field related to the activity. Valid values may be Display Group and Field Group. If Display Group is selected, the second combo box may display containing all of the display group names on the page. After selecting a display group, the Field combo box may load with the data item names of those data items which have been associated to that display group (DSPLY_GRP_DATAITEM table) display group name on the page. The Field combo box loads with the fields associated with the display group. If the Field Group is selected, the user may select from the entries in the N_DATAITEM_FQN field of the PAGE_CLS_CTRL table. The expression editor may sort the entries by the last data group so that the user can select the data group and the field. For example, SaveClaim.Participant.Age and participant.gender may both be shown under the data object name of Participant. If a field is a hidden field, the field may not be included in the list.

Table 8 shows example action points available for server side action points. EXTPT_ACTN_ACTY.C_EXTPT_ACTN_ACTY_TYP is ACTYINST. If no output data item is selected and a action point data type matches, the action point data type may be assigned to the action point output. If the action point type is a single item, the expression editor may cover over the previous value, if any exists. If the action point type is list of items, the output may continue to append any action/outcome outputs which have the appropriate datatype.

TABLE 8 example action points available for server side action points

| Server side action/ outcome selection for console | Corresponds to Architecture Activity/Type Below | Can Select Output data item?** |
|---|---|---|
| Get Expression Result* | GetExpressionResultAsBool | Yes |
| Get Calculation Result* | GetExpressionResultAs... (All except for above) Console may select the appropriate activity based on output datatype of selected calculation. | Yes |
| Add Error or Warning Message* | AddBusinessError | NA, adds to global error collection |
| Publish an Event* | PublishEvent | Yes |
| Send an Email* | SendMail | NA |
| Populate Field* | SetExtendedData | NA |
| Set Page Navigation* | GetNavigationDestination | Yes |
| Select Value*** * | GetRefDataKeysAsItems, GetRefDataKeysAsPartialItems or GetRefDataKeysAsStrings. Console may select based on output datatype of action point. | No, only goes to action point output |
| Select Value*** | Not an arch activity - Set EXTPT_ACTN_ACTY.C_EXTPT_ACTN_ACTY_TYP field to RTNCATKEY (Return RefData Category Key) Only for outcomes | No |
| Select Value*** | Not an arch activity - Set EXTPT_ACTN_ACTY.C_EXTPT_ACTN_ACTY_TYP field to RTNCNTXT (Return Context Dataitem) Only for outcomes | No |
| Select Value*** | Not an arch activity - Set EXTPT_ACTN_ACTY.C_EXTPT_ACTN_ACTY_TYP field to RTNCONST (Return Constant) Only for outcomes | No |

TABLE 8-continued example action points available for server side action points

| Server side action/ outcome selection for console | Corresponds to Architecture Activity/Type Below | Can Select Output data item?** |
|---|---|---|
| Stop Processing of Action Point | Not an arch activity - Set EXTPT_ACTN_ACTY.C_EXTPT_ACTN_ACTY_TYP field to STOP (Stop Processing of Action Point) Only for outcomes | NA |

Table 9 shows examples of Available action points for page (browser side) action points.

TABLE 9 examples of Available action points for page (browser side) action points

| Page (browser-side) action/ outcome selection for console | Corresponds to Architecture Activity |
|---|---|
| Enable Field for editing | Enable Element |
| Disable Edit for Field | Disable Element |
| Show Field | Show Element |
| Hide Field | HideElement |

Table 10 illustrates a table that stores definitions of different types of Action Activities that may be configured. EXTPT_ACTN_ACTY table includes C_EXTPT_ACTN_ACTY_TYP Field. Allows the user to select a specific activity to configure, select a value to return or STOP. RTN's may append the RTN output to the EXTPT output if the extension point type is list of items.

TABLE 10

Example of EXTPT_ACTN_ACTY Table

| Type | Comments |
|---|---|
| ACTYINST | Provides user with selection of all rows in ACTY table (browser vs. server). User provides input as needed to map to ACTY_INPT table. If user configures N_OUPT_DATAITEM (if applicable) value may NOT be returned in action point. |
| RTNCATKEY* | Assigns cat key as output of action point. Only applicable as a rule outcome for an action point in which N_RSLT_CAT is populated. User may select one key from that category. Not applicable to a browser-side action point. |
| RTNCNTXT* | Assigns value of specified data item as output of action point. Only applicable as a rule outcome for an action point in which C_OUPT_DATATYP is not NULL. User may select a data item which matches that data type. Not applicable to a browser-side action point. |
| RTNCONST* | Assigns constant value as output of action point. Only applicable as a rule outcome for an action point in which the C_OUPT_DATATYP is not NULL. User may enter a constant which matches that data type. Not applicable to a browser-side action point. |
| STOP | Processing of the action point may end. No additional actions, activities or outcomes may be executed. If the output of the action point has been populated, the output may be returned. Applies to both server and browser-side action points. |

Table 11 shows an example of the EXTPT_ACTN_ACTY table, and related field population based on value of C_EXTPT_ACTN_ACTY_TYP Field.

TABLE 11

Example of EXTPT_ACTN_ACTY table

| Columns in EXTPT_ACTN_ACTY | ACTYINST | RTNCATKEY | RTNCNTXT | RTNCONST | STOP |
|---|---|---|---|---|---|
| V_ACTY_INST | Contains id of the Activity Instance | Not applicable | Not applicable | Not applicable | Not applicable |
| N_RTRN_DATAITEM_FQN | Not applicable | Not Applicable | Contains the DataItem FQN of the item in context to return the value of | Not Applicable | Not Applicable |
| T_RTRN_VAL | Not applicable | Contains the category key to return | Not applicable | Contains return value if data type is "string" | Not Applicable |
| V_RTRN_VAL | Not applicable | Not applicable | Not Applicable | Contains return value if data type is "whole number" | Not Applicable |

TABLE 11-continued

Example of EXTPT_ACTN_ACTY table

| Columns in EXTPT_ACTN_ACTY | ACTYINST | RTNCATKEY | RTNCNTXT | RTNCONST | STOP |
|---|---|---|---|---|---|
| A_RTRN_VAL | Not applicable | Not applicable | Not Applicable | Contains return value if data type is "decimal" | Not Applicable |
| F_RTRN_VAL | Not applicable | Not applicable | Not Applicable | Contains return value if data type is "date/time" | Not Applicable |

FIG. 45 shows an example of the scoped search overlay that allows the user to search for a valid value in the AppErrorMessages category by a phrase in the category key display value. The search returns all messages in the AppErrorMessages category which contain the phrase 4502 entered by the user. By the default, the first item may be selected. Selecting the continue button 4504 returns the interface to the calling page with the category key for the selected message. Selecting the Close button 4506 returns the interface to the calling page without returning any value.

Figure 46:
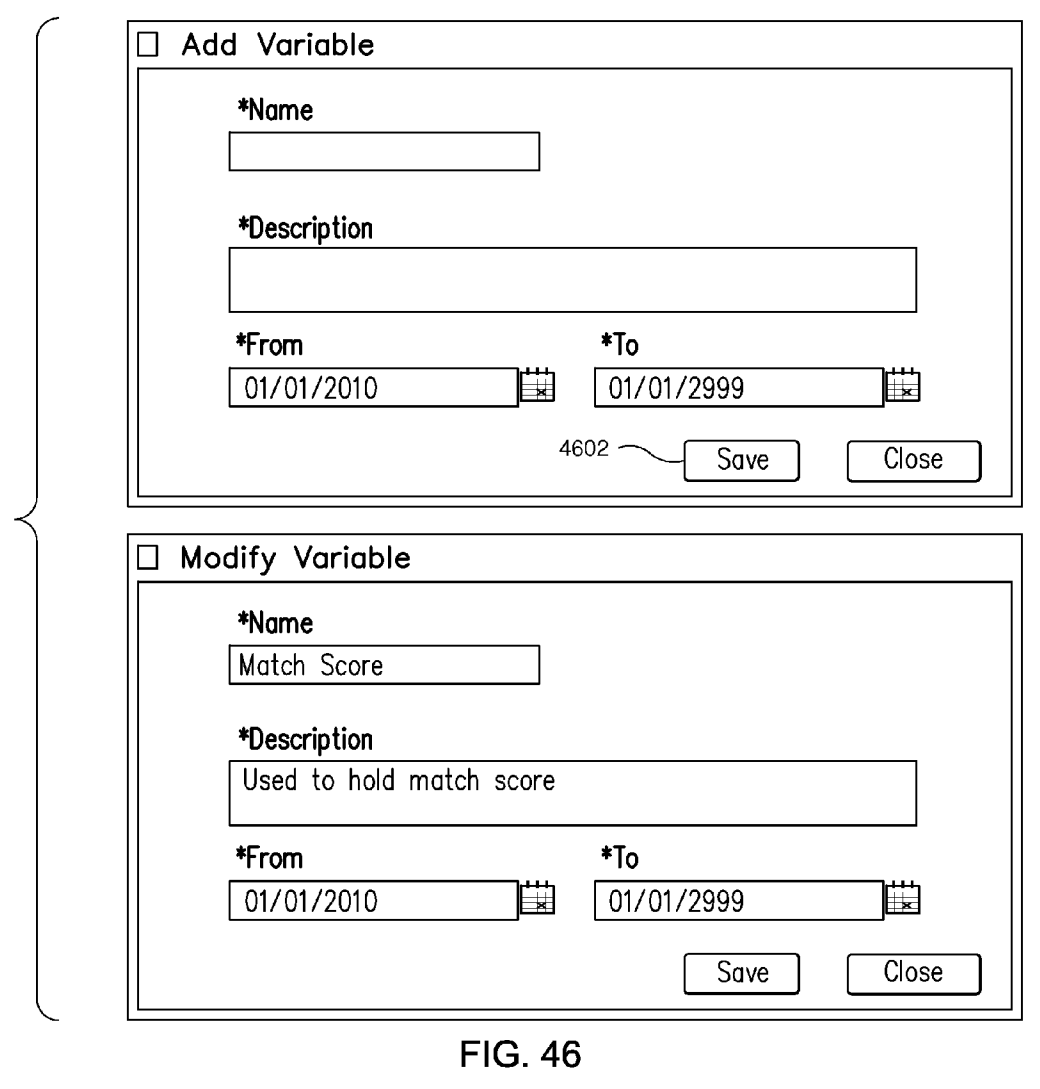

FIG. 46 shows an example of Add/Modify Variable Overlay 4600. The Add/Modify Variable overlay 4600 allows the configurator to add or modify a variable. A variable is a data item that is not associated to a standard data object or custom data object. A variable is created by the configurator for use in the action point. The variable may not display in the Data Dictionary or searches, and may be made available to the user in the context of an action or outcome that may use the variable. After validating, creating, or modifying an existing data item, the expression editor ensures that the Modal window is loaded with knowledge of the data type needed for the variable. Knowledge of the data type for the variable ensures that the data item may be properly added. A table may be created in the database that stores the association of a variable (data item) to an action point. The variable data item may be created as type "DATAGRP" with a datatype of the standard data object in the ACA database if the datatype is an object (like a standard data object). For example, if a variable is created for "SaveClaimDTO" and is named "MyClaim" by the configurator, a data item may be created with type of "DATAGRP" and the datatype of "SaveClaimDTO". A list of all variables associated to an action point may display on the outcome/action page for any outcome/action which can utilize a variable for output. A variable associated to the action point may be selected for use by the configurator in an expression or calculation. In determining if a calculation or expression may be made available for association to a rule or use in the return calculation output or return expression output, the expression editor ensures that the data items used in these items are in context in the action point. However, a variable may not be in context in the action point. Instead, if a user selects an expression or calculation that uses a specific variable, the expression or calculation may be automatically associated to that action point upon the save. The console may provide the configurator with an informational message upon the save in order to indicate whether to populate the variable through an outcome or action. The configurator then populates the variable with an activity, and adds the variable to the context of that action point, which allows the re-use of expressions and calculations which use variables. If the user does not want a variable to be made available for the action point any longer, the user may populate the 'expire' date and save, which may expire the relationship row in the expression editor console table that captures the relationship as explained above. If the variable is still in use in any items related to the action point, the console may provide a warning as is done in the rest of the console when a user modifies an item which may affect the usage of the item elsewhere.

Figure 47:
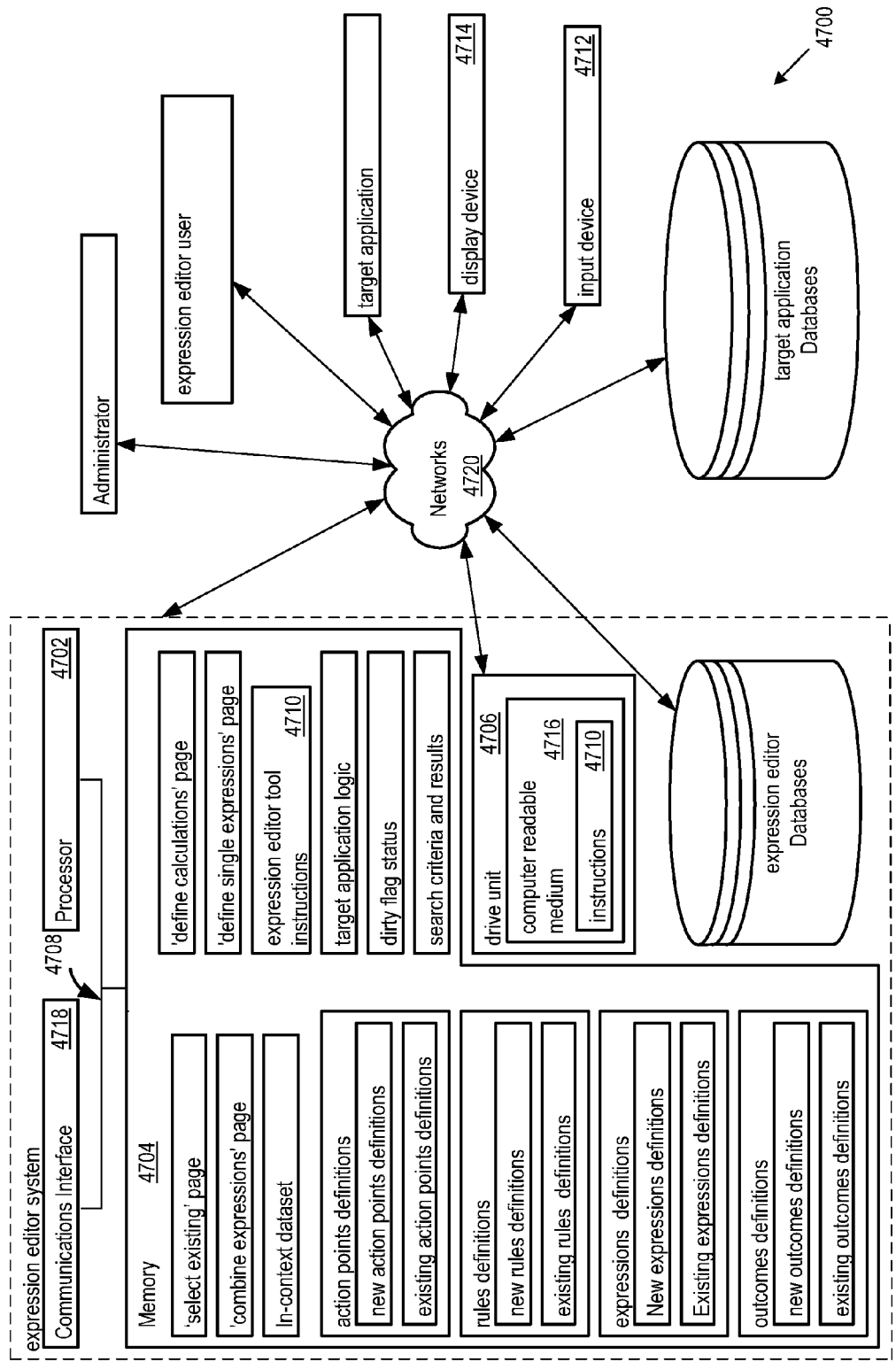
FIG. 47 shows a block diagram of a system that may implement the expression editor.

FIG. 47 shows a block diagram of an example expression editor system 4700 that may implement the expression editor tool with a graphical user interface display 4714. Any of the logic described above may be implemented in the system 4700 as the expression editor tool logic 4710 and may be encoded or stored in a machine-readable 4704 or computer-readable medium 4716 such as a compact disc 4706 read only memory (CDROM), magnetic or optical disk, flash memory, random access memory (RAM) 4704 or read only memory (ROM), erasable programmable read only memory (EPROM) or other machine-readable medium as, for examples, instructions for execution by a processor 4702, controller, or other processing device. In the course of executing the expression editor, the processor 4702 generates the 'select existing' page, the 'define calculations' page, the 'define single expressions' page, and the 'combine expressions' page. The medium may be implemented as any device or tangible component that contains, stores, communicates 4718, propagates, or transports 4708, 4720 executable instructions 4710 for use by or in connection with an instruction executable system 4700, apparatus, or device 4712, 4714. Alternatively or additionally, the logic 4710 may be implemented as analog or digital logic using hardware, such as one or more integrated circuits, or one or more processors executing instructions, or in software in an application programming interface (API) or in a Dynamic Link Library (DLL), functions available in a shared memory or defined as local or remote procedure calls, or as a combination of hardware and software.

Table 12 illustrates an action point call in an example target application.

TABLE 12

Action Point Call in an example Target Application

```
...
<code>
<code>
...
<action point call>
...
<code>
```

The expression editor system 4700 is a computer system for building or managing existing expressions 4722, action points 4728, rules 4744, and outcomes 4750. An expression 4722 (e.g., a new expressions 4724, and an existing expressions 4726) specifies an action 4728 (e.g., a new action 4730, and an existing action 4732) that may occur during execution of a target application 4734. A rule (e.g., 4744, 4746, 4748) is the combination of an expression (e.g., 4722, 4724, 4726) and outcomes (e.g., 4750, 4752, 4754) of the rule. The expression editor system 4700 includes a computer memory (e.g., 4704) operable to store an expression editor tool 4710, at least one database 4736, 4738 operable to store an action point definition (e.g., 4728, 4730, 4732) that includes an action point identifier that specifies an action point 4740 located in a target application program segment of code 4742, and a processor 4702 in communication with the memory 4704 and the database 4736, 4738. The processor 4702 of the expression editor system 4700 is operable to read the action point definition (e.g., 4728, 4730, 4732) from the database 4736, 4738, and determine from the action point definition (e.g., 4728, 4730, 4732) a dataset 4744 that is in-context at the action point 4740 in the application program code 4742. The processor 4702 is further operable to execute, from the computer memory 4704, the expression editor tool 4710, which when executed is operable to obtain data field selections from the dataset that is in-context at the action point in the application program code. The expression editor tool 4710 includes four pages including the 'select existing' 4756 page, the 'define calculations' 4758 page, the 'define single expressions' 4760 page, and the 'combine expressions' 4762 page that may cause dirty flag 4764 issues to arise during the user interactions for which the expression editor tool 4710 may use various techniques to address. The scoped search 4766 provided by the expression editor allows the user 4768 to search for existing expressions for which the fields are in context. The expression editor tool 4710 is operable to graphically build an expression (e.g., 4722, 4724, 4726) including the data field selections, graphically build an outcome that executes depending on the evaluation of the expression, link the outcome (e.g., 4750, 4752, 4754) and the expression to form an action point rule (e.g., 4744, 4746, 4748) for the action point (e.g., 4728, 4730, 4732), and save the action point rule in the database 4736, 4738 for execution when the application program code 4742 reaches the action point 4740.

Figure 48:
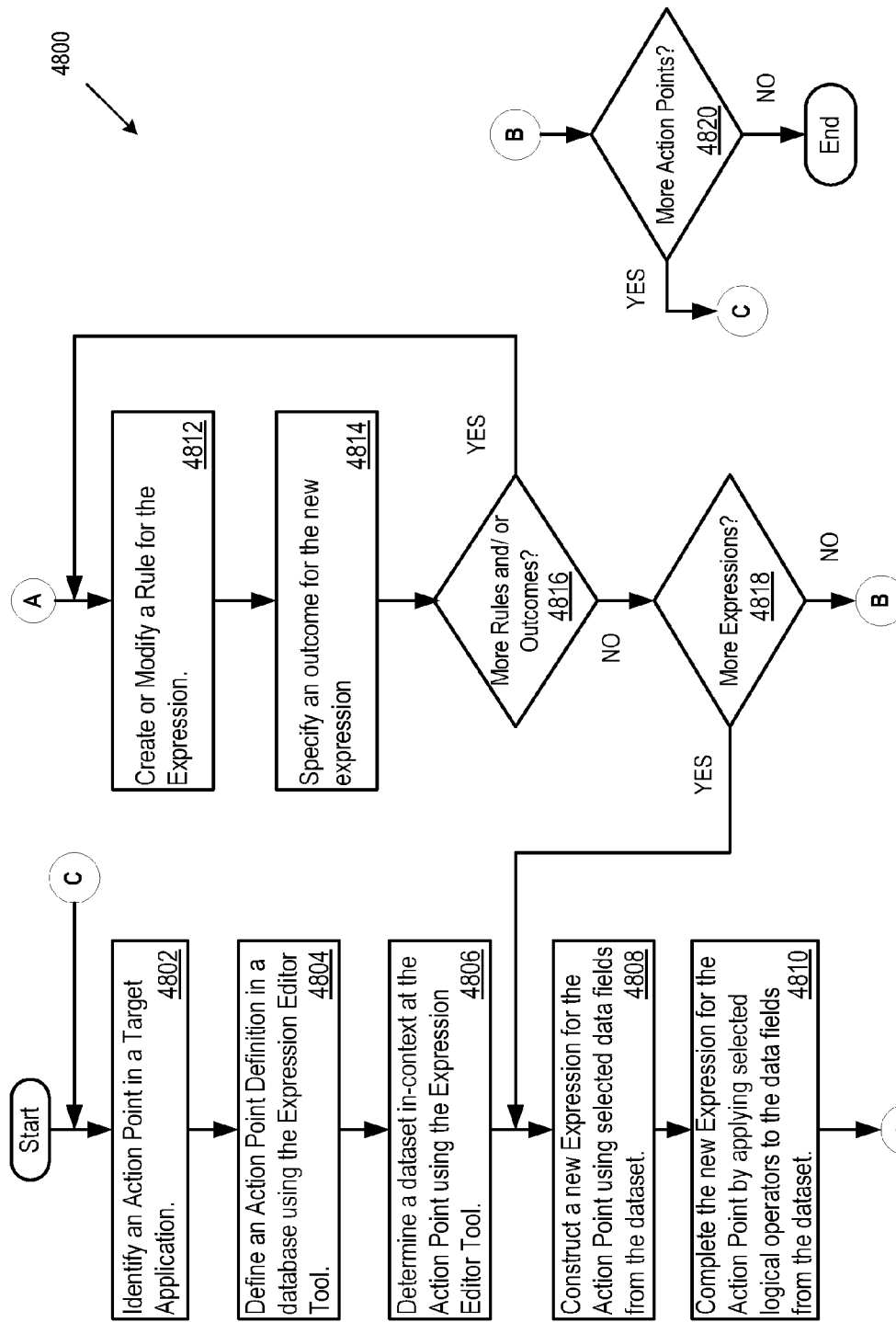
FIG. 48 shows a flow diagram for building a rule using the expression editor.

FIG. 48 shows a flow diagram for building a rule using the expression editor. The expression editor builds a rule that specifies an action programmed to occur during execution of a targeted application (4802). The expression editor system stores the expression editor tool in a computer memory. The expression editor tool allows the user to create an action point data model of the target application, creates and retrieves from a database, with a processor coupled to the computer memory, action points definitions (4804). The action point definition includes an action point identifier that specifies an action point located in application program code. The expression editor tool determines from the action point definition a dataset that is in-context at the action point in the application program code (4806). The expression editor tool displays an expression definition interface (console) that includes data source selectors for obtaining selected data fields from among the dataset and an operator selector for obtaining selected logical operators to connect the selected data fields. The expression editor tool constructs a new expression from the selected data fields (4808) and the selected logical operators (4810), using an outcome selection interface displayed to the user to create a rule (4812) that includes the new expression and a selected outcome (4814). The outcome selection interface includes an outcome selector for obtaining the selected outcome for the new expression. The user may use the expression editor tool to iteratively create and/or modify rules, outcomes (4816), expressions (4818), and action points definitions (4820). The expression editor tool stores the rule in the database linked to the action point definition. The user may execute the targeted application to realize the outcomes of the newly created and/or modified expressions, and using the expression editor tool, reuse expression information stored in the database to create new and/or modify expressions.

Table 13 illustrates a list of example expression editor tables.

TABLE 13

List of example expression editor tables

| Physical Table Name | Table Comment | Logical Table Name | Subject Area | RefData Category | Add Records? | Family |
|---|---|---|---|---|---|---|
| ACTN_TYP | This table defines the different types of "actions" that can occur at extension points. The logic engine contains special logic that understands how to process each type of action. | Action Type | Logic Engine | AEFActionTypes | N | AEF |
| ACTN_TYP_LCL | This table contains the localized description of the action types defined in the ACTN_TYP table. | Action Type Localized | Logic Engine | AEFActionTypes | Y | AEF |
| ACTY | Defines an Activity that can be executed from an Extension Point. | Activity | Logic Engine | AEFActivities | Y | AEF |
| ACTY_GRP | Defines a group name that can be used to categorize/group activities. An application may | Activity Group | Logic Engine | AEFActivityGroups | Y | AEF |

TABLE 13-continued

List of example expression editor tables

| Physical Table Name | Table Comment | Logical Table Name | Subject Area | RefData Category | Add Records? | Family |
|---|---|---|---|---|---|---|
| | create several activities that are used to return Reference Data and want to categorize them together to help a configurer quickly locate activities. | | | | | |
| ACTY_GRP_LCL | Contains locale-specific information about an Activity Group. | Activity Group Localized | Logic Engine | AEFActivityGroups | Y | AEF |
| ACTY_INPT | This table defines the Input fields for the Activity. If the B_INST_VAL_RQRD column is 1, then the configurer must provide a value for the input when using the Activity at an Extension Point. | Activity Input | Logic Engine | | Y | AEF |
| ACTY_INST | Defines an instance of an Activity that is configured and used at a specific Extension Points. Activity "Instances" allow a single activity to be used by multiple extension points with slightly different configuration. | Activity Instance | Logic Engine | | | AEF |
| ACTY_INST_INPT | This table specifies the input data for the configured instance of an Activity. The data can be thought of as 'Constant' data. For the activity, there is one row for each field in ACTY_INPT with B_INST_VAL_RQRD = 1 and may be additional rows where B_INST_VAL_RQRD = 0. | Activity Instance Input | Logic Engine | | | AEF |
| ACTY_LCL | Contains locale-specific information about an Activity. | Activity Localized | Logic Engine | AEFActivities | Y | AEF |
| AUTH_FAIL_ACTN | Contains the list of valid authorization failure actions used by the Authorization Extender control. | Authorization Failure Action | Authorization | AuthFailureActions | N | AEF |
| AUTH_FAIL_ACTN_LCL | Contains localized description for the valid authorization failure actions. | Authorization Failure Action Localized | Authorization | AuthFailureActions | N | AEF |
| AUTH_PROV | Defines the different types of authorizatio providers that are available. These providers must be configured within the application's config file for Enterprise Library. | Authorization Provider | Authorization | AEFAuthProviders | Y | AEF |
| AUTH_PROV_LCL | Contains localized entries For each of the EntLib authorization providers used. | Authorization Provider Localized | Authorization | AEFAuthProviders | Y | AEF |

TABLE 13-continued

List of example expression editor tables

| Physical Table Name | Table Comment | Logical Table Name | Subject Area | RefData Category | Add Records? | Family |
|---|---|---|---|---|---|---|
| AUTH_RLE | Defines an Authorization Rule that can be used to authorized access (read or write). | Authorization Rule | Authorization | AEFAuthRules | Y | AEF |
| AUTH_RLE_LCL | Contains locale-specific information about an Authorization Rule | Authorization Rule Localized | Authorization | AEFAuthRules | Y | AEF |
| BDT | Contains the definition of the valid Business Data Types | Business Data Type | Extended Data | AEFBusinessDataTypes | Y | AEF |
| BDT_LCL | Contains the localized data for the Business Data Type | Business Data Type Localized | Extended Data | AEFBusinessDataTypes | Y | AEF |
| BDT_UI_CTRL_TYP | Contains the list of UI Control Types that are valid for the given business data type. | Business Data Type UI Control Type | Extended Data | | Y | AEF |
| CNTNS_CHR_OPTN | This table stores the possible values for the (ContainsCharacters Option) field of the ContainsCharacterValidator. | Contains Character Option | Validation | ContainsCharOptions | N | AEF |
| CNTNS_CHR_OPTN_LCL | This localized table for CONTNS_CHAR_OPTN table. | Contains Character Option Localized | Validation | ContainsCharOptions | Y | AEF |
| DATAITEM | Defines all of the "data items" in the system. A data item could be a data element, extended data element, DTO, or alias. | Data Item | Data Dictionary | | Y | AEF |
| DATAITEM_FQN | Defines the fully-qualified name for a data element. For example, if the "State" data element exists in a DTO then this table would specify the full "path" (e.g., Contract.Address.State). | Data Item Fully Qualified Name Variation | Data Dictionary | | Y | AEF |
| DATAITEM_FQN_VLDTN | Specifies the validations that should be performed for a specific data item. | Data Item Fully Qualified Name Validation | Data Dictionary | | Y | AEF |
| DATAITEM_LCL | Contains locale-specific information about a Data Item. | | | | | |
| DATAITEM_TBL | This table is used to list the physical tables (as defined in the TBL table) that the given Data item has the primary keys for. The Data item must be defined as a "Data Group" (DATAITEM.C_DATA ITEM_TYP = 'DATAGRP') data item. | Data Item Table | | | U | AEF |
| DATAITEM_TYP | Defines the various types of data items that are defined in the Data Item table. | Data Item Type | Data Dictionary | AEFDataItemTypes | N | AEF |
| DATAITEM_TYP_LCL | Contains locale-specific information | Data Item Type | Data Dictionary | AEFDataItemTypes | Y | AEF |

TABLE 13-continued

List of example expression editor tables

| Physical Table Name | Table Comment | Logical Table Name | Subject Area | RefData Category | Add Records? | Family |
|---|---|---|---|---|---|---|
| | about a Data Item Type | Localized | | | | |
| DATATYP | Defines the data types that are available and used within the system. This includes both core .NET data types and application-specific types | Datatype | Data Dictionary | AEFDataTypes | Y | AEF |
| DATATYP_LCL | Contains locale-specific information about a Data Type. | Datatype Localized | Data Dictionary | AEFDataTypes | Y | AEF |
| DSPLY_GRP | This table defines a Display Group, which is a placeholder for containing one or more extended fields that will be displayed on a page. The application teams will define the majority of the Display Groups, but they will initially have zero fields in them. It is the client that is responsible of defining the fields to show in each display group. | Display Group | DGPH | AEFDisplayGroups | Y | AEF |
| DSPLY_GRP_DATAITEM | This table contains the list of logical table fields to show in a given display group. A display group can contain fields from one or more logical tables, as long as the logical table corresponds to a physical table that is associated with the display group in the DSPLY_GRP_TBL table. | Display Group Data Item | DGPH | | Y | AEF |
| DSPLY_GRP_LAY | This defines the different types of layouts for Display Groups. The architecture will support a few fixed layouts such as "single column", "two columns", and "single row". It will also support "custom layout", which requires the configurer to specify the layout in HTML. | Display Group Layout | DGPH | AEFDisplayGroupLayouts | Y | AEF |
| DSPLY_GRP_LAY_LCL | Contains locale specific information about a Display Group Layout | Display Group Layout Localized | DGPH | AEFDisplayGroupLayouts | Y | AEF |
| DSPLY_GRP_LCL | Contains locale specific information about a Display Group | Display Group Localized | DGPH | AEFDisplayGroups | Y | AEF |
| DSPLY_GRP_SRC_TYP | This table defines the different sources of data that can be displayed in a Display Group. | Display Group Source Type | DGPH | AEFDsplyGrpSourceTypes | N | AEF |

TABLE 13-continued

List of example expression editor tables

| Physical Table Name | Table Comment | Logical Table Name | Subject Area | RefData Category | Add Records? | Family |
|---|---|---|---|---|---|---|
| DSPLY_GRP_SRC_TYP_LCL | This table contains the localized descriptions of the display group source types defined in the DSPLY_GRP_SRC_TYP table. | Display Group Source Type Localized | DGPH | AEFDsplyGrpSourceTypes | Y | AEF |
| DSPLY_GRP_TBL | This table relates a Display Group to one or more tables (defined in the TBL table). This is how the developer that defined the Display Group can indicate what physical tables will be accessible (and therefore, what extension and logical tables are accessible). This table will be used by the Display Group maintenance application to prevent users from adding fields to a Display Group that come from a Logical Table that isn't accessible by the application. | Display Group Table | DGPH | | Y | AEF |
| ENTY_TYP | Contains the list of valid Entity Types. This table will be populated by application teams. | Entity Type | Event Service | AEFEntityTypes | Y | AEF |
| ENTY_TYP_LCL | Contains the localized description of the entity types. | Entity Type Localized | Event Service | AEFEntityTypes | Y | AEF |
| ERR_DSPLY_MOD | This table stores the possible values for the display mode of the validation error messages. | Error Display Mode | DGPH | ErrorDisplayModes | N | AEF |
| ERR_DSPLY_MOD_LCL | Thie localized table for the ERR_DSPLY_MOD table. | Error Display Mode Localized | DGPH | ErrorDisplayModes | Y | AEF |
| ERR_DSPLY_OPTN | This table stores the possible options for displaying the validation error messages. | Error Display Option | DGPH | ErrorDisplayOptions | N | AEF |
| ERR_DSPLY_OPTN_LCL | Thie localized table for the ERR_DSPLY_OPTN table. | Error Display Option Localized | DGPH | ErrorDisplayOptions | Y | AEF |
| ERR_LBL_OPTN | This table stores the possible values for the displaying the label associated with the control in error. | Error Label Option | DGPH | ErrorLabelOptions | N | AEF |
| ERR_LBL_OPTN_LCL | Thie localized table for the ERR_LBL_OPTN table. | Error Label Option Localized | DGPH | ErrorLabelOptions | Y | AEF |
| ERR_LNK_OPTN | This table stores the possible values for the displaying error messages as hyperlinks. | Error | DGPH | ErrorLinkOptions | N | AEF |

TABLE 13-continued

List of example expression editor tables

| Physical Table Name | Table Comment | Logical Table Name | Subject Area | RefData Category | Add Records? | Family |
|---|---|---|---|---|---|---|
| ERR_LNK_OPTN_LCL | The localized table for the ERR_LNK_OPTN table. | Error Link Option Localized | DGPH | ErrorLinkOptions | Y | AEF |
| EVNT | This is the (event queue). Will contain the events that have been published to be processed. Includes both new events and in-process events. After the event has been successfully processed it will be removed from this table. | Event | Event Service | | | AEF |
| EVNT_ENTY_TYP | This table contains the list of Entity Types that a given Event (which is a special type of Extension Point) can be used for. | Event Entity Type | Logic Engine | | Y | AEF |
| EVNT_HIST | Contains the history of all events that have been processed. | Event History | Event Service | | | AEF |
| EVNT_LOCK | Contains any locks for processing events for an entity. | Event Lock | Event Service | | | AEF |
| EVNT_STATUS | Contains the list of valid Event Status codes | Event Status | Event Service | EventStatus | N | AEF |
| EVNT_STATUS_LCL | Contains the list of valid Event Status codes and localized description | Event Status Localized | Event Service | EventStatus | N | AEF |
| EXPRSN | The Expressions are defined in this table. | Expression | Logic Engine | | Y | AEF |
| EXPRSN_FUNC | The Expression Functions are defined in this table. | Expression Function | Logic Engine | AEFExprsnFunctions | Y | AEF |
| EXPRSN_FUNC_LCL | This table contains locale-specific information about a given expression function. | Expression Function Localized | Logic Engine | AEFExprsnFunctions | Y | AEF |
| EXPRSN_GRP | This table is used to define names used to logically group together expressions. | Expression Group | Logic Engine | AEFExpression Groups | Y | AEF |
| EXPRSN_GRP_LCL | This table contains the localized descriptions of the expression groups | Expression Group Localized | Logic Engine | AEFExpression Types | Y | AEF |
| EXPRSN_LCL | This table contains the localized details of a given expression. | Expression Localized | Logic Engine | | Y | AEF |
| EXPRSN_TYP | This table defines the valid types of Expressions that can be configured and are supported by the execution architecture. | Expression Type | Logic Engine | AEFExpression Types | N | AEF |
| EXPRSN_TYP_LCL | This table contains the localized descriptions for the valid expression types. | Expression Type Localized | Logic Engine | AEFExpression Types | N | AEF |
| EXTPT | This defines an Extension Point in the application. Extension points are defined by | Extension Point | Logic Engine | AEFExtensionPoints | Y | AEF |

TABLE 13-continued

List of example expression editor tables

| Physical Table Name | Table Comment | Logical Table Name | Subject Area | RefData Category | Add Records? | Family |
|---|---|---|---|---|---|---|
| | the developer of the application and shipped with the application. Clients are not able to define new extension points, but they are expected to configure the existing extension points. | | | | | |
| EXTPT_ACTN | When an extension point is configured, the configurer must specify at least one "action" that is to be performed. The action could either be to evaluate a Rule or execution an Activity. Multiple actions could be specified. | Extension Point Action | Logic Engine | | Y | AEF |
| EXTPT_ACTN_ACTY | If one of the extension point actions is to evaluate a Rule, then this table will contain the list of Activities that should be executed based on the result of the Rule execution. | Extension Point Action Activity | Logic Engine | | Y | AEF |
| EXTPT_ACTN_ACTY_LCL | This table allows the user to provide a name and description of the Action Activity. This is helpful for others to understand what the configuration is doing and why it is being done. This information is localized. | Extension Point Action Activity Localized | Logic Engine | | Y | AEF |
| EXTPT_ACTN_ACTY_TYP | This table defined the different types of Action Activities that can be configured. | Extension Point Action Activity Type | Logic Engine | AEFActionActivityTypes | N | AEF |
| EXTPT_ACTN_ACTY_TYP_LCL | This table contains the localized description of the different types of Action Activities that are valid. | Extension Point Action Activity Type Localized | Logic Engine | AEFActionActivityTypes | N | AEF |
| EXTPT_ACTN_LCL | This table allows the user to provide a name and description of the Action. This is helpful for others to understand what the configuration is doing and why it is being done. This information is localized. | Extension Point Action Localized | Logic Engine | | Y | AEF |
| EXTPT_AUDIT | Contains audit information about the execution of actions and activities at an extension point. | Extension Point Audit | Logic Engine | | | AEF |
| EXTPT_AUDIT_LVL | Contains the definition of the various types of audit levels. | Extension Point Audit Level | Logic Engine | AEFExtptAuditLvl | Y | AEF |
| EXTPT_AUDIT_LVL_LCL | Contains localized information about the | Extension Point | Logic Engine | AEFExtptAuditLvl | Y | AEF |

TABLE 13-continued

List of example expression editor tables

| Physical Table Name | Table Comment | Logical Table Name | Subject Area | RefData Category | Add Records? | Family |
|---|---|---|---|---|---|---|
| | extension point audit level codes. | Audit Level Localized | | | | |
| EXTPT_GRP | Contains the names of groups that can be used to logically group together extension points that are similar in purpose, functional scope, etc. This is purely for the purpose of aiding in the organization of extension points. | Extension Point Group | Logic Engine | AEFExtensionPointGroups | Y | AEF |
| EXTPT_GRP_LCL | Contains locale specific information about extension point groups | Extension Point Group Localized | Logic Engine | AEFExtensionPointGroups | Y | AEF |
| EXTPT_INPT | This defines the data that will be in context when the extension point executes. This describes the data that is guaranteed to be available for rules on to execute against at the extension point. | Extension Point Input | Logic Engine | | Y | AEF |
| EXTPT_LCL | Contains locale specific information about an extension point | Extension Point Localized | Logic Engine | AEFExtensionPoints | Y | AEF |
| EXTPT_TYP | This defines the different types of Extension Points such as: Client-Side, Execute for Boolean, Return one Item, Return List, Execute Only | Extension Point Type | Logic Engine | AEFExtensionPointTypes | N | AEF |
| EXTPT_TYP_LCL | Contains locale specific information about an extension point type | Extension Point Type Localized | Logic Engine | AEFExtensionPointTypes | Y | AEF |
| FNCTL_DATA_GRP | Contains the names of functional groups that can be used to categorize/group data items together. This is purely for the purposes of organizing data items. | Functional Data Group | Data Dictionary | AEFFunctionalDataGroups | Y | AEF |
| FNCTL_DATA_GRP_LCL | Contains locale specific information about a functional data group. | Functional Data Group Localized | Data Dictionary | AEFFunctionalDataGroups | Y | AEF |
| HELP_TXT | This table supplies the names of Help items to be associated to a DATAITEM or Page Class Controll. | Help Text | Web | HelpText | Y | AEF |
| HELP_TXT_LCL | This table supplies the help context information for the locale of the associated Help name item. | Help Text Localized | Web | HelpText | Y | AEF |
| HPRLNK_DSPLY | Defines the different ways to display the target of a hyperlink when it is clicked. | Hyperlink Display | DGPH | HyperlinkWindowOptions | N | AEF |
| HPRLNK_DSPLY_LCL | Locale specific information about | Hyperlink Display | DGPH | HyperlinkWindowOptions | Y | AEF |

TABLE 13-continued

List of example expression editor tables

| Physical Table Name | Table Comment | Logical Table Name | Subject Area | RefData Category | Add Records? | Family |
|---|---|---|---|---|---|---|
| | hyperlink display types | Localized | | | | |
| LGCL_TBL | Contains the definition of a Logical Table. A physical table that has been enabled for extensibility will have a corresponding "extension table" (which is also a physical table). The application and clients can define one or more "Logical Tables" that will use the physical extension table for storing data. | Logical Table | Extended Data | AEFLogicalTables | Y | AEF |
| LGCL_TBL_DATAITEM | This contains the list of fields that are part of a given logical table. In other words, this table lists the "columns" of each logical table. | Logical Table Data Item | Extended Data | | Y | AEF |
| LGCL_TBL_LCL | Contains locale-specific information about a Logical Table | Logical Table Localized | Extended Data | AEFLogicalTables | Y | AEF |
| MDL_DATA_SVC | This table is used for defining the components in the system that implement the architecture defined IModelDataService interface. These components can then be used for retrieving model data (aka fixed fields) for display in a Display Group Placeholder on a web page. | Model Data Service | Data Dictionary | AEFModelData Services | Y | AEF |
| MDL_DATA_SVC_LCL | This table contains the localized name and description of a given model data service component. | Model Data Service Localized | Data Dictionary | AEFModelData Services | Y | AEF |
| NAV_DIR | This table contains the list of valid navigation directions that can be used when configuring a Navigation Destination object via the GetNavigationDestination activity. | Navigation Direction | Logic Engine | AEFNavigation Directions | N | AEF |
| NAV_DIR_LCL | This table contains the localized descriptions for the valid navigation directions | Navigation Direction Localized | Logic Engine | AEFNavigation Directions | N | AEF |
| PAGE_CLS | Defines the page classes within the application. | Page Class | Web | AEFPageClasses | Y | AEF |
| PAGE_CLS_CTRL | Contains the list of controls that are part of a given page class. | Page Class Control | Web | | Y | AEF |
| PAGE_CLS_DSPLY_GRP | This table contains the list of Display Groups that are either currently on the page | Page Class Display Group | Web | | Y | AEF |

TABLE 13-continued

List of example expression editor tables

| Physical Table Name | Table Comment | Logical Table Name | Subject Area | RefData Category | Add Records? | Family |
|---|---|---|---|---|---|---|
| PAGE_CLS_DTO | or are valid for configuring to display on the page. This table contains the list of DTOs that the developer has written code to make available to the Display Group Placeholder controls on the page. Fields within these DTOs could then be configured to appear in a DGPH on the page. | Page Class DTO | Web | | Y | AEF |
| PAGE_CLS_GRP | This table will be used to define functional/business groupings of pages. This will be helpful when users need to search for pages. | Page Class Group | Web | AEFPageClass Groups | Y | AEF |
| PAGE_CLS_GRP_LCL | This is the localized text for the associated PAGE_CLS_GRP | Page Class Group Localized | Web | AEFPageClass Groups | Y | AEF |
| PAGE_CLS_LCL | Contains locale specific information about a page class. | Page Class Localized | Web | AEFPageClasses | Y | AEF |
| PAGE_CLS_TBL | This table contains the list of tables (defined in the TBL table) that the given page has the primary keys for. This information is helpful for then knowing what Logical Tables (and therefore logical columns, aka extended fields) could be configured for display in a DGPH control on the page. | Page Class Table | Web | | Y | AEF |
| PAGE_URL_PARAM | This table contains the URL parameters that are necessary when navigating to a page. | Page URL Parameter | Web | | Y | AEF |
| REGEX | This table stores the regular expressions used by the Regular Expression validator. | Regular Expression | Validation | RegularExpressions | Y | AEF |
| REGEX_LCL | Thie localized table for the REGEX table. | Regular Expression Localized | Validation | RegularExpressions | Y | AEF |
| REGEX_OPTN | This table stores the possible values for the (RegularExpressionOption) field of the Regular Expression validator. | Regular Expression Option | Validation | RegexOptions | N | AEF |
| REGEX_OPTN_LCL | This localized table for REGEX_OPTN table. | Regular Expression Option Localized | Validation | RegexOptions | Y | AEF |
| RLTV_DTTM_UNT | This table stores the possible values for the (RelativeDateTimeUpperBoundUnit) and (RelativeDateTimeLowerBoundUnit) | Relative DateTime Unit | Validation | RelativeDateTimeUnits | N | AEF |

TABLE 13-continued

List of example expression editor tables

| Physical Table Name | Table Comment | Logical Table Name | Subject Area | RefData Category | Add Records? | Family |
|---|---|---|---|---|---|---|
| | properties of RelativeDateTimeValidator. | | | | | |
| RLTV_DTTM_UNT_LCL | Contains the localized description of the valid Relative Date Time Units. | Relative DateTime Unit Localized | Validation | RelativeDateTimeUnits | Y | AEF |
| RNG_BNDRY_TYP | This table stores the possible values for the (UpperBoundType) and (LowerBoundType" properties of Range validators, String Length Validator etc. | Range Boundary Type | Validation | RangeBoundary Types | N | AEF |
| RNG_BNDRY_TYP_LCL | This localized table for RNG_BNDRY_TYP table. | Range Boundary Type Localized | Validation | RangeBoundary Types | Y | AEF |
| TBL | This defines physical tables in the system. At a minimum this table should contain rows that correspond to the tables that the application team has enable for Data Extensibility. | Table | Extended Data | AEFTables | Y | AEF |
| TBL_LCL | Contains locale-specific information about a Table | Table Localized | Extended Data | AEFTables | Y | AEF |
| TXN_TYP | Defines the support types of transactional behaviors: Not Supported, Supported, Requires, Requires New | Transaction Type | Logic Engine | AEFTransaction Types | N | AEF |
| TXN_TYP_LCL | Locale specific information for the Transaction Types | Transaction Type Localized | Logic Engine | AEFTransaction Types | Y | AEF |
| UI_CTRL_TYP | This defines the different UI controls that can be used to display the data of an extended field. | UI Control Type | DGPH | UIControlTypes | Y | AEF |
| UI_CTRL_TYP_LCL | Contains locale specific information about a UI Control type | UI Control Type Localized | DGPH | UIControlTypes | Y | AEF |
| VLDTN | Define a specific validation that can be applied to one or more data items. | Validation | Validation | | Y | AEF |
| VLDTN_EXTN | Contains the validator specific data for the validation. | Validation Extension | Validation | | Y | AEF |
| VLDTN_LCL | Contains the localized Validation text | Validation Localized | Validation | | Y | AEF |
| VLDTR | Contains the definition of the standard Enterprise Library validators and any custom validators. | Validator | Validation | Validators | Y | AEF |
| VLDTR_LCL | Locale specific information for the Validators | Validator Localized | Validation | Validators | Y | AEF |

Table 14 illustrates table columns in an example EXPRSN table.

TABLE 14 illustrates table columns in an example EXPRSN table.

| Table Name | Table Column Name | Table Column Comment | Logical Column Name |
|---|---|---|---|
| EXPRSN | N_EXPRSN | This is the name given to the expression. This name will be referenced by other tables in the system. In addition, other expressions may reference this expression via this name. Therefore, it is best to provide a meaningful value for this column to aid in readability and debugging. | Expression Name |
| EXPRSN | D_BEG | This column contains the date that the record went into effect. It is possible for this date to be in the future. | Begin Date |
| EXPRSN | D_END | The column contains the date the the record will expire. This date must be greater than or equal to the D_BEG column's value. Setting this field equal to the D_BEG value will logically delete the record (i.e., make the record so it was never active). | End Date |
| EXPRSN | C_EXPRSN_GRP | | Expression Group Code |
| EXPRSN | V_DFLT_LCL_ID | | Default Locale Id |
| EXPRSN | C_OUPT_DATATYP | This column defines the data type that the expression will evaluate to. A "Rule" is an expression that evaluates to a Boolean data type. Other expressions can be defined that evaluate to numeric values and can be used as calculations. | Output Datatype Code |
| EXPRSN | C_EXPRSN_TYP | This field contains the code the indicates what type of expression the record is. The syntax of the expression must be aligned with the type specified by this column. | Expression Type Code |
| EXPRSN | B_CMN | This flag is used to mark the expression as "common". There is no impact to the execution architecture based on how this flag is set. Marking an expression as "common" is helpful in the configuration console as a way to quickly find expressions that are used/shared. | Common Flag |
| EXPRSN | G_LAST_TXN_ID | The G_LAST_TXN_ID column serves two purposes. It identifies the last transaction that modified the record. This ties to the architecture's AUDIT_TXN.G_TXN_ID column and the TBL_AUDIT_TRAIL.G_TXN_ID columns. The other purpose of this column is to be the optimistic lock key. | Last Transaction Id |

The logic and processing described above may include additional or different logic and may be implemented in many different ways. A processor may be implemented as a controller, microprocessor, microcontroller, application specific integrated circuit (ASIC), discrete logic, or a combination of other types of circuits or logic. Similarly, memories may be DRAM, SRAM, Flash, or other types of memory. Parameters (e.g., conditions and thresholds) and other data structures may be separately stored and managed, may be incorporated into a single memory or database, or may be logically and physically organized in many different ways. Programs and instructions may be parts of a single program, separate programs, implemented in libraries such as Dynamic Link Libraries (DLLs), or distributed across several memories and processors.

While various embodiments of the invention have been described, it may be apparent to those of ordinary skill in the art that many more embodiments and implementations are possible within the scope of the invention. Accordingly, the invention is not to be restricted except in light of the attached claims and their equivalents.

We claim:

1. A method for building a rule that specifies an action that may occur during execution of an application, the method comprising:
   storing in a computer memory an expression editor tool;
   reading, with a processor, an action point definition from a database, the action point definition comprising an action point identifier that specifies an action point located in application program code;
   determining from the action point definition, with the processor, a dataset that is in-context at the action point in the application program code;
   executing from the computer memory, with the processor, the expression editor tool, where the expression editor tool is operable to:
      display an expression definition interface comprising:
         data source selectors for obtaining selected data fields from among the dataset; and
         an operator selector for obtaining a selected logical operator to connect the selected data fields;
      construct a new expression from the selected data fields and the selected logical operator;
      display an outcome selection interface comprising:
         an outcome selector for obtaining a selected outcome for the new expression;
      create a rule comprising the new expression and the selected outcome;
      store the rule in the database linked to the action point definition; and
      display an expression combination interface comprising:

an expression ordering section operable to display multiple defined expressions, including the new expression;

an operator selector for obtaining a selected logical operator to connect the multiple defined expressions; and an expression grouping element operable to combine a first and a second defined expression among the multiple defined expressions into an individually selectable unitary expression for combination within the expression combination interface.

2. The method of claim 1, further comprising executing the expression editor tool to:

display a calculation definition interface comprising:
  calculation component selectors for obtaining selected calculation components; and
  an operator selector for obtaining a selected numerical operator to:
    connect the selected calculation components;
    construct a calculation from the selected calculation components and the selected numerical operator; and
    incorporate the calculation into the rule.

3. The method of claim 1, further comprising executing the expression editor tool to:

construct a new expression combination from the multiple defined expressions and the selected logical operator; and create the rule from the new expression combination and the selected outcome.

4. The method of claim 1, further comprising executing the expression editor tool to:

display an action point interface comprising:
  an action point configuration section operable to obtain a selected action that always executes at the action point;
  add the selected action to the action point definition along with the rule.

5. The method of claim 1, further comprising executing the expression editor tool to:

display an existing expression selection interface comprising:
  an expression search section operable to search for and display predefined expressions in the database; and
  an expression selection section operable to obtain a predefined expression selection from the display of predefined expressions;
  add display the predefined expression selection in the expression definition interface for review.

6. A product comprising:

a non-transitory computer readable medium; and logic stored on the non-transitory computer readable medium for execution by a processor in a computer system, where the logic, when executed by the processor, causes the computer system to:

read, with a processor, an action point definition from a database, the action point definition comprising an action point identifier that specifies an action point located in application program code;

determine from the action point definition, with the processor, a dataset that is in-context at the action point in the application program code;

display an expression definition interface comprising:
  data source selectors for obtaining selected data fields from among the dataset; and
  an operator selector for obtaining a selected logical operator to connect the selected data fields;
  construct a new expression from the selected data fields and the selected logical operator;

display an outcome selection interface comprising:
  an outcome selector for obtaining a selected outcome for the new expression;

create a rule comprising the new expression and the selected outcome;

store the rule in the database linked to the action point definition; and display an expression combination interface comprising:
  an expression ordering section operable to display multiple defined expressions, including the new expression;
  an operator selector for obtaining a selected logical operator to connect the multiple defined expressions; and
  an expression grouping element operable to combine a first and a second defined expression among the multiple defined expressions into an individually selectable unitary expression for combination within the expression combination interface.

7. The product of claim 6, where the logic is further operable to:

display a calculation definition interface comprising:
  calculation component selectors for obtaining selected calculation components; and
  an operator selector for obtaining a selected numerical operator to:
    connect the selected calculation components;
    construct a calculation from the selected calculation components and the selected numerical operator; and
    incorporate the calculation into the rule.

8. The product of claim 6, where the logic is further operable to:

construct a new expression combination from the multiple defined expressions and the selected logical operator; and create the rule from the new expression combination and the selected outcome.

9. The product of claim 6, where the logic is further operable to:

display an action point interface comprising:
  an action point configuration section operable to obtain a selected action that always executes at the action point;
  add the selected action to the action point definition along with the rule.

10. The product of claim 6, where the logic is further operable to:

display an existing expression selection interface comprising:
  an expression search section operable to search for and display predefined expressions in the database; and
  an expression selection section operable to obtain a predefined expression selection from the display of predefined expressions;
  add display the predefined expression selection in the expression definition interface for review.

11. A computer system for building a rule that specifies an action that may occur during execution of an application, the computer system comprising:

a computer memory operable to store an expression editor tool;

a database operable to store an action point definition comprising an action point identifier that specifies an action point located in application program code;

a processor in communication with the memory and the database, the processor operable to:
read the action point definition from the database;
determine from the action point definition a dataset that is in-context at the action point in the application program code;
execute from the computer memory the expression editor tool, which when executed is operable to:
display an expression definition interface comprising:
data source selectors for obtaining selected data fields from among the dataset; and
an operator selector for obtaining a selected logical operator to connect the selected data fields;
construct a new expression from the selected data fields and the selected logical operator;
display an outcome selection interface comprising:
an outcome selector for obtaining a selected outcome for the new expression;
create a rule comprising the new expression and the selected outcome;
store the rule in the database linked to the action point definition; and
display an expression combination interface comprising:
an expression ordering section operable to display multiple defined expressions, including the new expression;
an operator selector for obtaining a selected logical operator to connect the multiple defined expressions; and
an expression grouping element operable to combine a first and a second defined expression among the multiple defined expressions into an individually selectable unitary expression for combination within the expression combination interface.

12. The computer system of claim 11, the expression editor tool is further operable to:
display a calculation definition interface comprising:
calculation component selectors for obtaining selected calculation components; and
an operator selector for obtaining a selected numerical operator to:
connect the selected calculation components;
construct a calculation from the selected calculation components and the selected numerical operator; and
incorporate the calculation into the rule.

13. The computer system of claim 11, the expression editor tool is further operable to:
construct a new expression combination from the multiple defined expressions and the selected logical operator; and
create the rule from the new expression combination and the selected outcome.

14. The computer system of claim 11, the expression editor tool is further operable to:
display an action point interface comprising:
an action point configuration section operable to obtain a selected action that always executes at the action point;
add the selected action to the action point definition along with the rule.

15. The computer system of claim 11, the expression editor tool is further operable to:
display an existing expression selection interface comprising:
an expression search section operable to search for and display predefined expressions in the database; and
an expression selection section operable to obtain a predefined expression selection from the display of predefined expressions;
add display the predefined expression selection in the expression definition interface for review.

* * * * *